US009049708B2

(12) United States Patent
Freda et al.

(10) Patent No.: US 9,049,708 B2
(45) Date of Patent: Jun. 2, 2015

(54) METHOD AND APPARATUS FOR COEXISTENCE AMONG WIRELESS TRANSMIT/RECEIVE UNITS (WTRUS) OPERATING IN THE SAME SPECTRUM

(71) Applicant: InterDigital Patent Holdings, Inc., Wilmington, DE (US)

(72) Inventors: Martino M. Freda, Laval (CA); Rocco DiGirolamo, Laval (CA); Jean-Louis Gauvreau, La Prairie (CA); Scott Laughlin, Montreal (CA); Athmane Touag, Laval (CA); Mihaela C. Beluri, Jericho, NY (US); Joseph M. Murray, Schwenksville, PA (US); Yuying Dai, Lachine (CA); Stephen E. Terry, Northport, NY (US); Parul Mudgal, New Delhi (IN); Kamraan Nasim Syed, Milton (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 141 days.

(21) Appl. No.: 13/757,144

(22) Filed: Feb. 1, 2013

(65) Prior Publication Data
US 2013/0201884 A1 Aug. 8, 2013

Related U.S. Application Data

(60) Provisional application No. 61/594,588, filed on Feb. 3, 2012, provisional application No. 61/734,281, filed on Dec. 6, 2012.

(51) Int. Cl.
*H04B 7/005* (2006.01)
*H04W 72/00* (2009.01)
*H04W 72/04* (2009.01)
*H04W 72/12* (2009.01)
*H04W 16/14* (2009.01)

(52) U.S. Cl.
CPC .......... *H04W 72/042* (2013.01); *H04W 72/005* (2013.01); *H04W 72/1215* (2013.01); *H04W 16/14* (2013.01)

(58) Field of Classification Search
USPC ......... 370/278, 336, 230, 329, 311, 235, 232, 370/282, 468
See application file for complete search history.

(56) References Cited

U.S. PATENT DOCUMENTS

2013/0208587 A1* 8/2013 Bala et al. ..................... 370/230

FOREIGN PATENT DOCUMENTS

WO WO-2008/076484 A 6/2008
WO WO-2011/142710 A1 11/2011

OTHER PUBLICATIONS

3rd Generation Partnership Project (3GPP), R2-106449, "Signalling support for Almost Blank Subframe patterns", Jacksonville, USA, 3GPP TSG-RAN WG2, Meeting #72, Nov. 15-19, 2010, 5 pages.

(Continued)

*Primary Examiner* — Chi H Pham
*Assistant Examiner* — Alexander O Boakye
(74) *Attorney, Agent, or Firm* — Condo Roccia Koptiw LLP

(57) ABSTRACT

A method and apparatus for coexistence among wireless transmit/receive units (WTRUs) operating in the same spectrum are disclosed. A WTRU includes a memory, a receive unit, a transmit unit and a control unit. The memory stores coexistence gap patterns. Each of the coexistence gap patterns defines a pattern of transmission periods and silent periods for the WTRU and corresponds to a respective duty cycle. The receive unit receives from a base station information regarding a duty cycle for a wireless cell operated by the base station. The control unit selects one of the coexistence gap patterns based on the received information regarding the duty cycle for the wireless cell and controls the transmit unit to transmit information during the transmission periods and not transmit information during the silent periods of the selected one of the plurality of coexistence gap patterns.

22 Claims, 57 Drawing Sheets

(56) References Cited

OTHER PUBLICATIONS

European Telecommunications Standards Institute (ETSI), TS 136 300, V10.3.0, "LTE; Evolved Universal Terrestrial Radio Access (E-UTRA) and Evolved Universal Terrestrial Radio Access Network (E-UTRAN); Overall description; Stage 2 (3GPP TS 36.300VERSION 10.3.0 Release 10)", Apr. 2011, 205 pages.

European Telecommunications Standards Institute (ETSI), TS 136 331, V10.1.0, "LTE; Evolved Universal Terrestrial Radio Access (E-UTRA); Radio Resource Control (RRC); Protocol specification (3GPP TS 36.331 version 10.1.0 Release 10)", Apr. 2011, 292 pages.

* cited by examiner

| SUBFRAME | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 |
|---|---|---|---|---|---|---|---|---|---|---|---|---|---|---|---|---|---|---|---|---|---|---|---|
| CONFIG | D | S | U | D | D | D | S | U | D | D | D | S | U | D | D | D | S | U | D | D | D | S | U |
| UL HARQ | | | Tx A/N | | | | | Tx A/N | | | | | Tx A/N | | | | | Tx A/N | | | | | Tx |
| UL PROCESS | | | H0 | | | | | H1 | | | | | H0 | | | | | H1 | | | | | H0 |
| DL PHICH/PDCCH | | | | | | | | | A0 | | | | | A1 | | | | | A0 | | | | |
| DL HARQ | Tx | Tx A/N | Tx | Tx | Tx | Tx | Tx | Tx A/N | Tx | Tx | Tx | Tx A/N | Tx | Tx | Tx | Tx | Tx | Tx A/N | Tx | Tx | Tx | Tx A/N | |
| DL PROCESS | | | H0 | H1 | H2 | H3 | H4 | H5 | H6 | H7 | H8 | H9 | H0 | H1 | H2 | H3 | H4 | | | | | | |
| DL PUCCH | | | | | | | | A0 1/2/3 | | | | | A4 5/6/7 | | | | | A8 9/0/1 | | | | | |

FIG. 9

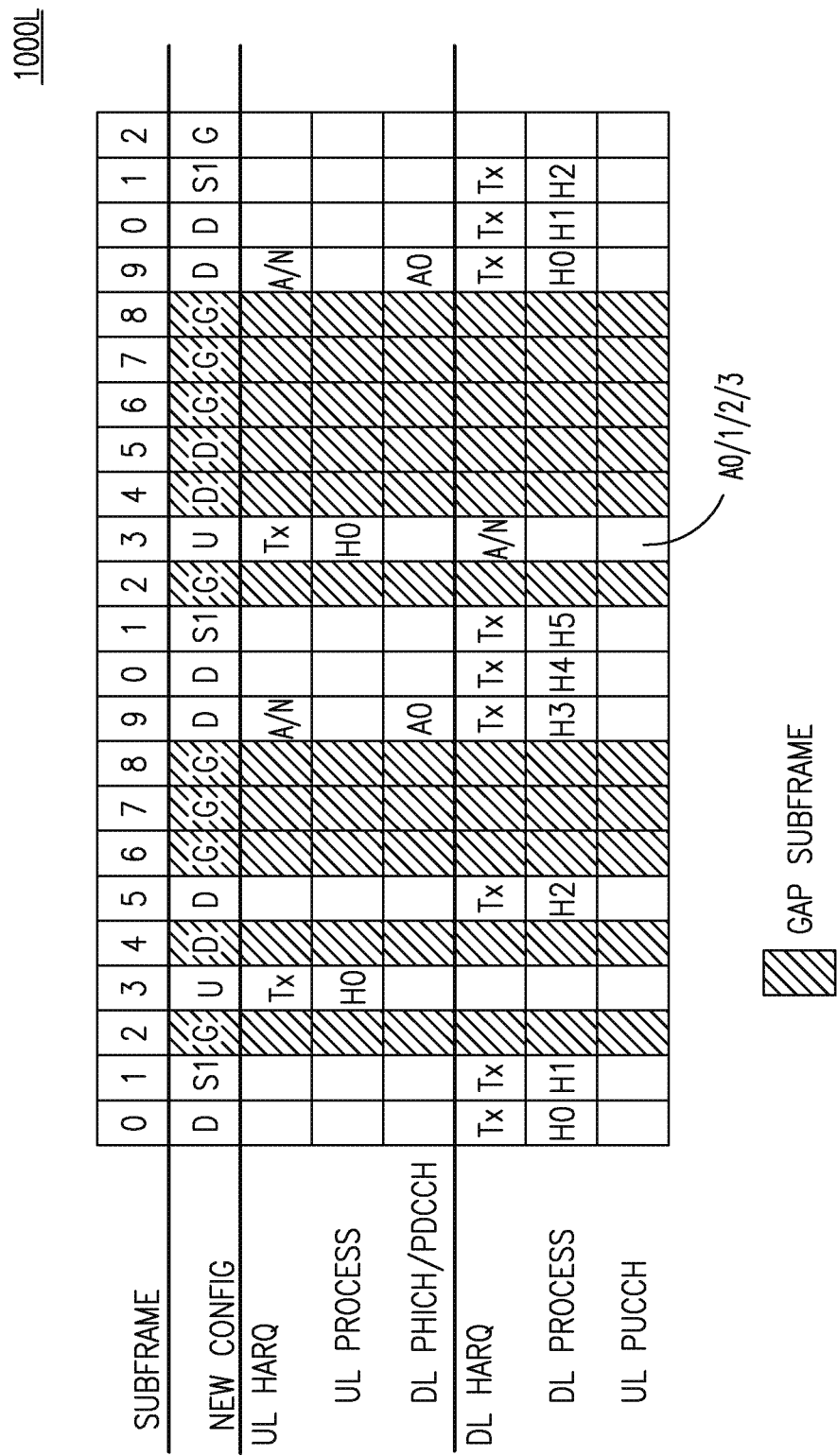

METHOD AND APPARATUS FOR COEXISTENCE AMONG WIRELESS TRANSMIT/RECEIVE UNITS (WTRUS) OPERATING IN THE SAME SPECTRUM

CROSS REFERENCE TO RELATED APPLICATIONS

This application claims the benefit of U.S. Provisional Patent Application No. 61/594,588, which was filed on Feb. 3, 2012, and U.S. Provisional Patent Application No. 61/734,281, which was filed on Dec. 6, 2012, the contents of which are hereby incorporated by reference herein.

BACKGROUND

Wireless networks were originally designed for use with targeted applications, such as voice or data, for an envisioned load (e.g., based on a predicted consumer acceptance of the technology). However, such networks are now being subject to increasingly more uses, and actual consumer acceptance of such technologies has been unexpected. For example, wireless networks are commonly used for streaming video and web browsing, wireless local area networks (WLANs) are commonly used to provide hotspot coverage in coffee shops and restaurants, many businesses are foregoing wiring Ethernet LANs for the simplicity of wireless LANs and most residential homes have at least one WiFi access point.

SUMMARY

A method and apparatus for coexistence among wireless transmit/receive units (WTRUs) operating in the same spectrum are disclosed. A WTRU includes a memory, a receive unit, a transmit unit and a control unit. The memory stores coexistence gap patterns. Each of the coexistence gap patterns defines a pattern of transmission periods and silent periods for the WTRU and corresponds to a respective duty cycle. The receive unit receives from a base station information regarding a duty cycle for a wireless cell operated by the base station. The control unit selects one of the coexistence gap patterns based on the received information regarding the duty cycle for the wireless cell and controls the transmit unit to transmit information during the transmission periods and not transmit information during the silent periods of the selected one of the plurality of coexistence gap patterns.

BRIEF DESCRIPTION OF THE DRAWINGS

A more detailed understanding may be had from the following description, given by way of example in conjunction with the accompanying drawings wherein:

FIG. 9 is a diagram of uplink (UL) hybrid automatic repeat request (HARQ) and downlink (DL) HARQ timing relationships and HARQ processes for TDD UL/DL configuration 2 for Long Term Evolution (LTE) Releases 8 and 10;

FIGS. 10D, 10E, 10F, 10G, 10H, 10I, 10J, 10K, 10L, 10M, 10N and 10O are diagrams of UL HARQ and DL HARQ timing relationships and HARQ processes for high, medium and low duty cycle gap patterns for TDD UL/DL configurations 1, 3, 4 and 5;

FIG. 16A is a diagram of a high duty cycle coexistence gap pattern for a frame-based approach to defining coexistence gap patterns;

FIG. 16B is a diagram of a medium duty cycle coexistence gap pattern for a frame-based approach to defining coexistence gap patterns;

DETAILED DESCRIPTION

Figure 1A:
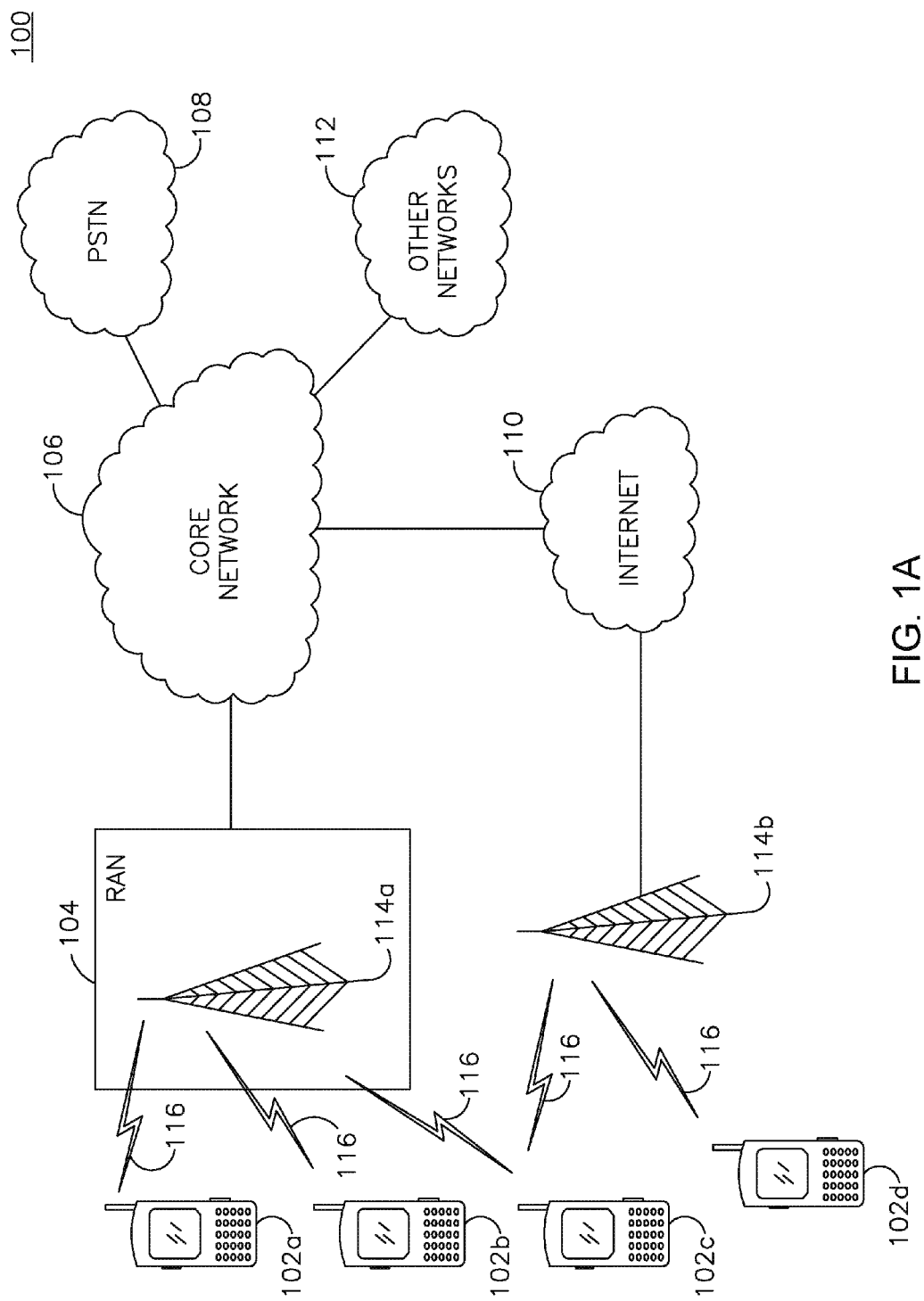
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
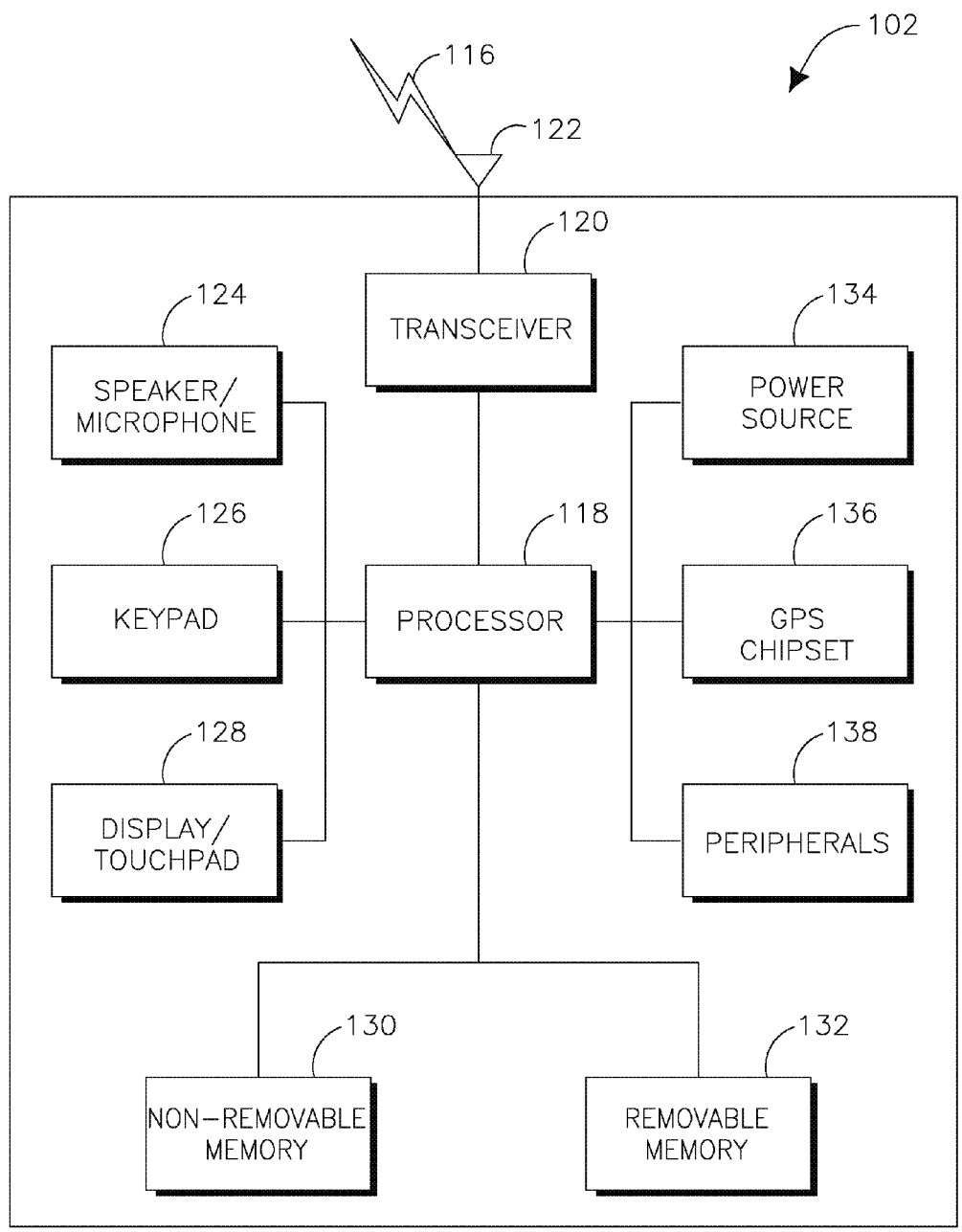
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, ITV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
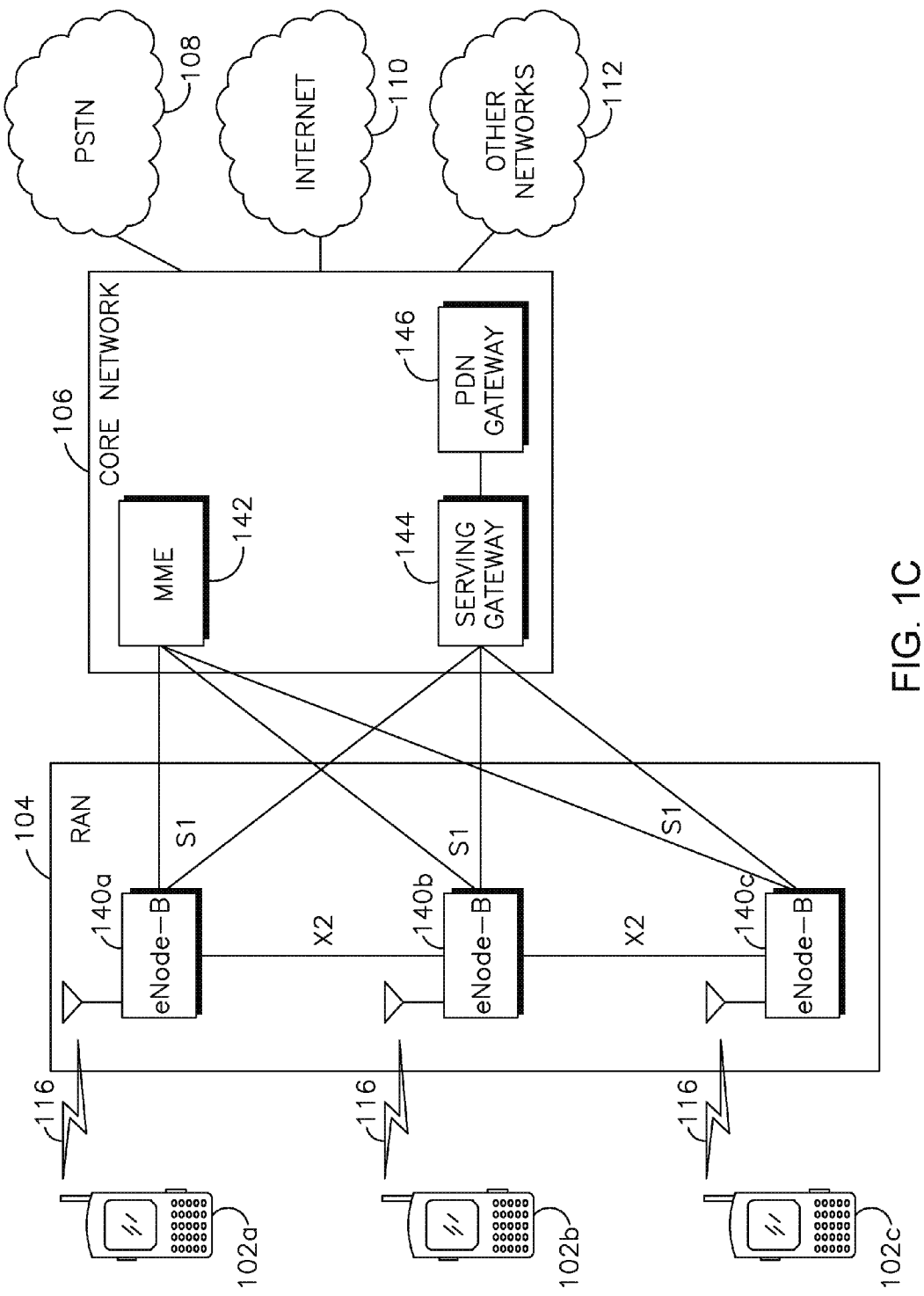
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Today's wireless networks have evolved over time to meet the increasing demands of available applications, but they are beginning to reach their limits in terms of maximum throughput offered. To address the increasing demand, wireless networks have been evolved, for the most part, to use their licensed spectrum more efficiently. In some cases, this is reaching a point where the gains are small compared with the effort or changes necessary to achieve those gains. One solution to this may be to find new spectrum on which to operate. The potential spectrum may be available in many bands (e.g., licensed and license exempt or dynamic spectrum sharing (DSS) bands). With this new spectrum, the throughput shortage may be addressed by a number of mechanisms. For instance, the wireless systems may use some form of load balancing, thereby allowing certain users to operate in this new spectrum. Alternatively the wireless systems may use carrier aggregation in which transmissions to/from users may be aggregated over multiple chunks of spectrum, where one or more of these chunks may be over license exempt spectrum. In the embodiments described herein, a cell operating in carrier aggregation mode over license exempt spectrum may be referred to as a supplementary cell and a carrier may be referred to as a supplementary carrier.

An example of a license exempt band that may be used as this potential new spectrum (for example for carrier aggregation) is referred to as the television white space (TVWS). Generally speaking, the TVWS represents spectrum in the ultra high frequency (UHF) and very high frequency (VHF) bands that is not reserved for other uses (e.g., TV distribution or wireless microphone use). At least a portion of the TVWS resulted from the transition from analog to digital TV transmissions, which freed up certain portions of the spectrum that are no longer used for TV transmissions. The Federal Communications Commission (FCC) has opened up the TVWS frequencies for a variety of unlicensed uses, given that the unlicensed (or secondary) users take steps to minimize interference to incumbent (or primary) users.

Due to the need for wireless networks to keep up with increasing demands, implementation of wireless networks such as long term evolution (LTE) in DSS bands has been considered. However, because such bands are available for use by users other than, for example, the LTE network, such networks need to be adapted so that co-existence between the wireless network and other users of the same spectrum is possible. Embodiments described herein provide enhancements to wireless networks such as LTE networks to enable co-existence between the wireless network or small cell operators (such as LTE-Time Division Duplex (LTE-TDD) operators in standalone small cells) and other users of the same spectrum (e.g., WiFi).

Non-coordinated methods for LTE coexistence with other secondary users in DSS bands may include the use of coexistence gaps. Such methods may include the use of silent periods (or coexistence gaps) in an LTE transmission to provide opportunities for other networks to operate in the same band. During each coexistence gap, all LTE entities may cease transmitting. At the end of each coexistence gap, the LTE eNB may resume downlink (DL) transmission without attempting to assess channel availability.

Figure 2:
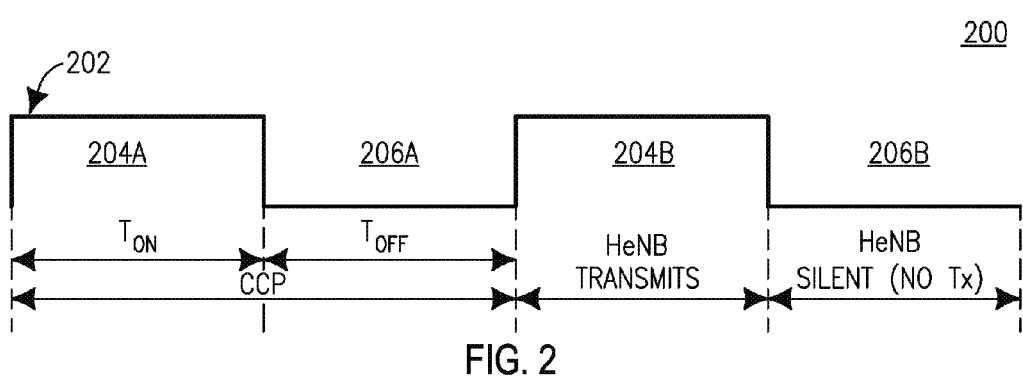
FIG. 2 is a signal diagram of an example periodic coexistence gap pattern.

FIG. 2 is a signal diagram 200 of an example periodic coexistence gap pattern 202. The example periodic coexistence gap pattern 202 illustrated in FIG. 2 has a periodic ON-OFF transmission, including alternating LTE DL transmission periods 204 (LTE ON, LTE active periods or $T_{ON}$) and coexistence gaps 206 (LTE OFF, LTE DTX periods or $T_{OFF}$). The period of the coexistence pattern (CPP) illustrated in FIG. 2 may be defined by:

$$CPP = T_{ON} + T_{OFF}. \quad (1)$$

The duty cycle of the coexistence pattern (CPDC) may be defined by:

$$CPDC = T_{ON}/(T_{ON} + T_{OFF}) \quad (2)$$

The CPP may be fixed (e.g., statically set during radio resource configuration (RCC) with a value set based on a trade-off between the frequency of gaps and the impact on latency and quality of service (QoS) of LTE) or dynamically changed to adapt to traffic conditions and the presence of other users (e.g., WiFi users). The CPDC may be a semi-static parameter that may change as a function of the traffic and presence of other secondary users.

Figure 3:
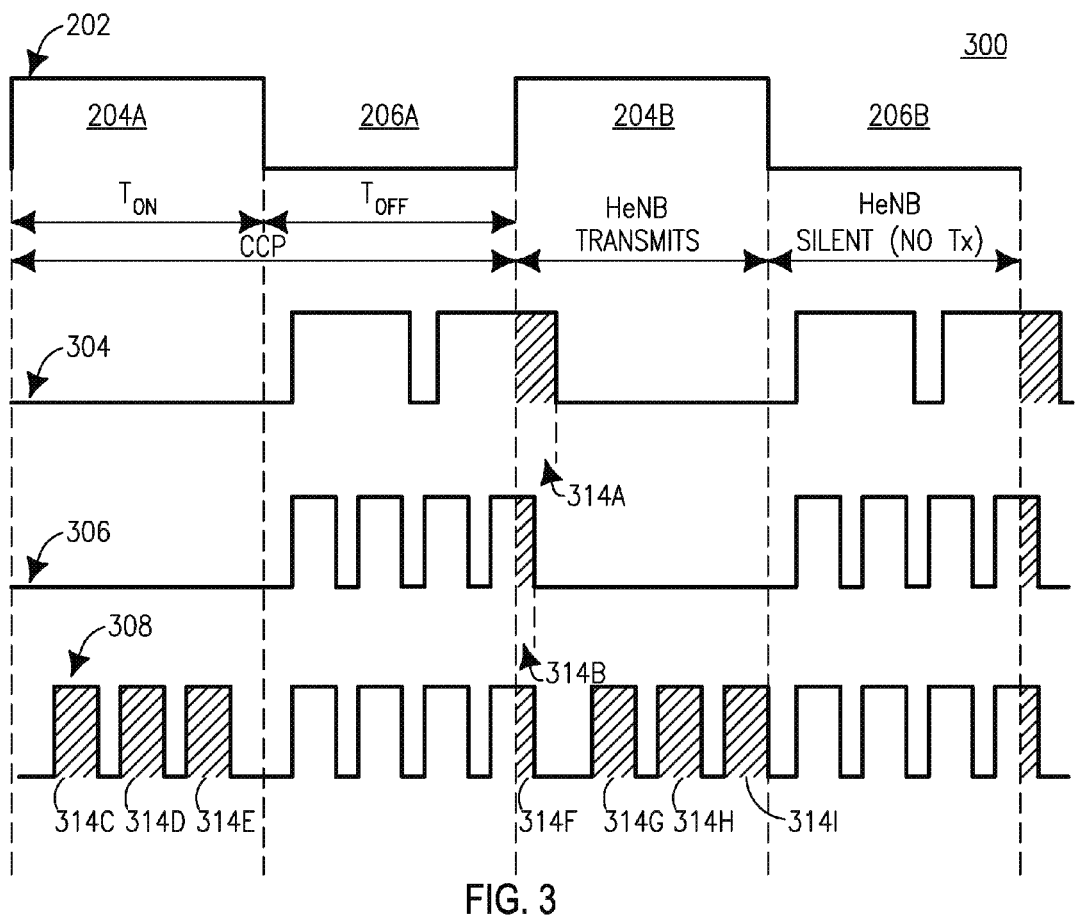
FIG. 3 is a signal diagram of the example periodic coexistence gap pattern of FIG. 2 including variations where all nodes experience the same interference and where nodes experience localized interference.

FIG. 3 is a signal diagram 300 of the example periodic coexistence gap pattern of FIG. 2 including variations where all nodes experience the same interference and where nodes experience localized interference. In embodiments where all nodes experience the same interference, the hidden node problem, which occurs when a node is visible from, for example, a wireless access point (AP) but not from other nodes communicating with the AP, does not occur. However, the hidden node problem may occur in embodiments where nodes experience localized interference. In the example illustrated in FIG. 3, the periodic coexistence gap pattern 202 is the same as illustrated in FIG. 2. Elements 304, 306 and 308 are different example transmission patterns for other networks (e.g., WiFi).

With respect to transmission patterns 304 and 306, all nodes experience the same interference and, therefore, the hidden node problem does not occur. Here, during the coexistence gaps 206a and 206b, WiFi or other network nodes may detect the available channel and start transmitting packets. For pattern 304, the WiFi nodes transmit longer packets, and for pattern 306, the WiFi nodes transmit shorter packets. For pattern 304 where WiFi nodes use longer packets, the last WiFi packet transmitted during a coexistence gap may overlap on the next LTE DL transmission (314a), thus creating interference. However, for pattern 306 where WiFi nodes use shorter packets, the last WiFi packet transmitted during a coexistence gap may overlap on the next LTE DL transmission (314b) to a lesser extent than longer WiFi packet transmissions or not at all. Accordingly, the longer the WiFi packets are, the longer the potential duration of LTE-WiFi interference at the beginning of the LTE ON period. It is, therefore, expected that WiFi transmission using long packets may result in more degradation of LTE throughput as compared to shorter WiFi packet transmissions.

With respect to transmission pattern 308, interference between nodes is localized, in which case the hidden node problem may occur. Here, WiFi nodes may not detect or defer to the LTE transmission and, thus, they may transmit both during LTE coexistence gaps 206a and 206b and LTE ON periods 204a and 204b, resulting in random periods of overlap interference 314c, 314d, 314e, 314f, 314g, 314h and 314i. A WiFi node may not detect LTE transmissions during LTE ON periods because, for example, WiFi may use a high threshold for detection of non-WiFi systems (e.g., a −62 dBM threshold for a 20 MHz bandwidth), so, in this scenario, any LTE transmission below the −62 dBM threshold will not be detected by the WiFi node.

Figure 4A:
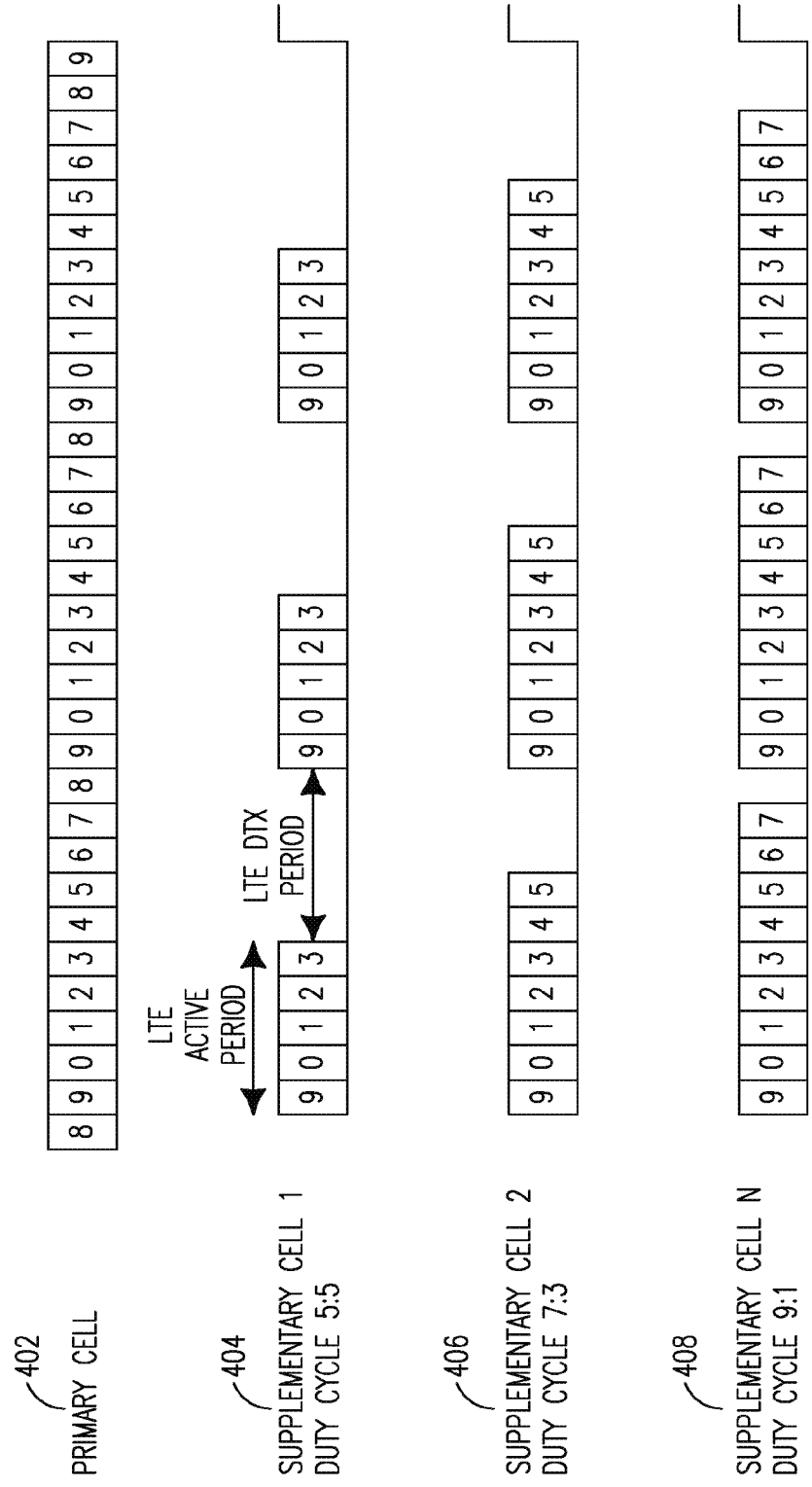
FIGS. 4A and 4B are diagrams of periodic coexistence gap patterns having different duty cycles and different alignments with respect to long term evolution (LTE) active periods for a downlink (DL) operating mode.
Figure 4B:
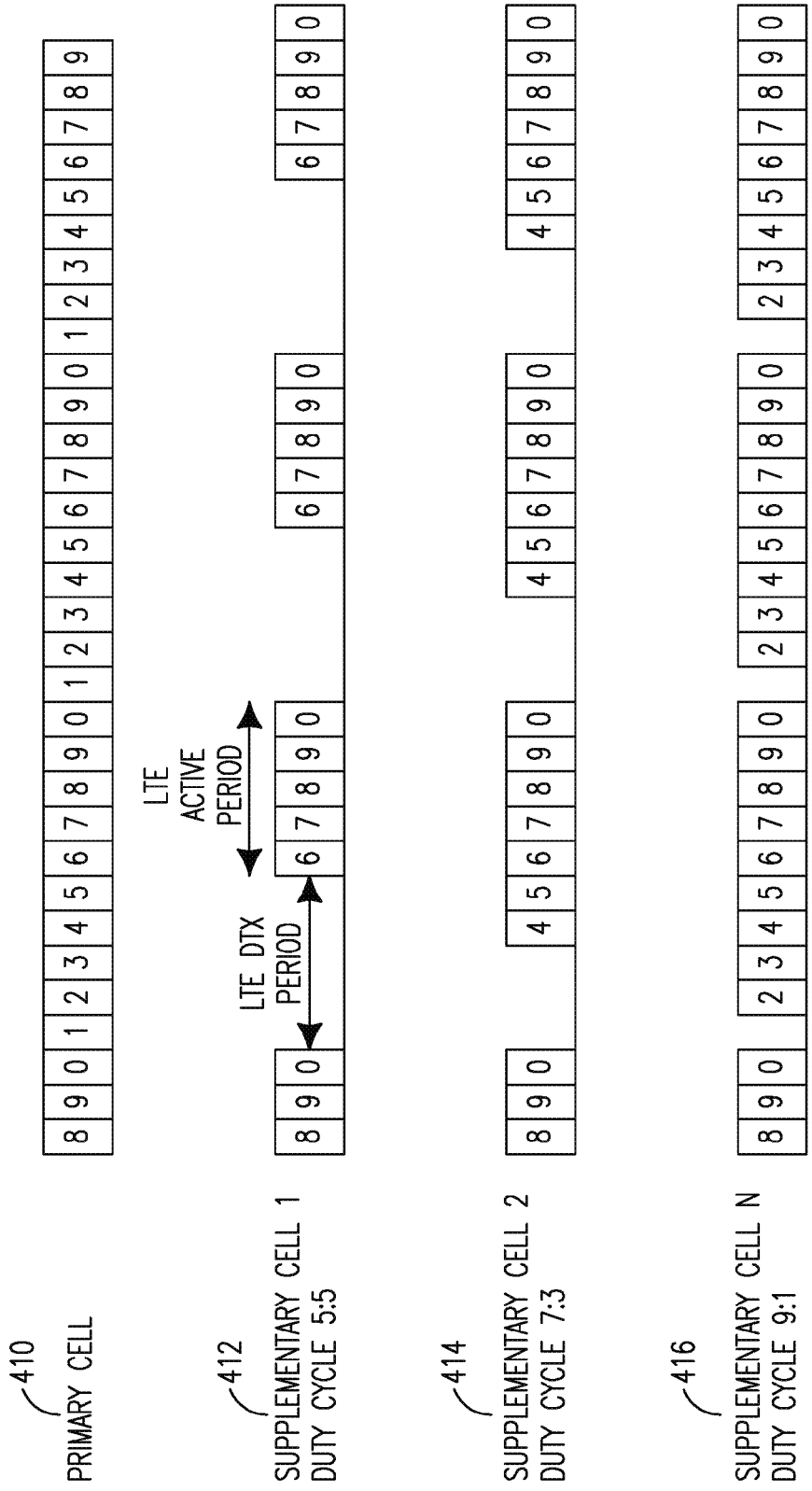

FIGS. 4A and 4B are diagrams of periodic coexistence gap patterns having different duty cycles and different alignments with respect to LTE active periods for a DL operating mode. For these examples, the license exempt spectrum is used in carrier aggregation mode, where the aggregation is with a primary cell (PCell) in the licensed band. The example primary cell 402 and 410 in each of FIGS. 4A and 4B has a frame size of 10 ms, with each frame including ten 1 ms sub-frames numbered 0-9. Each of the supplementary cells 404/412, 406/414 and 408/416 has a different duty cycle. The supplementary cells 404 and 412, for example, have a 5:5 or 50% duty cycle. As illustrated in FIGS. 4A and 4B, this means that a 5 ms coexistence gap occurs every 10 ms. The supplementary cells 406 and 414, for another example, have a 7:3 or 30% duty cycle. As illustrated in FIGS. 4A and 4B, this means that a 3 ms coexistence gap occurs every 10 ms. The supplementary cells 408 and 416, for another example, have a 9:1 or 10% duty cycle. As illustrated in FIGS. 4A and 4B, this means that a 1 ms coexistence gap occurs every 10 ms. In FIG. 4A, coexistence gaps across the supplementary carriers 404, 406 and 408 are aligned at the start of the LTE active periods. In FIG. 4B, coexistence gaps across the supplementary carriers 412, 414 and 416 are aligned at the end of the LTE active periods. For supplementary carriers aligned at the start of an LTE active period, the first sub-frame in the active period may be set to sub-frame #9. This may ensure that sub-frame 0, which may carry the supplementary cell synchronization signals, is the second sub-frame in the LTE active period, and, as a result, may be somewhat protected from harmful secondary user interference that may be present at the start of an active period.

For each of the supplementary carriers illustrated in FIGS. 4A and 4B, the eNB/HeNB may use a non-zero duty cycle, where the LTE active period is at least one sub-frame. This mode of operation may be referred to herein as Mode B. The eNB/HeNB may use this mode of operation as soon as one WTRU is actively using the carrier. The eNB/HeNB may transmit reference symbols and data during the LTE active periods. For Mode B operation with short duty cycles, the eNB/HeNB may reduce the frequency of transmission of synchronization signals, for example, to once every 10 ms.

Supplementary carriers may also operate with a special 0% duty cycle referred to hereafter as Mode A. In this mode, the eNB/HeNB may refrain from using the supplementary carriers for data traffic. Rather, the eNB/HeNB may limit transmission on the supplementary carrier to regularly transmit synchronization signals (e.g., PSS and SSS) and a limited set of pilot or reference symbols. For instance, this may be done in the first slot of sub-frame 0. As activity on Mode A carriers may be limited, it may cause minimal interference to other secondary users on this carrier. The mode may be used by the eNB/HeNB to configure inter-frequency measurements on supplementary carriers, which may still not be in operation (e.g., for testing the signal reception on these carriers). An eNB/HeNB may activate a number of Mode A carriers and configure a WTRU to perform inter-frequency measurements for these carriers.

Figure 4C:
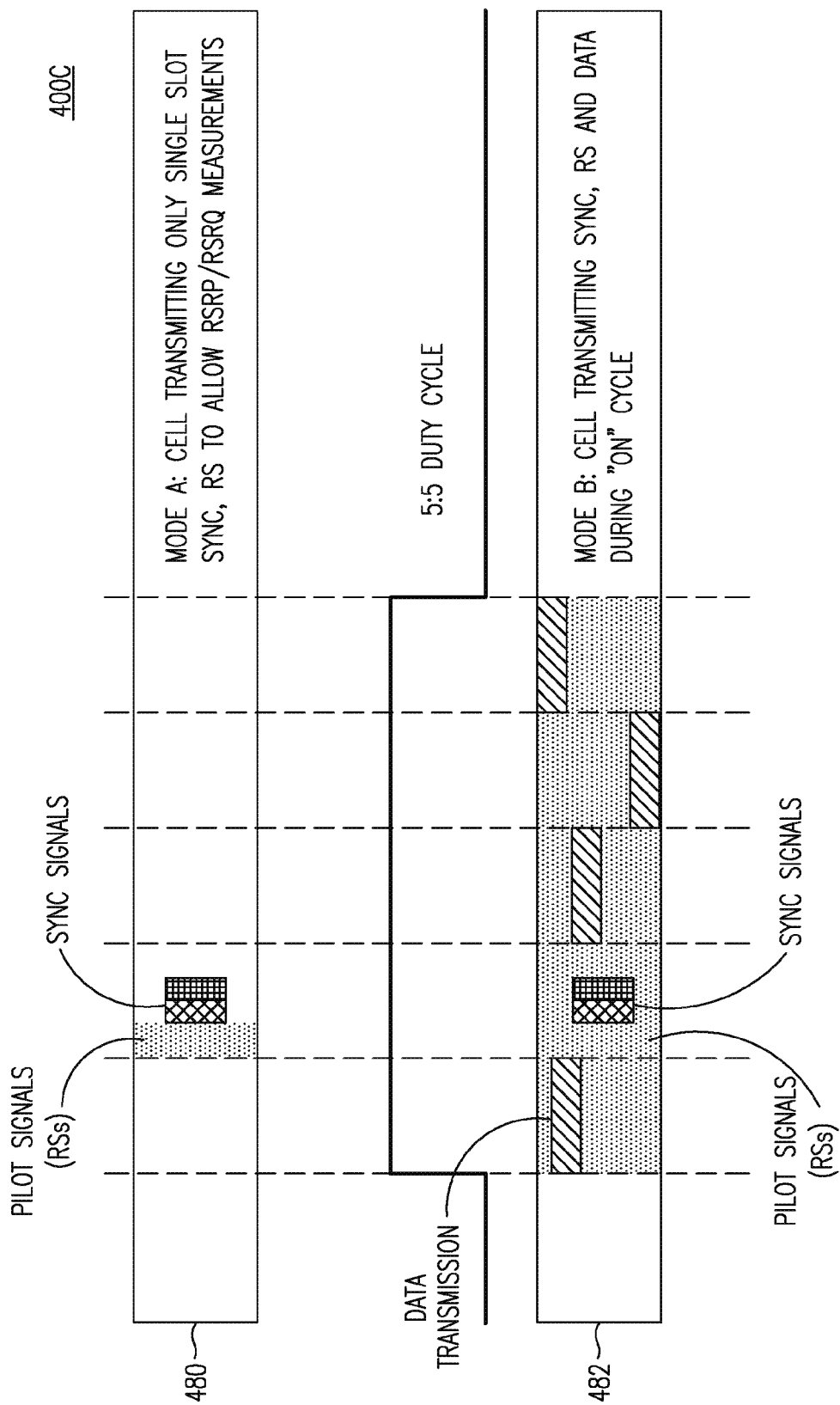
FIG. 4C is a diagram 400C of an example Mode A carrier 480 with a 0% duty cycle and an example Mode B carrier 482 with a 50% duty cycle.

FIG. 4C is a diagram 400C of an example Mode A carrier 480 with a 0% duty cycle and an example Mode B carrier 482 with a 50% duty cycle. For the example Mode A carrier 480, a cell may transmit only a single slot Sync and RS to allow for RSRP/RSRQ measurements. For the example Mode B carrier 482, a cell may transmit Sync, RS and data during an ON cycle.

The coexistence gap used by a DSS cell may be cell-wide. In an embodiment, the eNB or home eNB (HeNB) may configure multiple coexistence gaps for a DSS cell, only one of which may be active at a given time. The eNB/HeNB may, however, change the size of the coexistence gap depending, for example, on the presence or absence of secondary user systems (e.g., WiFi). An eNB or HeNB may be able to measure the load on the secondary system to further tailor the coexistence gap size.

In another embodiment, one or more WTRUs in a cell may require a different coexistence gap size than the one the cell is currently operating in. For example, an eNB/HeNB may sense no secondary user interference on the spectrum and, accordingly, may operate the cell with a very short coexistence gap (e.g., 1 ms every 10 ms). However, a particular WTRU may require a longer coexistence gap to perform actions on another radio access technology (RAT). Here, a cell may dynamically change the coexistence gap for the entire cell or may keep the existing coexistence gap but schedule the requesting WTRU in such a manner as to effectively allow it to use the requested longer coexistence gap (e.g., 5 ms every 10 ms), allowing the requesting WTRU more time to perform the required actions.

In a more specific example, a WTRU may be using both WiFi and LTE simultaneously. As the WiFi and LTE systems run independently, the WTRU may be both a WiFi WTRU and an LTE WTRU and may need to run concurrent procedures on either system that are not compatible. For example, the WiFi WTRU may enter a power saving mode and monitor only one beacon out of every x and then go to sleep. Here, the RRC may configure two different coexistence gaps for the WTRU. When the WTRU enters WiFi power saving mode, it may signal this to the eNB/HeNB, and the eNB/HeNB may send a message changing the coexistence gap to another pre-configured coexistence gap (e.g., the lowest idle duty cycle). When coming out of the WiFi power saving mode, or when the station detects that it needs to increase the amount of data to be sent over the WiFi, the WTRU may signal this to the eNB/HeNB. The eNB/HeNB may send a message changing the coexistence gap to the other pre-configured coexistence gap (e.g., the highest idle duty cycle).

Figure 5A:
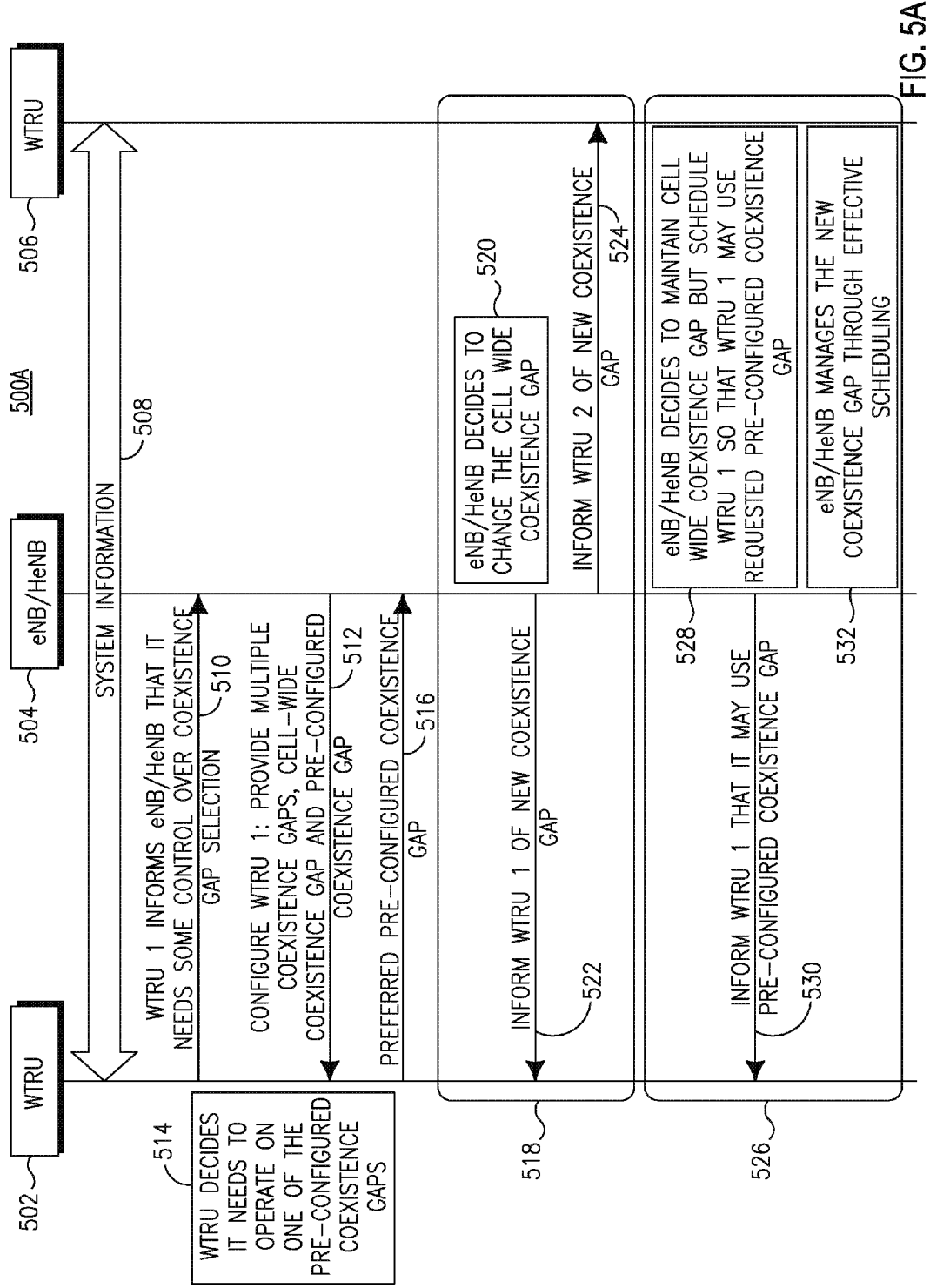
FIG. 5A is a flow diagram of a method of an eNB/home eNB (HeNB) managing WTRU requests for control over coexistence gap selection.

FIG. 5A is a flow diagram 500A of an example method of an eNB/HeNB managing WTRU requests for control over coexistence gap selection. In the example illustrated in FIG. 5A, WTRUs 502 and 506 and eNB/HeNB 504 exchange system information (SI) (508). The WTRU 502 needs to operate on a different coexistence gap than the one the eNB/HeNB 504 is currently using for the cell, and it informs the eNB/HeNB 504 that it needs control over coexistence gap selection (510). In an embodiment, this may be part of the capability transfer of the WTRU 502 or may be sent via a dedicated RRC message. Upon receipt of this information from the WTRU 502, the eNB/HeNB 504 may configure the WTRU 502 with the currently used cell-wide coexistence gap as well as other pre-configured but idle coexistence gaps for the cell (512). The WTRU 502 may later determine that it can no longer operate using the cell-wide gap but would prefer to use one of the other pre-configured but idle gaps (514). Here, the WTRU 502 may send its preference to the eNB/HeNB 504 using a MAC control element (CE) or other signaling mechanism (516).

As described above, there may be different options available to the eNB/HeNB 504 for resolving the request from the WTRU 502 to use one of the other pre-configured but idle gaps. In option 518, the eNB/HeNB 504 may change the cell-wide coexistence gap (520). Here, the eNB/HeNB 504 may reconfigure the coexistence gap for all WTRUs in the cell by, for example, informing each of the WTRUs (e.g., WTRUs 502 and 506) of the new coexistence gap (522/524). In option 526, the eNB/HeNB 504 may decide to only configure the coexistence gap for the WTRU 502 (528). Here, the eNB/HeNB 504 may send a MAC CE or other signaling mechanism to the WTRU 502 informing it that it may use the requested pre-configured coexistence gap (530). The eNB/HeNB 504 may manage the new coexistence gap for the WTRU 502 through effective scheduling (532).

In some situations, LTE cells may operate only over dynamic and shared spectrum. For example, new entrants may not have access to licensed spectrum and, therefore, may need to deploy LTE in DSS bands. For another example, small cells may be deployed in dynamic and shared spectrum only with a macro cell overlay operating in licensed spectrum. In this example, since the macro cell and small cell may operate in different bands, this may eliminate any interference issue between them. However, since the small cell itself may not operate in the licensed spectrum, the cell operating in the DSS may not be able to anchor the LTE system to a cell in licensed spectrum. This situation may be referred to herein as a small cell operating in standalone DSS bands.

New entrants may be motivated to deploy their own networks for a number of reasons. Cellular operators are often gatekeepers and may block new services that new entrants may wish to provide. But a new entrant's deployment of its own network may enable it to showcase or introduce such new services to the end customer. Further, new entrants may not have a monthly billing relationship with the end customer, and the basic connectivity provided by a small cell network may enable these new entrants to charge the end customer a monthly fee. Additionally, new entrants often make devices that do not have cellular connectivity to address market segments that do not want to pay high monthly fees (e.g., users of tablet personal computers (PCs) and electronic book readers). Finally, some new entrants may have already made considerable investments in developing and lobbying TVWS technology. To allow such new entrants to deploy their own networks, cellular technologies may need to be adapted so that they can be deployed using small cells and shared and dynamic spectrum such as the TVWS.

Embodiments are described herein that may enable or improve coexistence between LTE cells that operate only over dynamic and shared spectrum (e.g., new entrants and small cells operating in standalone BSS) and other users of the shared spectrum (such as WiFi users). One such embodiment includes the use of sub-frame-based coexistence gaps. Another such embodiment includes the use of frame-based coexistence gaps. Another such embodiment includes the use of coexistence gaps using a non-repeating pattern based approach. Another such embodiment includes the use of a new discontinuous reception (DRX) cycle for creation of coexistence gaps.

For each of these embodiments, any number of different coexistence gap patterns may be defined and provided to WTRUs. The WTRUs may select one of the defined coexistence gap patterns to apply with respect to transmissions at a given time based on information provided to the WTRU by an eNB. For an embodiment where a WTRU requests to use a different gap size, for example, the information provided to the WTRU by the eNB may include signaling configuring all of the WTRUs in a cell to use a particular one of the different coexistence gap patterns, or signaling instructing the requesting WTRU to operate using the particular one of the different coexistence gap patterns. For embodiments where sub-frame-based or frame-based coexistence gaps are used, the information provided to the WTRU by the eNB may include information regarding a particular duty cycle to apply that may, for example, correspond to a particular one of the different coexistence gap patterns.

Figure 5B:
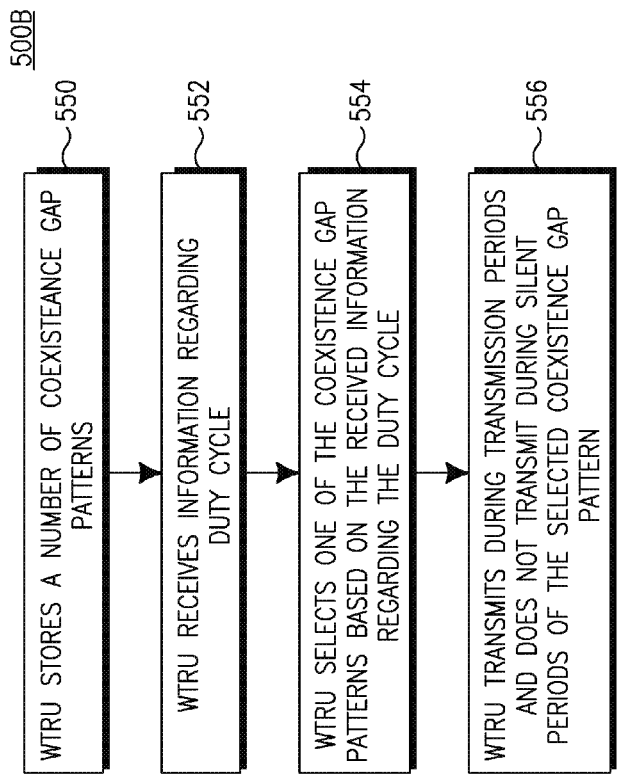
FIG. 5B is a flow diagram of an example method of coexistence among WTRUs operating in the same spectrum.

FIG. 5B is a flow diagram of an example method 500B of coexistence among WTRUs operating in the same spectrum. In the example method illustrated in FIG. 5B, a WTRU stores a number of coexistence gap patterns (550). Each of the coexistence gap patterns may define a pattern of transmission periods and silent periods for the WTRU and may correspond to a respective duty cycle of a plurality of duty cycles. The WTRU may receive information regarding a duty cycle from a base station (e.g., an eNB or HeNB) regarding a duty cycle for a wireless cell operated by the base station (552). The WTRU may select one of the coexistence gap patterns based on the received information regarding the duty cycle for the wireless cell (554). The WTRU may transmit during the transmission periods and not transmit during the silent periods of the selected one of the plurality of coexistence gap patterns (556).

In an embodiment, the silent periods are periods during which all transmission to and from the WTRU is absent. However, in some embodiments, minimal transmission of reference and/or synchronization symbols (e.g., PSS/SSS) may be permitted. The plurality of duty cycles may include a pre-determined number k of duty cycles, each of which may represent a range of percentages of the transmission periods to the silent periods in the corresponding coexistence gap pattern.

There may be advantages to using TDD instead of frequency division duplexing (FDD) in the DSS bands. TDD only needs one frequency band, and it may be easier to find a single suitable DSS frequency channel than finding a pair of separated frequency channels for UL and DL operation. Further, the nature of DSS bands may make it difficult to define fixed duplex separation between the UL and DL that are currently used in FDD systems. In addition, with two frequency bands used by FDD, there are more chances to interfere with incumbent users on any of the two channels than for TDD and its single channel. Further, detection of incumbent users on a single frequency band is easier than for two bands.

Finally, allowing asymmetric DL/UL data connection on a single frequency band may fit better with a dynamic spectrum assignment system where channel bandwidth is being optimized. Accordingly, at least some of the embodiments described herein rely on the use of TDD, and, therefore, embodiments are also described herein that introduce changes to existing hybrid automatic repeat request (HARQ) procedures in TDD-LTE that may be required due to the relation between UL and DL sub-frames involved in the HARQ procedures.

Figure 6:
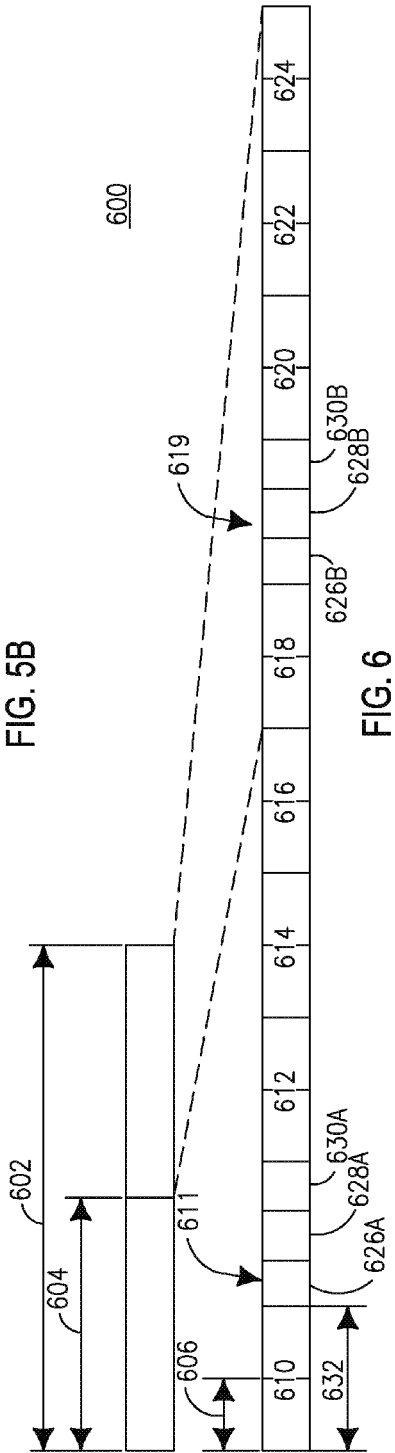
FIG. 6 is a diagram of a Type 2 frame structure for time division duplex (TDD)

FIG. 6 is a diagram of a Type 2 frame structure 600 for TDD. In the illustrated Type 2 frame structure 600, each radio frame 602 is 10 ms long and is made up of 10 sub-frames 610, 611, 612, 614, 616, 618, 619, 620, 622 and 624, each of which is 1 ms long, and two half frames 604, each of which is 5 ms long. Each sub-frame is made up of two slots 606.

In TDD, a sub-frame may be either a UL sub-frame, a DL sub-frame or a special sub-frame. In the illustrated Type 2 frame structure 600, the sub-frames 611 and 619 are special sub-frames, each of which includes a DL pilot time slot (DwPTS) 626 and a UL pilot time slot (UpPTS) 630 as well as a guard period 628 for the transition from DL to UL for interference avoidance. Certain restrictions may be placed on the types of channels that may be transmitted in the special sub-frame for the Type 2 format. For example, the special sub-frame may not have the physical UL control channel (PUCCH) mapped to it. The difference in frame structure may result in different placement/location of certain channels and signals, such as reference signals and shared channel (SCH).

TDD may allow for seven possible UL/DL configurations (e.g., arrangements of UL, DL and special sub-frames), which may be statically configured on a per-cell basis. For each of the seven UL/DL configurations 0-6, a maximum number of DL HARQ processes and UL HARQ processes for TDD may be specified. Table 1 below specifies an example maximum number of DL HARQ processes for each of the seven UL/DL configurations 0-6, and Table 2 below specifies an example maximum number of UL HARQ processes for each of the seven UL/DL configurations 0-6.

TABLE 1

| TDD UL/DL Configuration | Maximum Number of DL HARQ Processes |
|---|---|
| 0 | 4 |
| 1 | 7 |
| 2 | 10 |
| 3 | 9 |
| 4 | 12 |
| 5 | 15 |
| 6 | 6 |

TABLE 2

| TDD UL/DL Configuration | Number of UL HARQ Processes for Normal HARQ Operation | Number of UL HARQ Processes for Sub-Frame Bundling Operation |
|---|---|---|
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

In an embodiment, coexistence gaps may be defined as a collection of blank TDD sub-frames (sub-frame based approach). A blank sub-frame may be a UL, DL or special sub-frame during which neither the eNB nor any of the WTRUs under the control of the eNB may transmit. DL blank sub-frames may include no physical control or data channels (e.g., including physical DL control channel (PDCCH) and physical control format indicator channel (PCFICH)) and no DL reference symbols).

All WTRUs under the control of an eNB may be made aware of the presence of the blank sub-frames. For UL sub-frames, WTRUs may not be allowed to transmit on blank sub-frames. As a result, PUCCH and PUSCH may not be defined on these sub-frames, and the WTRU may not send a radio access channel (RACH) or sounding reference signal (SRS) on these sub-frames either.

The sub-frame-based approach to defining coexistence gaps for TDD may include deriving the specific sub-frames in each TDD UL/DL configuration in order to define configurations that allow existing physical layer (PHY) procedures for TDD-LTE to be performed with minimal impact and to allow sufficient length gaps for WiFi systems to coexist on the same channel. Coexistence gaps may be defined by introducing blank sub-frames into existing LTE configurations to create new variants of the existing TDD UL/DL configurations defined for each of high, medium and low duty cycles. In addition, the special sub-frame in TDD may be replaced by a new special sub-frame where the UpPTS is removed from the special sub-frame to increase the consecutive duration of the coexistence gaps.

Figure 7:
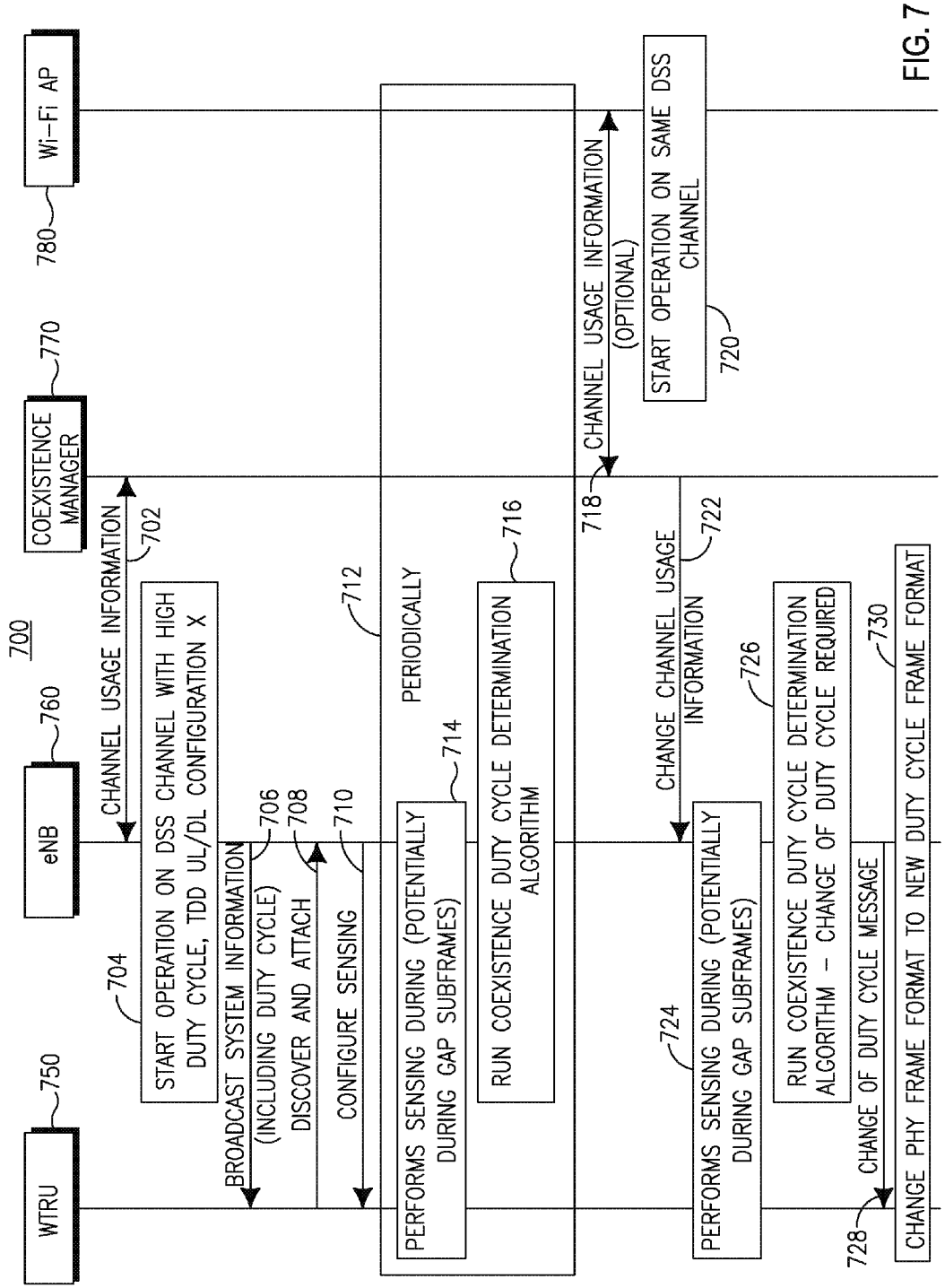
FIG. 7 is a signal diagram of a method of changing a channel using sub-frame-based coexistence gaps.

FIG. 7 is a signal diagram 700 of a method of changing a channel using sub-frame-based coexistence gaps in an LTE system that includes WTRUs 750, an eNB 760, a coexistence manager 770 and a WiFi AP 780. In an embodiment, channel usage information may be exchanged between the eNB 760 and the coexistence manager 770 (702). The LTE system may be initially operating in a DSS without coexistence, or, alternatively, the LTE system may be operating with a minimal gap time that allows it to perform sensing for WiFi on the channel. To achieve the minimal amount of gap time, the eNB 760 may select a high duty cycle gap configuration in the gap pattern design, which may be associated with the current TDD UL/DL configuration being used by the eNB 760 (704). In either of these cases, the eNB 760 may signal both the TDD UL/DL configuration and the coexistence gap pattern (e.g., high or none) using system information (SI) so that the WTRUs 750 that try to attach to the eNB 760 are aware of the current gap pattern (if any) that is being used (706). One or more WTRUs 750 may then perform network discovery and attachment to eNB 760 (708), and the eNB 760 may configure those WTRUs 760 for sensing (710).

Periodically, the LTE system may evaluate the best suited coexistence gap configuration to be used in the system (712). The coexistence gap configuration may include, for example, a high duty cycle configuration where the majority of the frame is used by the LTE system, a medium duty cycle configuration where the frame is evenly (or close to evenly) split between the LTE system and a coexistence gap meant for WiFi operation, and a low duty cycle configuration, where the majority of the frame is dedicated to a coexistence gap and only a few sub-frames may be used for LTE transmission. The actual frame format to be used for each configured gap state (e.g., high, medium, or low) may depend on the UL/DL configuration chosen by the eNB 760. The eNB 760 may choose a TDD UL/DL configuration based on the traffic profile (e.g., UL heavy, DL heavy, balanced) and may change the TDD UL/DL configuration if the traffic profile changes. Each TDD UL/DL configuration may have corresponding high, medium, and low gap states that define which sub-frame is used as a gap sub-frame and which sub-frame maintains its use as a normal sub-frame in LTE (UL or DL as defined by the current TDD UL/DL configuration).

The eNB 760 may make periodic decisions with respect to the preferred duty cycle for the gap configuration based on sensing, for example, to detect the presence of secondary signals such as WiFi signals. Such sensing may be performed by the eNB 760 or by one or of the WTRUs 750 (714). In an embodiment, the sensing may be performed during coexistence gap sub-frames. A duty cycle determination algorithm may then be triggered to determine the required duty cycle configuration (e.g., high, medium, low) to be used (716). In an embodiment, the algorithm may use an averaged sensing result to determine the required duty cycle. The algorithm may also use direct information about the WiFi system(s) that may be made available by an entity that is aware of the WiFi system or may be used to manage the coexistence of systems in the DSS bands (e.g., a coexistence manager) to make the determination.

The algorithm may account for knowledge of the continuously monitored LTE traffic load in making the determination. If the determined configuration does not match the current configuration, the eNB 760 may decide to change the duty cycle configuration. This process may be repeated periodically (724/726), and each time the eNB decides to change the duty cycle, it may signal each of the WTRUs 750 the change of duty cycle (728). The signaling may indicate a target frame at which the duty cycle configuration change will take place. Alternatively, the duty cycle change may take place immediately, or some fixed time following, transmission of the duty cycle configuration change message.

At the time that the duty cycle configuration change is to take effect, the eNB 760 and WTRUs 750 may transition from use of the old duty cycle to the new duty cycle. For example, if the eNB 760 is currently using the medium duty cycle and wants to change to the high duty cycle, the eNB 760 and WTRUs 750 may change from using a frame format that is defined by the medium duty cycle configuration to a frame format that is defined by a high duty cycle configuration (730).

The eNB 760 may determine the actual sequence of normal UL and DL sub-frames and blank sub-frames that make up the coexistence gap based on, for example, the current TDD UL/DL configuration and the determined coexistence duty cycle (e.g., high, medium, low). The WTRUs 750 may be aware of the mapping from the UL/DL configuration and the duty cycle to the actual sequence so that the eNB 760 does not need to signal the sequence but only the duty cycle and the TDD UL/DL configuration. The eNB 760 may periodically signal the duty cycle configuration to all WTRUs 750 (e.g., through SI) so that all WTRUs 750 are aware of the current duty cycle configuration. In addition, a WTRU 750 that wishes to attach or connect (e.g., following an initial cell search or when exiting IDLE mode) may be able to obtain the duty cycle prior to the attach procedure.

Sub-frames that are defined as blank sub-frames and that are part of the coexistence gap may not be used for transmission by either the eNB 760 or WTRUs 750. If the blank sub-frames were previously DL sub-frames in the original TDD UL/DL frame format, the eNB 760 may not transmit PDCCH, PDSCH, reference signals, or any SI in these sub-frames. During sub-frames that were previously DL sub-frames and that are defined as sub-frames in the coexistence gap, the WTRUs 750 may not attempt to decode the PDCCH. The WTRUs 750 may also not attempt to measure any reference symbols (e.g., CRS), and channel quality indicator (CQI) measurements may not be made for these sub-frames.

If the blank sub-frames were previously UL sub-frames in the original TDD UL/DL frame format, the WTRUs 750 may not transmit on PUCCH, PUSCH, or any SRS or DMRS signals. No WTRU 750 may transmit during blank sub-frames that were previously UL sub-frames in the original TDD UL/DL frame format.

Sub-frames that are not defined as blank sub-frames may continue to be either DL or UL sub-frames in TDD, and during these sub-frames, the WTRUs 750 may behave as they otherwise would. A WTRU 750 that wishes to send a RACH may first determine the coexistence gap pattern being used by the eNB 760 from received SI. In any sub-frame that was previously defined as a UL sub-frame in the original TDD UL/DL configuration but is a blank sub-frame according to the coexistence gap, a WTRU 750 may not transmit RACH. RACH may only be transmitted on RACH opportunities, which may fall on a UL sub-frame that is not a blank sub-frame (e.g., not part of a coexistence gap).

blank sub-frames) and may send the results to the eNB 760 as dictated by the sensing configuration sent by the eNB 760. The eNB 760 may use the sensing information from the WTRUs 750, as well as sensing information it may have also collected itself, to determine the best coexistence duty cycle by running the coexistence duty cycle determination algorithm. If the algorithm determines the need to change the duty cycle (e.g., between high, medium, and low), the eNB 760 may signal this through SI.

The eNB 760 may signal the duty cycle to the WTRUs 750 by using or extending one of the existing methods of SI signaling. In an embodiment, a new SIB may be used that includes the required duty cycle. In another embodiment, the duty cycle information may be added to an existing SIB. Sequence Listing 1 below is a sequence listing for the duty cycle being added to the coexistenceGapConfiguration information element (IE) (where the value none represents the absence of any coexistence gaps).

SEQUENCE LISTING 1

```
SystemInformationBlockType1 ::=  SEQUENCE {
    cellAccessRelatedInfo            SEQUENCE {
        plmn-IdentityList                PLMN-IdentityList,
        trackingAreaCode                 TrackingAreaCode,
        cellIdentity                     CellIdentity,
        cellBarred                       Enumerated {barred, notBarred},
        intraFreqReselection             Enumerated {allowed, notAllowed},
        csg-Indication                   BOOLEAN,
        csg-Identity                     CSG-Identity                 OPTIONAL      -- Need OR
    },
    CellSelectionInfo                SEQUENCE {
        q-RxLevMin                       Q-RxLevMin,
        q-RxLevMinOffset                 INTEGER (1..8)               OPTIONAL      -- Need OP
    },
    p-Max                            P-Max                            OPTIONAL,     -- Need
OP
    freqBandIndicator                INTEGER (1..64),
    schedulingInfoList               SchedulingInfoList,
    tdd-Config                       TDD-Config                       OPTIONAL,     -- Cond TDD
    si-WindowLength                  Enumerated {
                                         ms1, ms2, ms5, ms10, ms15, ms20,
                                         ms40}
    systemInfoValueTag               INTEGER (0..31),
    nonCriticalExtension             SystemInformationBlockType1-v890-IEs
    coexistenceGapConfiguration      Enumerated {none, high, medium, low}
```

DL and UL HARQ rules may depend on the frame formats. In general, UL HARQ timing may not change, and DL HARQ timing for each coexistence gap configuration may be fixed for a TDD UL/DL configuration. All other signaling applicable to normal TDD sub-frames may be applied to non-blank sub-frames (e.g., transmission of reference signals (RSs) in DL sub-frames).

While FIG. 7 illustrates the inclusion of a coexistence manager 770 in the LTE system, use of a coexistence manager 770 is optional but may provide additional guidance to the eNB 760 for choosing the duty cycle to be used based on knowledge of whether any WiFi systems are using the channels. Regardless of the presence of the coexistence manager 770, the eNB 760 may choose an initial duty cycle to operate on based either on information from the coexistence manager, some initial sensing, or a default coexistence gap. The eNB 760 may send the duty cycle information as part of the SI.

Any WTRU 750 that attaches to the eNB may be asked to perform continual sensing to help the eNB 760 maintain the best duty cycle configuration for the given channel usage conditions. A WTRU 750 that has been configured to perform sensing may do so during the coexistence gap (e.g., during the In an embodiment, a WTRU 750 may be required to read the duty cycle currently used by a cell before it attempts to perform RACH on the cell (e.g., for initial attachment). As a result, the coexistence duty cycle may be transmitted in SIB1, or, alternatively, in a new SIB that a WTRU 750 may be required to read prior to the attach procedure. A change in duty cycle may, therefore, only take place at the start of an SIB1 modification period (e.g., every 80 ms).

Other signaling methods, such as a new MAC control element (CE), may be used to change the duty cycle on a faster time frame if needed. If the new MAC CE is used, it may be sent independently to each WTRU 750 that is connected to the eNB 760 in order to obtain a faster change in the duty cycle. Here, however, it may be assumed that the duty cycle configuration is still transmitted in an SIB so that non-connected WTRUs (or WTRUs that may attach later) may not transmit RACH on sub-frames that fall in a coexistence gap.

In an embodiment, the coexistence manager 770 and a WiFi access point (AP) 780 may exchange channel usage information in between the periodic sensing and duty cycle change determinations (718). The WiFi AP 780 may then start operation on the same DSS channel (720), and the coexistence manager 770 may send change of channel usage information to the eNB 760 (722).

In an embodiment, sub-frame-based gap pattern designs using blank sub-frames may be backward compatible. In this embodiment, the gap pattern designs may comply with certain hard and soft constraints. The hard constraints may be essential to system operation, and, therefore, gap pattern designs that do not comply with the hard constraints may result in significant impacts to LTE standards and/or system operation. The soft constraints may have less impact on LTE standards and/or system operation as the hard constraints.

Example hard constraints may be related to UL HARQ, primary and secondary synchronization signals (PSS/SSS), MIB and SIB1. An example UL HARQ constraint is that the gap pattern should not result in changes to the UL HARQ timing or to the synchronous property of the UL HARQ. With respect to PSS/SSS constraints, to enable the WTRUs to receive PSS and SSS for synchronization and cell search purposes, sub-frame 0 and the DwPTS part of sub-frame 1 may not be configured within a gap. Further, although PSS/SSS may be sent twice in each frame (e.g., in sub-frame 0/1 and sub-frame 5/6), cell ID and timing may be obtained entirely through a single PSS/SSS pair. With respect to MIB constraints, the MIB may be transmitted in sub-frame 0, and sub-frame 0 may not be configured within a gap to enable the WTRUs to monitor the MIB. With respect to SIB1 constraints, SIB1 may be transmitted in sub-frame 5 of every other frame, and sub-frame 5 may not be configured within a gap to enable the WTRUs to monitor SIB1. In other words, sub-frame 5 may be used as a coexistence gap in every other frame when it does not carry SIB1.

Example soft constraints may be related to DL HARQ timing, paging and UL/DL ratio. An example DL HARQ timing constraint includes maintaining the timing of the DL HARQ consistent with LTE Release 8 and 10 specifications where possible, including timing of UL ACK/NACK feedback. With respect to paging-related constraints, for TDD, paging opportunities may occur in sub-frames 0, 1, 5 and 6. It is possible that sub-frame 5 and 6 may be configured as gaps, in which case mitigation mechanisms may be implemented for WTRUs that map to paging opportunities in sub-frames 5 and 6. With respect to UL/DL ratio-related constraints, the UL/DL ratio resulting after applying the coexistence pattern may be kept comparable to that of the original TDD DL/UL configuration. Further, whenever possible, the coexistence gaps may be defined in consecutive sub-frames. Additionally, to protect the MIB in sub-frame 0, as well as the PSS/SSS of sub-frames 0 and 5, from WiFi interference, gaps should not be scheduled for sub-frames 9 and 4 whenever possible. Finally, given that a WiFi system may gain access to the channel during the guard period (GP) of a special sub-frame, the GP of a special sub-frame may be in a gap to reduce the interference to the LTE system following a gap when possible.

High, medium and low duty cycles, as described above, may correspond to particular duty cycle ranges that an eNB may choose from. Table 3 below provides example duty cycles ranges that may be defined for each of the high, medium and low duty cycle categories. The example provided in Table 3 assumes that three duty cycles are defined for each TDD UL/DL configuration. However, any number of different duty cycle categories may be defined for eNBs to use and configure. The number of allowable UL/DL configurations may be known a-priori by the WTRU, and, therefore, the eNB may only need to configure the duty cycle to be used at a given time.

TABLE 3

| Duty Cycle Category | Duty Cycle Range |
| --- | --- |
| High | ~80% to 90% |
| Medium | ~50% to 60% |
| Low | ~30% to 40% |

In some circumstances, defining low duty cycle coexistence patterns (e.g., in the 30% to 40% duty cycle range) may not always be possible without significant impacts to backward compatibility (e.g., with LTE standards). Accordingly, a low duty cycle coexistence pattern may not always be available for use by the eNB.

In addition to defining specific sub-frames in the TDD UL/DL configuration as a blank sub-frame that may become part of the coexistence gap, a sub-frame based method for creation of coexistence gaps may also include enhancements to the special TDD sub-frame to create coexistence gaps. Since the constraint related to sub-frame 1, which is a special sub-frame in all TDD UL/DL configurations, stems from the synchronization symbols transmitted in the DwPTS, the UpPTS and the GP may form part of the coexistence gaps by disabling the use of the UpPTS in the WTRU. In an embodiment, the new special sub-frame may be combined with a gap sub-frame following it to provide a contiguous gap, which may eliminate the need for a separate GP for UL timing advance. This combination may be more bandwidth efficient than using separate coexistence gaps (for coexistence) and GP (for timing advance).

Figure 8:
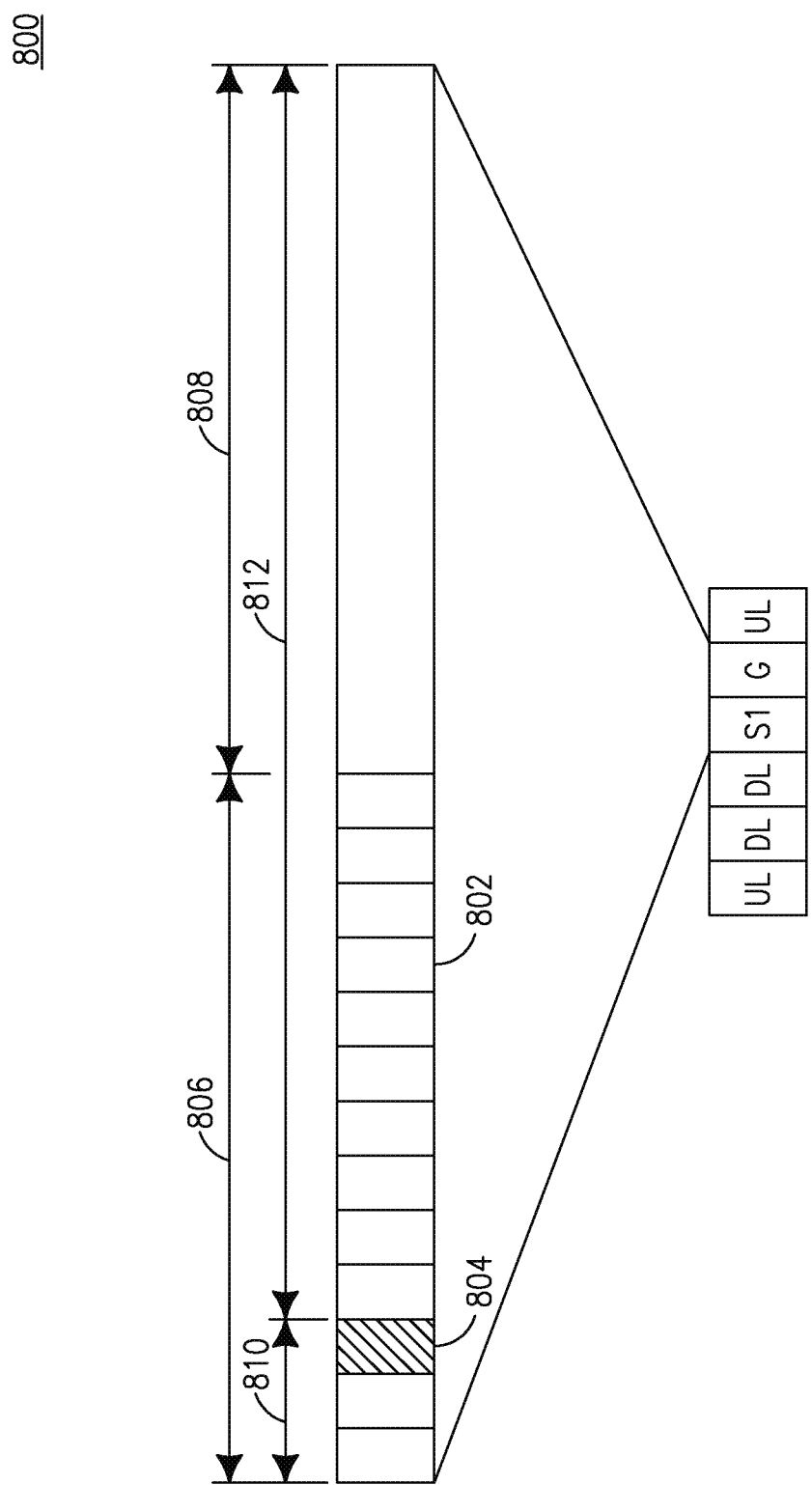
FIG. 8 is a diagram of an example special TDD sub-frame that may be used to create coexistence gaps.

FIG. 8 is a diagram 800 of an example special TDD sub-frame that may be used to create coexistence gaps. The new special TDD sub-frame 806 is formed from a number of OFDM symbols 802. As described above, the DwPTS portion 810 of the special sub-frame 806 includes the synchronization symbols, including the OFDM symbol 804 used for PSS. The remaining OFDM symbols 802 in the special sub-frame 806, along with the following gap sub-frame 808, form the coexistence gap 812.

In an embodiment, a minimum allowable DwPTS for any special sub-frame configuration may be used, leaving nearly 80% of the special sub-frame for coexistence. In another embodiment, the amount of DwPTS may remain configurable to give the system flexibility on whether DL data should be transmitted within the special sub-frames.

In an embodiment, unenhanced special sub-frames (e.g., an LTE release 8 special sub-frame) may also be used by an eNB when creating sub-frame based coexistence gaps. A WTRU may know whether a special sub-frame is a new special sub-frame (e.g., special sub-frame 806) or an unenhanced special sub-frame based on knowledge of the gap pattern sequence attached to each TDD UL/DL configuration and duty cycle configuration. During a new special sub-frame, a WTRU may behave according to LTE release 8 rules during the DwPTS and follow the special sub-frame configuration to determine the length of the DwPTS. The WTRU may not transmit RACH or SRS during the UpPTS of a new special sub-frame such that no WTRU transmissions are to occur during the UpPTS.

Gap patterns for TDD configurations 1-5 may be designed by starting with the existing frame formats for each TDD UL/DL configuration and selectively changing specific sub-frames to blank sub-frames. The new frame formats for the high, medium and low duty cycle configurations may be created by blanking out an increased number of sub-frames. UL and DL sub-frames that are replaced by blank sub-frames may be selectively chosen for each TDD UL/DL configuration from all sub-frames except sub-frame 0 as well as sub-frame 5 in odd system frame number (SFN) frames.

Selection and placement of blank sub-frames may be determined by observing UL HARQ timing. To maintain backward compatibility as described above, blank sub-frames may be selected in such a way so as to not affect the UL HARQ timing. In addition, DL HARQ timing may be maintained similar to LTE release 8 timing, for example, while ensuring that the high, medium and low frame formats are defined with the same DL HARQ timing (e.g., only the number of ACK/NACK bits that need to be sent in each UL sub-frame may be changed for a given TDD UL/DL configuration when the duty cycle is changed).

UL sub-frames may be selected by ensuring that at least one UL HARQ process is maintained (e.g., the pair of one UL sub-frame and the corresponding DL sub-frame where HARQ ACK is sent may not be replaced with blank sub-frames). DL sub-frames may be selected so that they create a gap pattern, which may result in the configuration with the most consecutive blank sub-frames, while adhering to the constraints described above.

In an embodiment, high, medium and low duty cycle sub-frame based coexistence gap patterns may be configured for each of the TDD UL/DL configurations 0-6 by selecting a UL process that favors consecutive gaps to be defined with consecutive sub-frames and removing that UL process. This may allow for definition of coexistence gaps without modifying UL HARQ timing because only sub-frames associated with certain processes are removed. Selection may be subject to hard constraints on sub-frames 0, 1 and 5. Both UL data sub-frames and corresponding DL PHICH sub-frames may be incorporated into the gap, if possible. DL sub-frames with no PHICH may be used as needed when creating the gap.

If DL sub-frames remain without a corresponding UL for ACK in the original timing (e.g., because the UL sub-frame is now part of the coexistence gap), a new DL HARQ timing may be defined (which may optimize the throughput but impact backward compatibility to previous standards) or the DL sub-frame may not be used for eNB transmission (the DL sub-frames may only be used for transmitting SI, RSs, etc.).

Definition of new DL HARQ timing may be consistent across all duty cycles used. Dynamic changes to DL HARQ timing may not be preferable because it avoids potential HARQ issues if signaling for change in duty cycle is not reliably received by every WTRU. Where possible, the new special sub-frame may be used to allow the GP to be part of the coexistence gap. This may result in more efficient usage of the medium by the LTE system when considering UL/DL transitions and also the need to provide coexistence gaps to the WiFi systems.

Special treatment may be given to TDD UL/DL configurations 0 and 6. For example UL HARQ RTT may be kept greater than 10. For another example, such special treatment may include definition of the gap pattern over multiple frames or special consideration by the scheduler.

FIG. 9 is a diagram 900 of UL HARQ and DL HARQ timing relationships and HARQ processes for TDD UL/DL configuration 2 for LTE Releases 8 and 10. The first row gives the sub-frame number, and the second row indicates whether the associated sub-frame is UL, DL or a special sub-frame (S). In the first row of the UL HARQ section, a shading scheme is used to associate the sub-frames used for UL transmission and the associated sub-frames where ACK/NACK may be sent for the corresponding UL transmission. The following rows show the actual UL process numbers and associated ACKs for these processes. The HARQ process numbers are arbitrary and may be used to differentiate the different processes themselves. In addition, the scheduler may or may not choose to use a given HARQ process, and the HARQ process identifiers, therefore, show the scenario that would be employed in the case of full buffer traffic. The DL HARQ section is the same except that it represents the transmissions in the DL and the associated ACK/NACK in the UL (along with the process numbers). As an example of the information portrayed by the shading scheme, sub-frames 4, 5, 6 and 8 are all DL sub-frames whose data are acknowledged using UL sub-frame 2 (in the next frame).

Figure 10A:
FIGS. 10A and 10B are diagrams of UL HARQ and DL HARQ timing relationships and HARQ processes for medium and low duty cycle gap patterns, respectively, for TDD UL/DL configuration 2.
Figure 10B:

FIGS. 10A and 10B are diagrams 1000A and 1000B of UL HARQ and DL HARQ timing relationships and HARQ processes for medium and low duty cycle gap patterns, respectively, for TDD UL/DL configuration 2. Consistent with the procedure described above, it may be necessary for both the medium and low duty cycle coexistence gap configurations to remove exactly one of the two UL HARQ processes. One of the UL HARQ processes should remain present to allow UL transmission, but one should also be removed to ensure that the UL/DL ratio does not become skewed toward the DL after creating the gap. In an embodiment, process H1 (associated with sub-frames 3 and 7) may be removed because doing so may allow for definition of continuous coexistence gaps more easily by configuring sub-frames 3 and 7 in a gap. In effect, apart from the need to maintain sub-frame 5 as a DL sub-frame in every other frame for transmission of SIB1, all sub-frames from 3 to 7, inclusive, may be used to define a coexistence gap.

The second row in FIGS. 10A and 10B indicates the coexistence gap by specifying a blank gap sub-frame as G and a new special sub-frame as S1. The medium duty cycle coexistence gap may span sub-frames 3 to 7 inclusive with sub-frame 5 being part of the gap during every odd sub-frame (e.g., where SIB1 is not transmitted). Eliminating UL sub-frame 7 may result in a change in the DL HARQ timing to send ACK/NACK for data transmissions in sub-frames 9 and 10. Alternatively, these sub-frames may not be used for DL transmission, and LTE Release 8 and 10 DL HARQ timing may be maintained. The configurations illustrated in FIGS. 10A and 10B assume the former option and illustrate the new DL HARQ timing that results.

Figure 10C:
FIG. 10C is a diagram of a high duty cycle gap pattern for TDD UL/DL configuration 2.
Figure 10D:
Figure 10E:
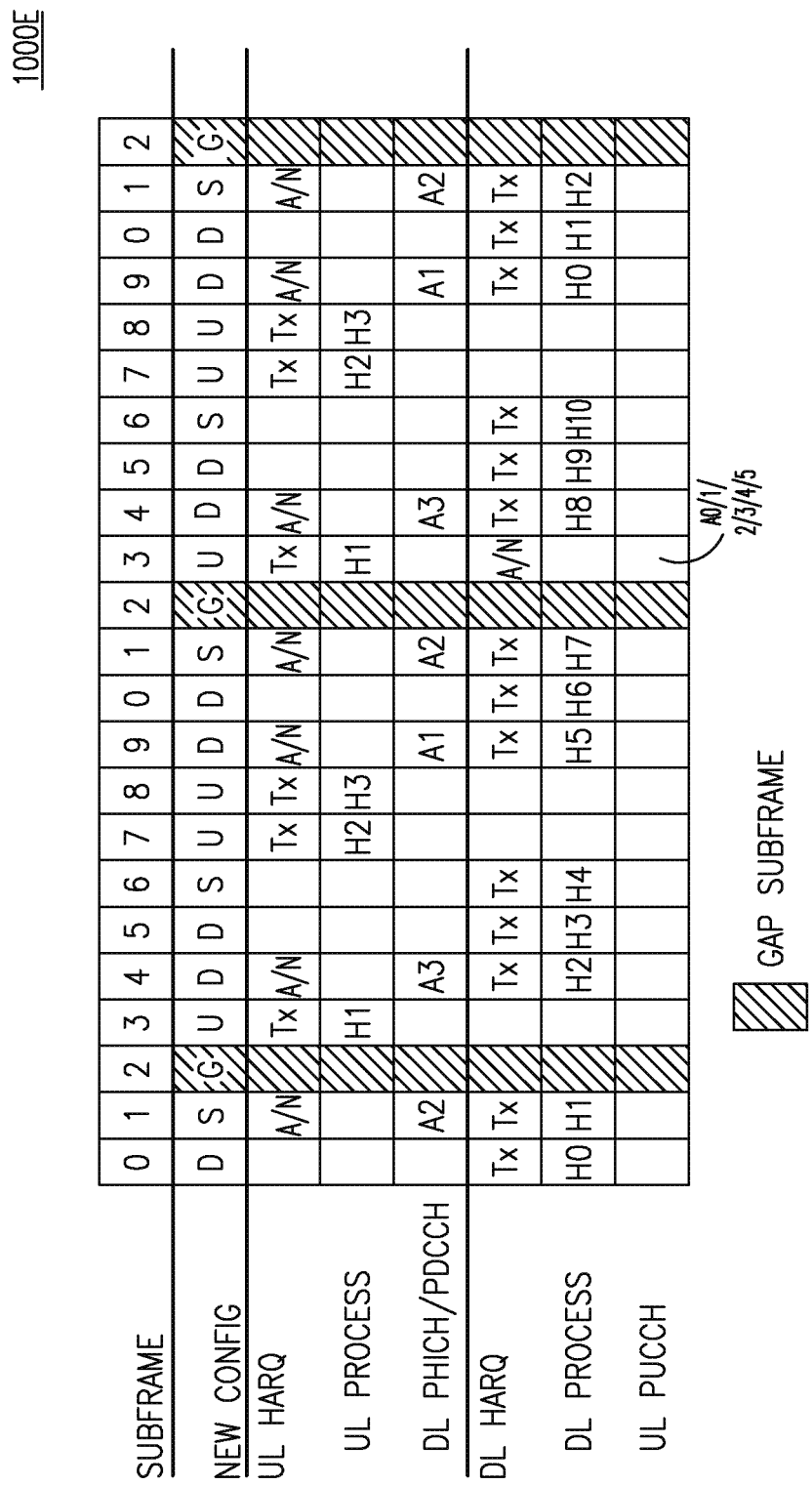
Figure 10F:
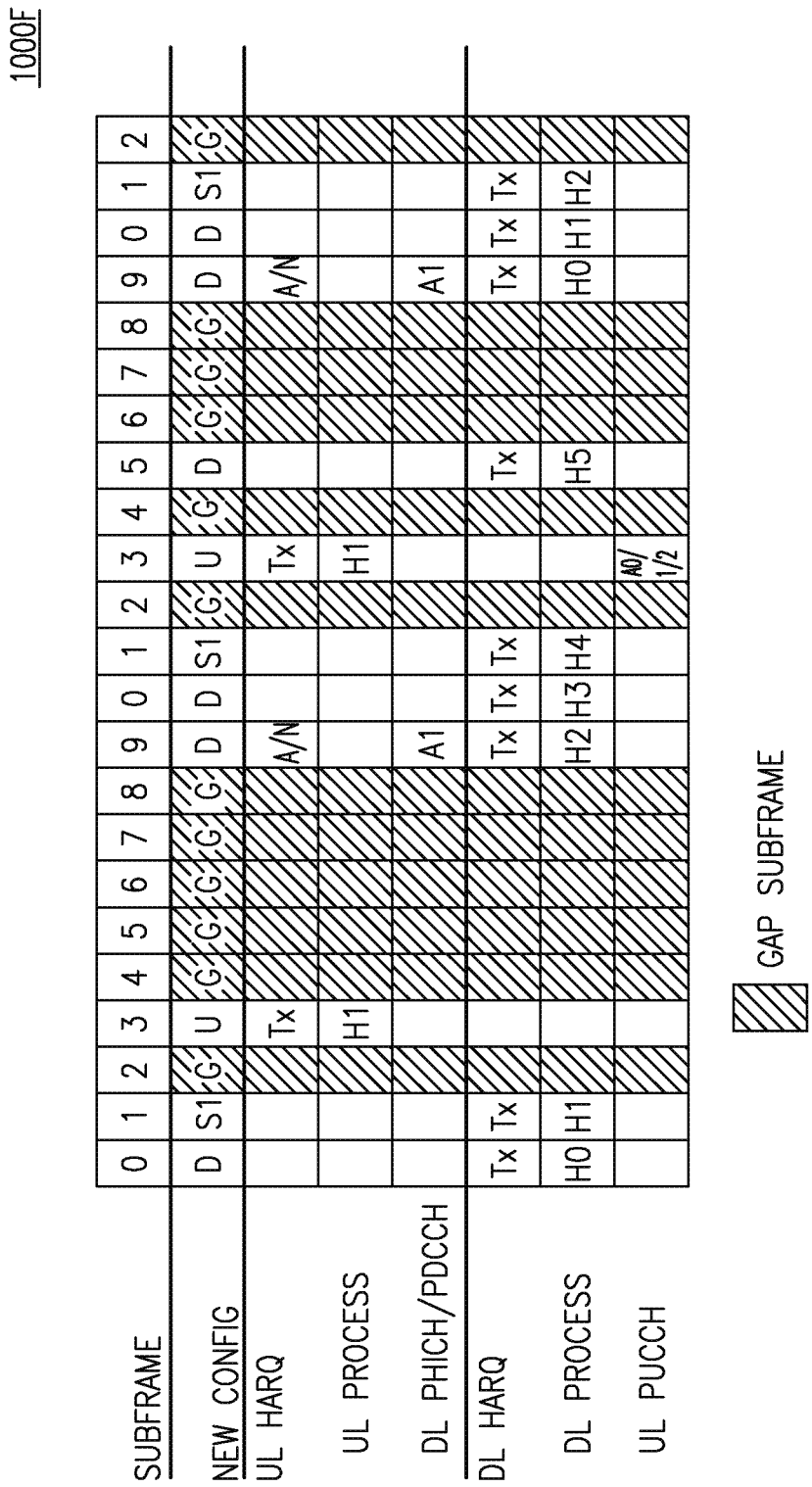
Figure 10G:
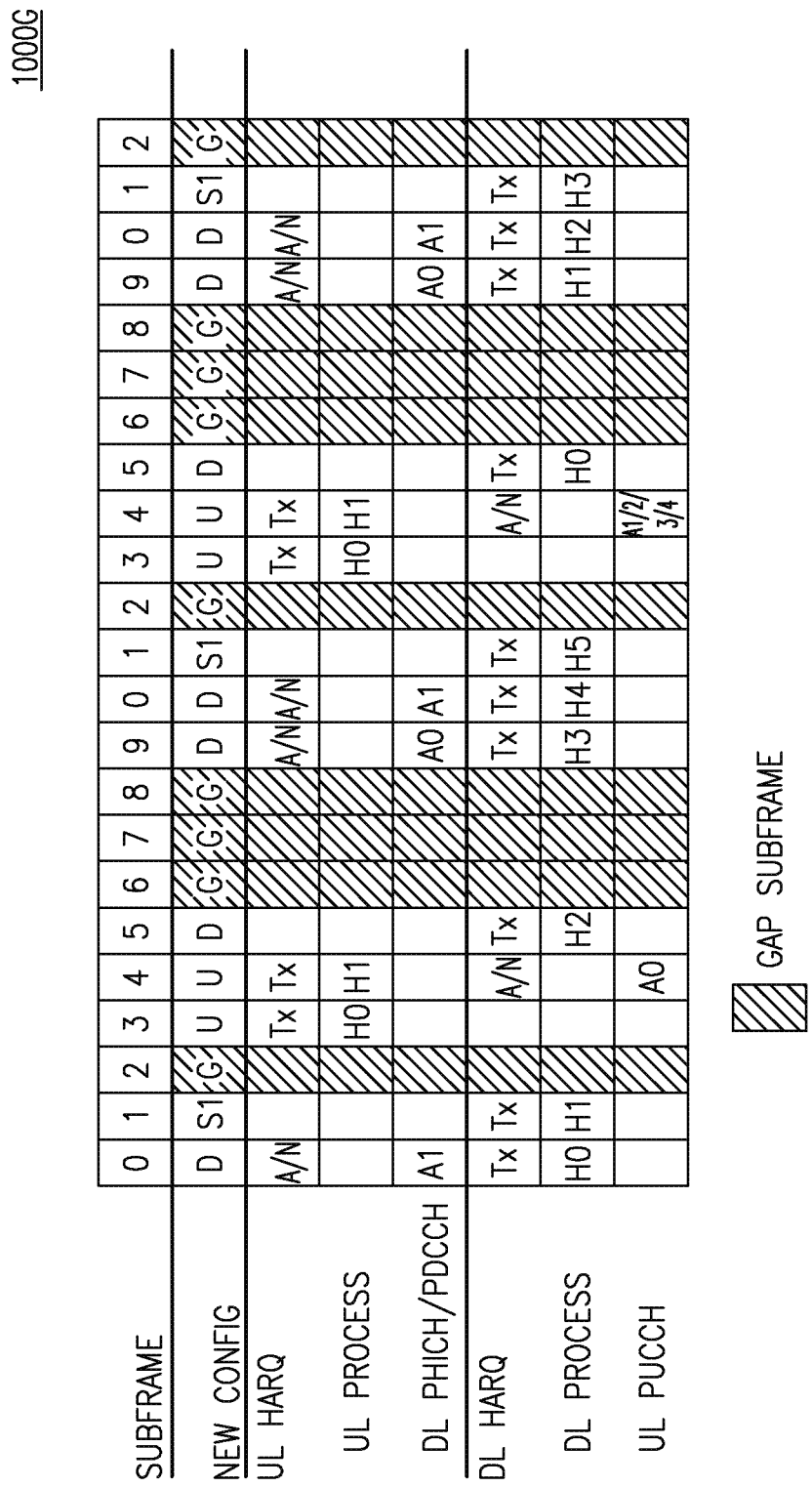
Figure 10H:
Figure 10I:
Figure 10J:
Figure 10K:
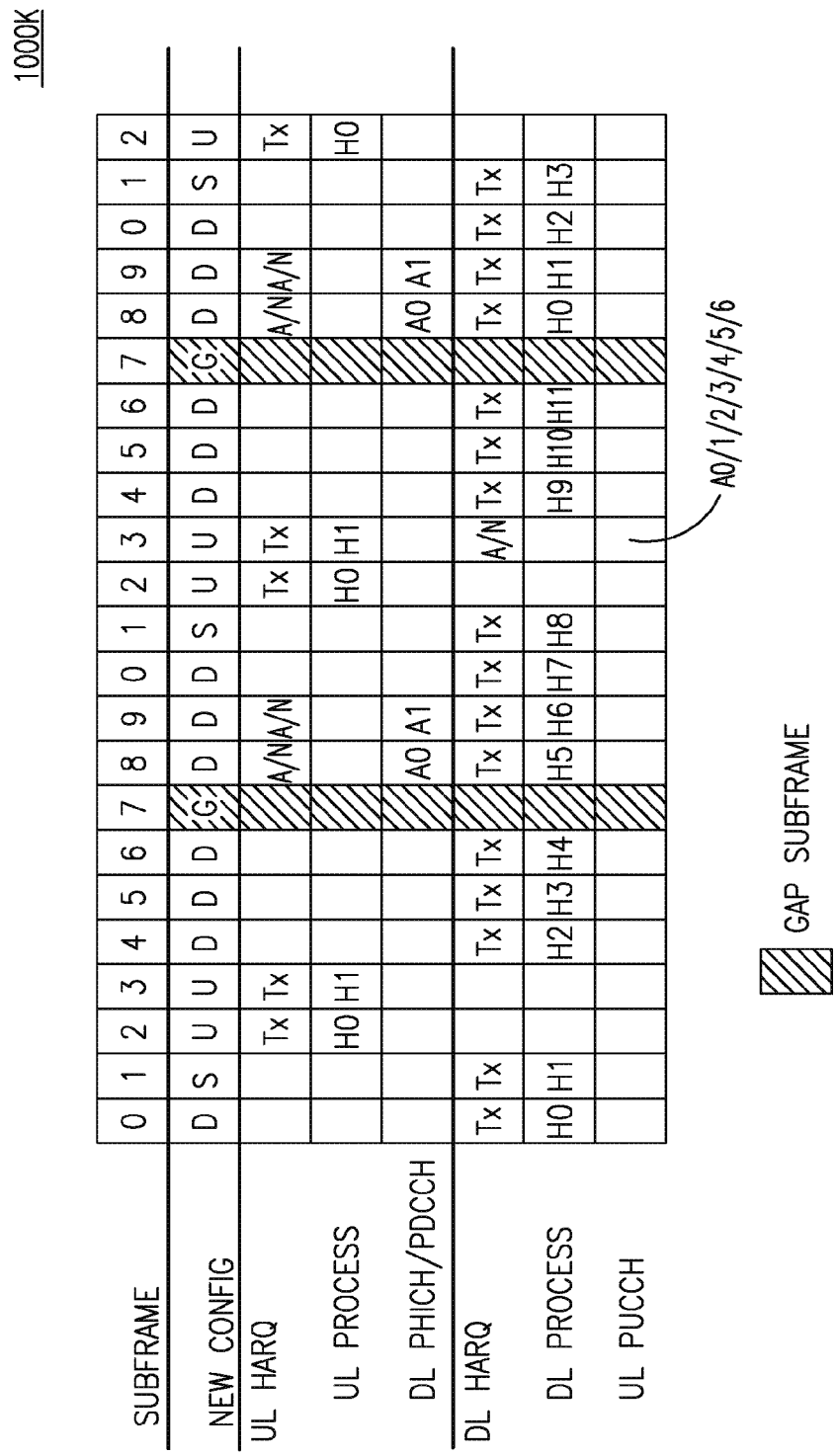
Figure 10M:
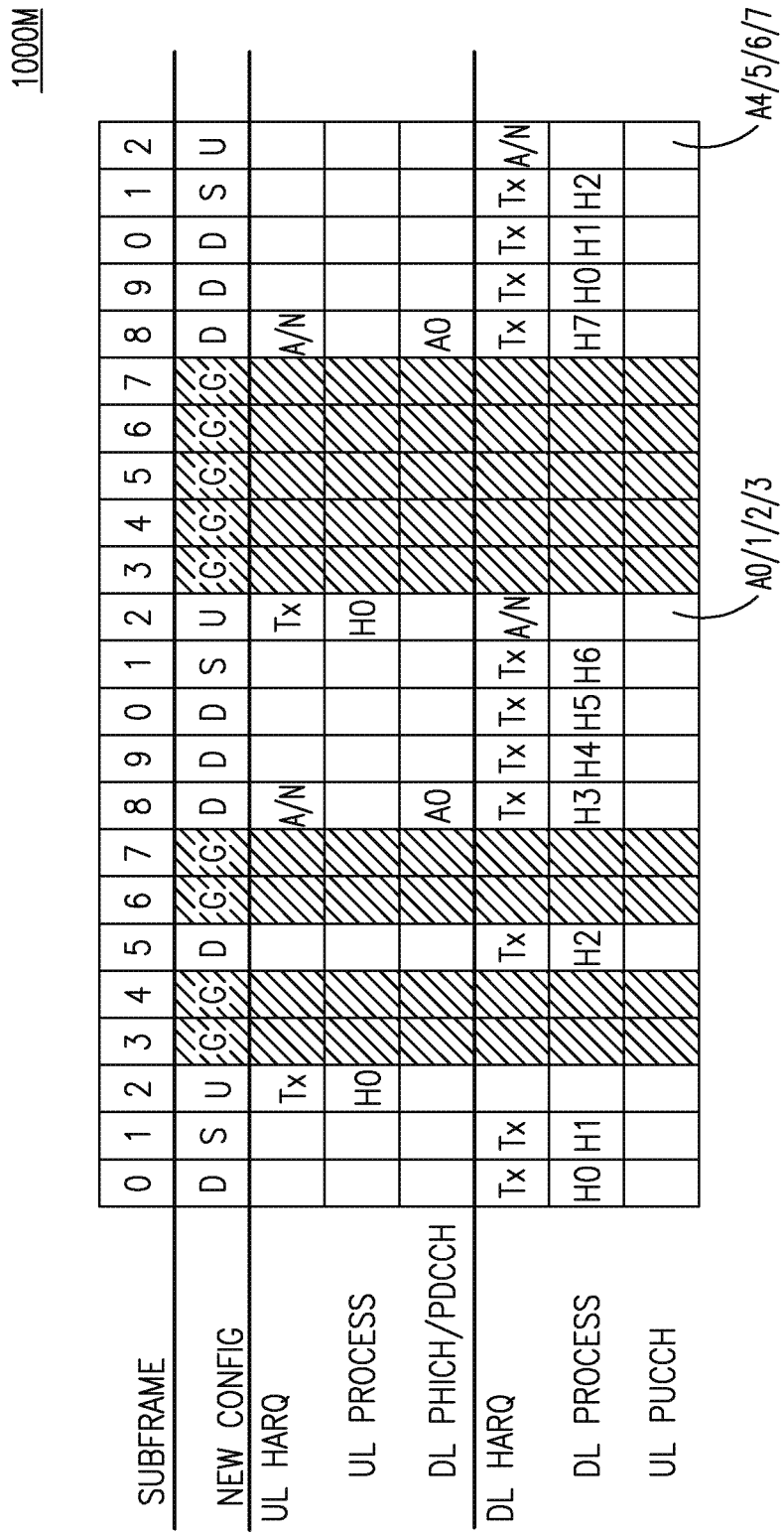
Figure 10N:
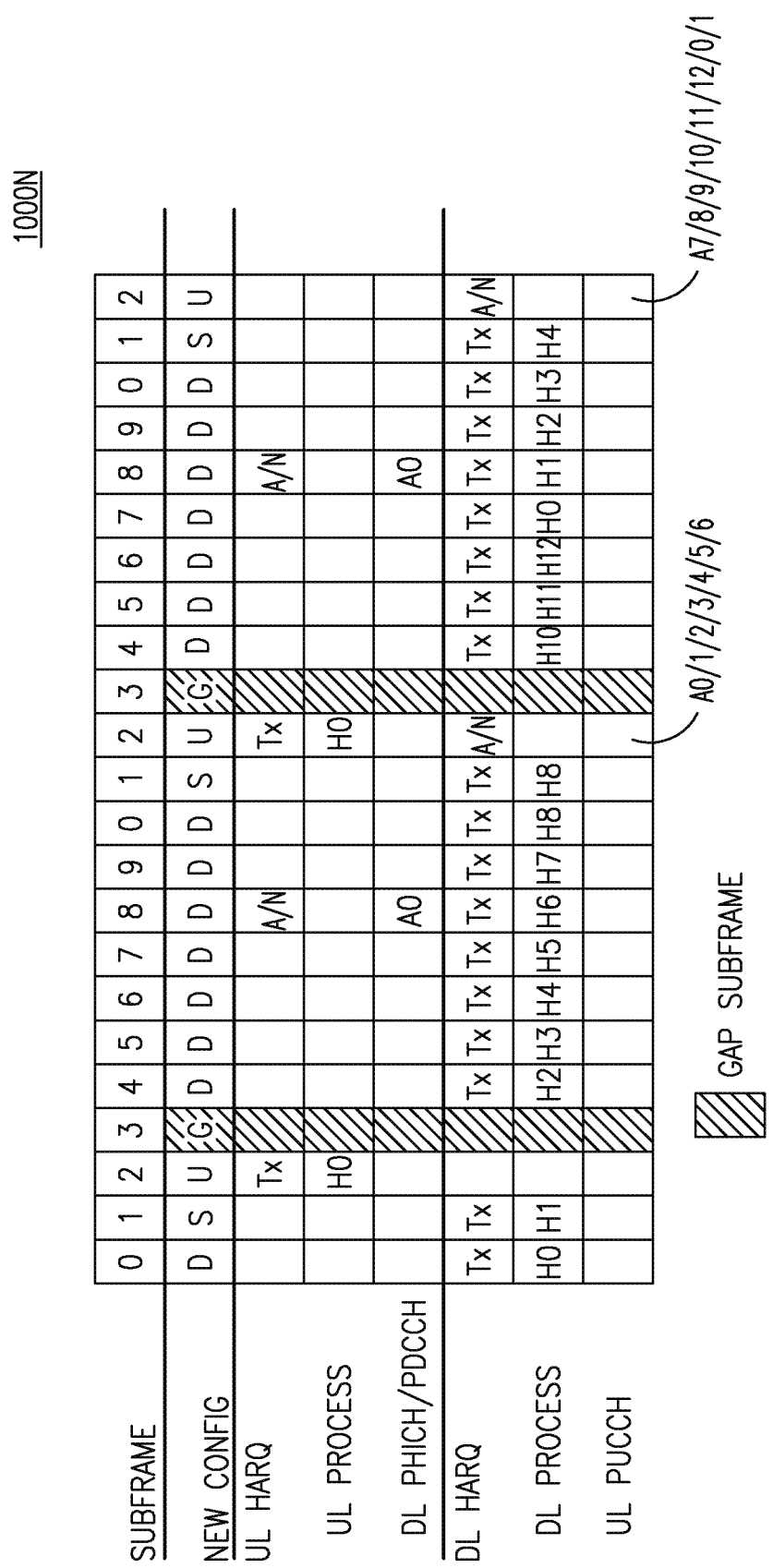

FIG. 10C is a diagram 1000C of UL HARQ and DL HARQ timing relationships and HARQ processes a high duty cycle gap pattern for TDD UL/DL configuration 2. For the high duty cycle case, and considering the use of 90% duty cycle as the target, sub-frames 6 (the special sub-frame) may be selected in order to have the minimum impact on the UL/DL ratio and provide a coexistence gap pattern that may be used when the LTE traffic is reasonably high without impacting the LTE throughput. As a result, the high duty cycle configuration may include a coexistence gap in sub-frames 6 of each frame.

In the examples illustrated in FIGS. 10A, 10B and 10C, the DL HARQ timing is also modified despite all UL sub-frames still being available for transmission of DL HARQ ACK/NACK in order to avoid problems that may stem from a change in duty cycle by a system. A system may need to transition between low, medium, and high duty cycle configurations as the detected WiFi traffic on the channel changes. Some of the methods used to signal a change in duty cycle may not guarantee errorless signaling of a duty cycle change. If the HARQ timing (e.g., which ACK/NACK is associated with which DL transmissions) were to change dynamically during operation of the system, there may be a reasonable risk that a WTRU may transmit the HARQ ACK/NACK associated with a given sub-frame at the wrong time following a request to change the duty cycle. It may also mean that a WTRU may need to keep separate DL HARQ tables for each duty cycle, which may increase implementation complexity compared to using a single DL HARQ timing that is consistent across the duty cycles configured. Accordingly, in the illustrated embodiment, the DL HARQ timing is fixed across the different UL/DL configurations (high, medium and low). As a result, definition of the DL HARQ timing for a given UL/DL configuration may be dictated by the low or medium duty cycle. When both the low and medium duty cycles have the same number of available UL sub-frames, the timing may be constrained by either of them; otherwise, the timing may always be constrained by the low duty cycle.

In another embodiment, the system may support only the medium and high duty cycle coexistence gaps and, accordingly, may not configure a low duty cycle coexistence gap. In this case, the DL HARQ timing may be designed for the medium duty cycle, and the DL HARQ timing for the high duty cycle may be designed so as not to change when a change in the duty cycle occurs. This same alternate embodiment may be used for each of the TDD UL/DL configurations 1-5.

In another embodiment, the system may support different DL HARQ timings depending on the currently configured duty cycle. In that case, the system may need to change the DL HARQ timing when the duty cycle is changed. This is shown as option 2 in FIG. 10C.

Figure 10O:

FIGS. 10D, 10E, 10F, 10G, 10H, 10I, 10J, 10K, 10L, 10M, 10N and 10O are diagrams 1000A, 1000B, 1000C, 1000D, 1000E, 1000F, 1000G, 1000H, 1000I, 1000J, 1000K, 1000L, 1000M, 1000N and 1000O of UL HARQ and DL HARQ timing relationships and HARQ processes for high, medium and low duty cycle gap patterns for TDD UL/DL configurations 1, 3, 4 and 5, which were developed using the above-described procedures While specific examples of duty cycle gap patterns are illustrated in FIGS. 10A-10O, other embodiments may be implemented following the same procedure and may easily be derived by someone skilled in the art following such procedures.

Figure 11A:
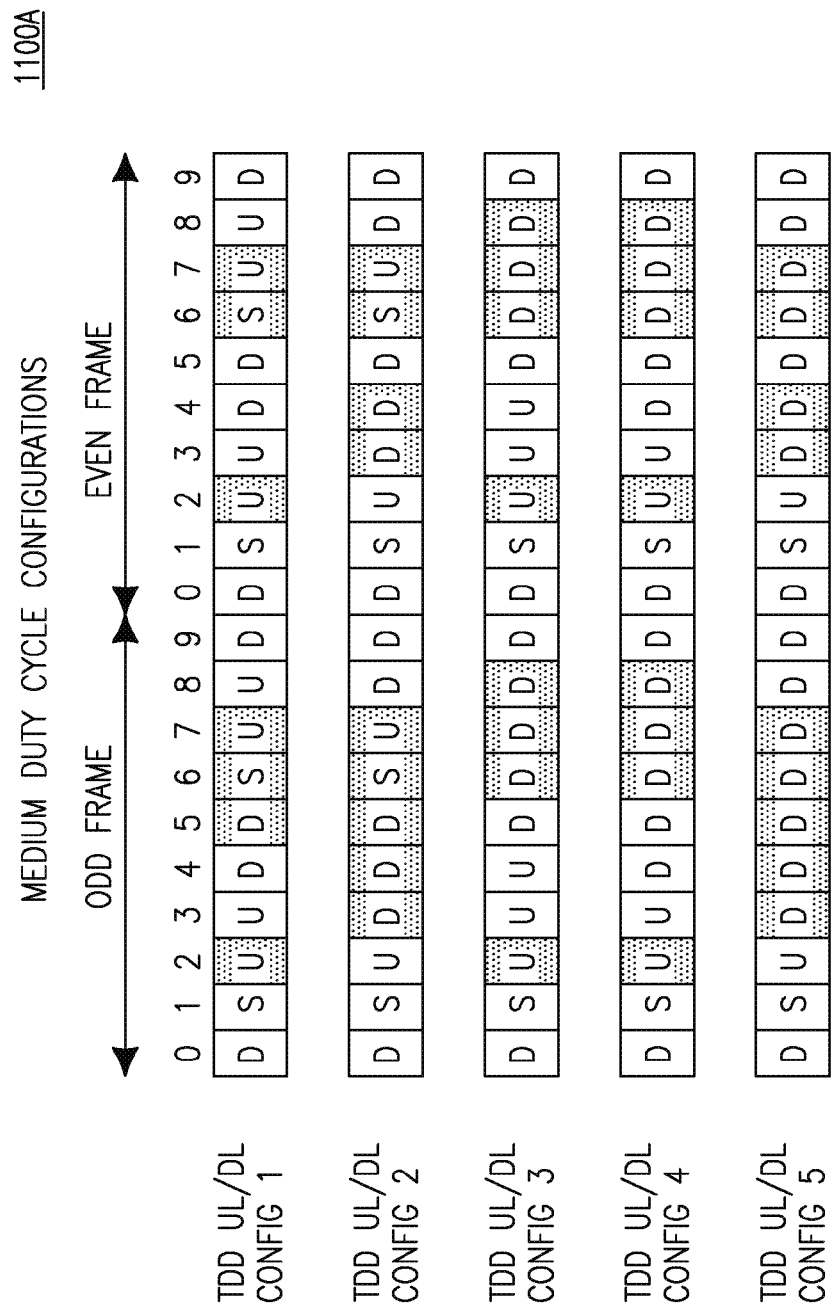
FIGS. 11A, 11B and 11C are diagrams of the gap configurations for each of TDD UL/DL configurations 1-5 for medium, high and low duty cycles, respectively.
Figure 11B:
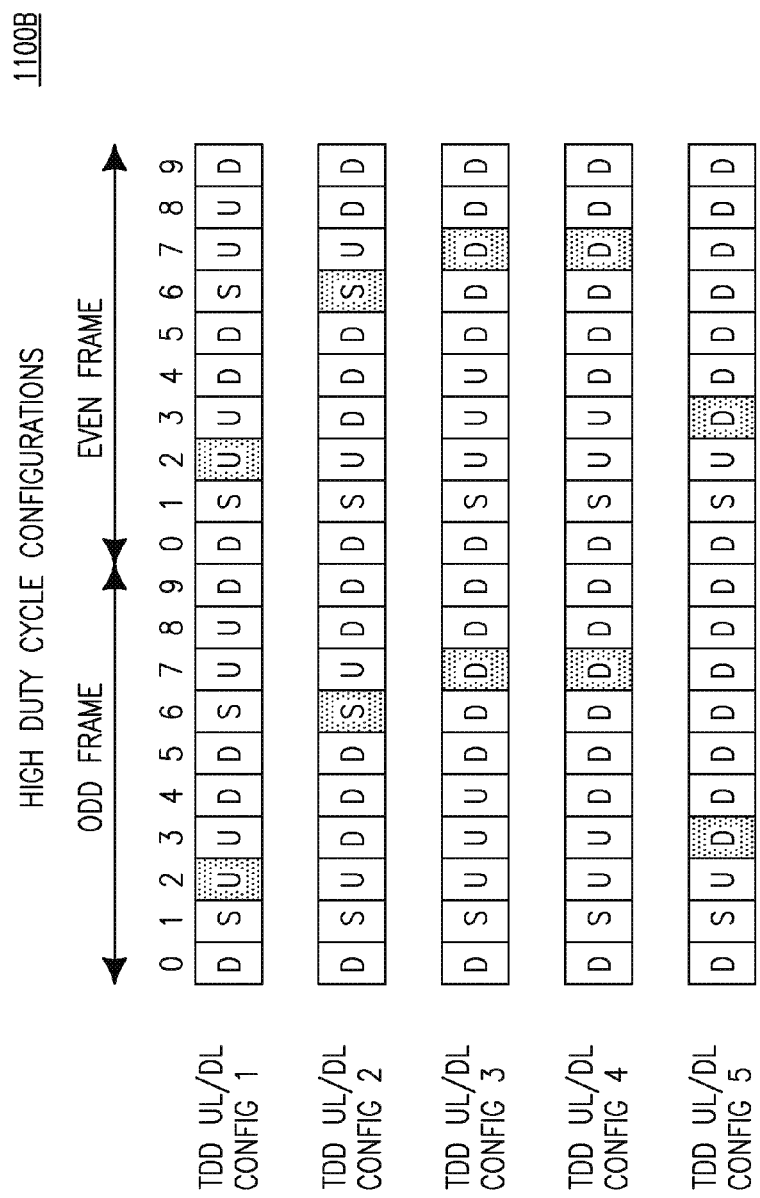
Figure 11C:
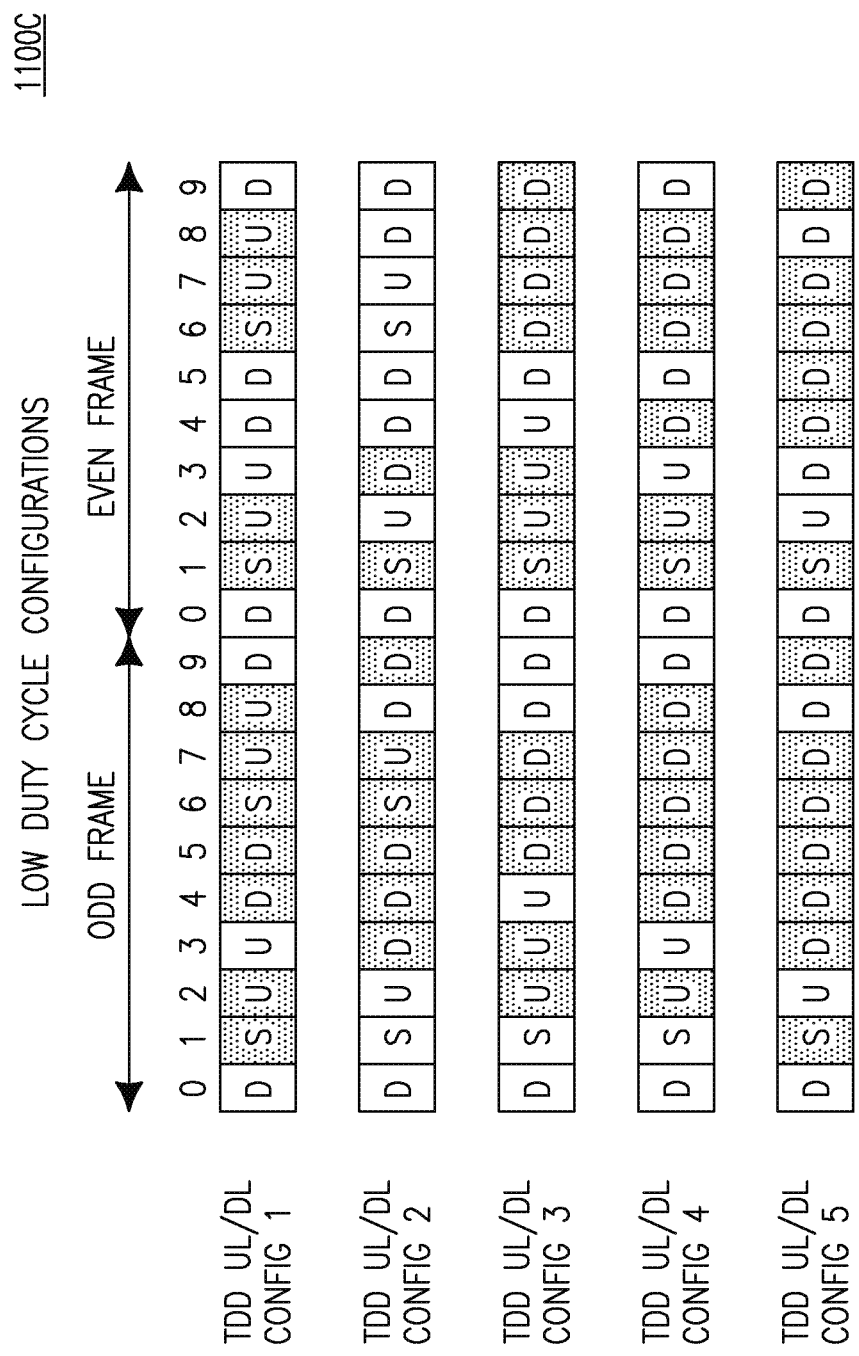

FIGS. 11A, 11B and 11C are diagrams 1100A, 1100B and 1100C of the gap configurations for each of TDD UL/DL configurations 1-5 for medium, high and low duty cycles, respectively. The coexistence gaps are shaded in the sub-frames. As illustrated in FIGS. 11A, 11B and 11C, there are similarities in the gap configurations between different TDD UL/DL configurations since many of the constraints used are the same across configurations. For example, the medium duty cycle patterns for configurations 2 and 5, as well as configurations 3 and 4, are the same. The difference in the gap configuration between the odd and even frames may be eliminated by ensuring that sub-frame 5 does not fall in a gap. However, in this scenario, flexibility with the target duty cycle percentage and WiFi performance may suffer as a result. Further, following the introduction of coexistence gaps, several different TDD UL/DL configurations (especially for the medium and low duty cycles) tend to have the same UL/DL ratio. It may also be possible for an overall design to consolidate these UL/DL configurations and have a system operating in DSS actually support a reduced set of TDD UL/DL configurations.

With respect to TDD UL/DL configurations 0 and 6, these configurations have a UL RTT that is larger than 10 sub-frames. Accordingly, for these configurations, a UL process may occupy a different sub-frame for any given frame, which may make it difficult to remove a UL process as was done for configurations 1-5 since every UL process will move to a different sub-frame from one frame to the next. In addition, since configurations 0 and 6 are balanced or UL heavy configurations, it may be difficult to create a reasonable gap configuration by removing only DL sub-frames.

In one embodiment, the gap pattern for configurations 0 and 6 may be defined over several frames instead of over a single frame as was done for configurations 1-5. The blank sub-frames used on a particular frame may, therefore, change from one frame to the next in order to follow the HARQ process movement from one frame to the next. As a result, the gap pattern may be defined over a number of frames, which may be equal to the repetition period associated with the placement of the HARQ process numbers to each sub-frame (e.g., 7 frames for configuration 0 and 6 frames for configuration 6). In defining these configurations, a DL sub-frame with no corresponding UL sub-frame to send HARQ ACK in may be used. For this sub-frame, the eNB may either not transmit DL data or may assume NACK on any data transmission sent on this sub-frame.

In another embodiment, the LTE Release 8 and 10 HARQ timing may be changed, and the same coexistence gap pattern may be kept in each frame. Here, a new UL HARQ timing may be defined, which may change on a frame-by-frame basis.

Figure 12A:
FIGS. 12A, 12B and 12C are diagrams of UL HARQ and DL HARQ timing relationships and HARQ processes for medium, high and low gap patterns, respectively, for TDD UL/DL configuration 6.
Figure 12B:
Figure 12C:
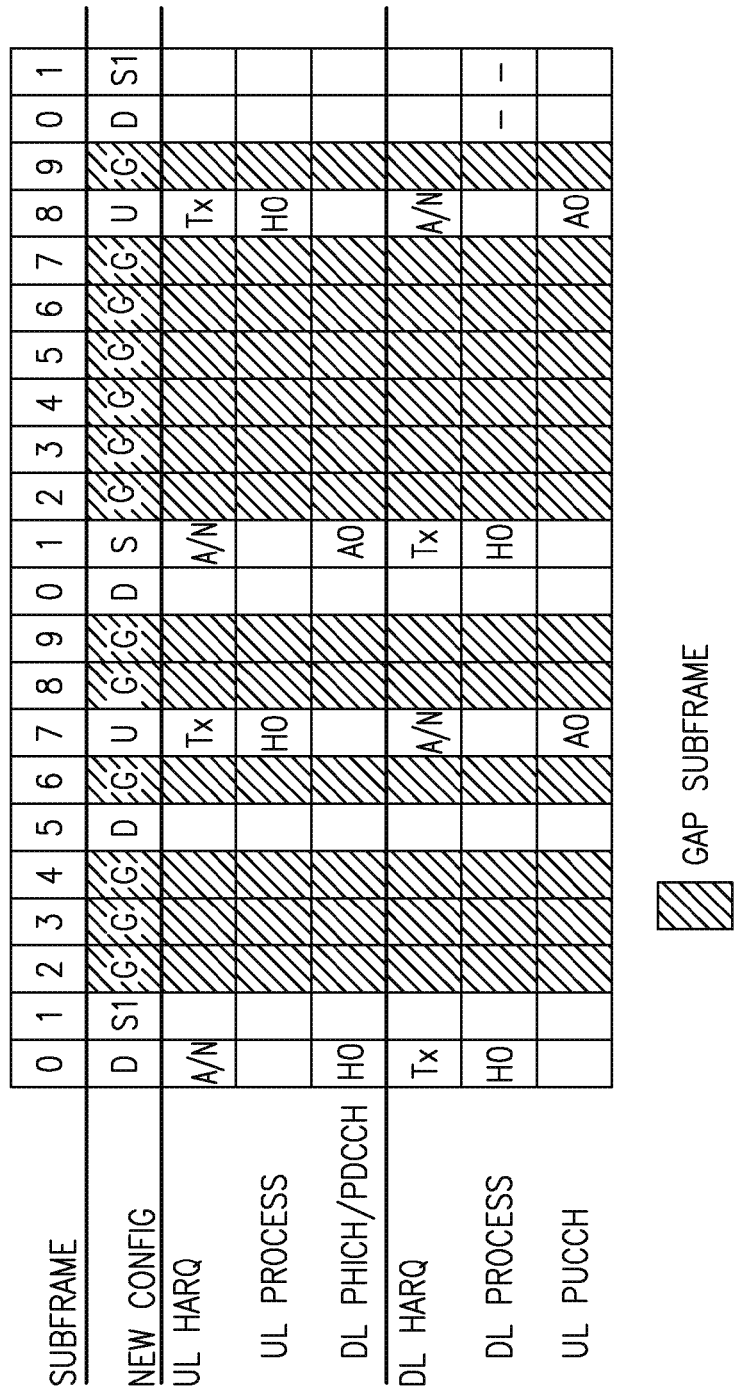

FIGS. 12A, 12B and 12C are diagrams 1200A, 1200B and 1200C of UL HARQ and DL HARQ timing relationships and HARQ processes for medium, high and low gap patterns, respectively, for TDD UL/DL configuration 6. As can be seen from the first two frames shown in FIGS. 12A, 12B and 12C, the gap pattern is changed on a per-frame basis to avoid collision of the maintained HARQ process retransmissions and the chosen gap pattern. The overall gap pattern that results is, therefore, defined over a period of 6 frames since this is the periodicity of the UL HARQ processes, which is the number of frames required for the HARQ processes to return to their initial sub-frame position.

In addition, since a single ACK/NACK is sent for each UL sub-frame for the DL HARQ, the DL HARQ timing from LTE Releases 8 and 10 may be used by introducing, on average, one DL sub-frame that is un-usable for data transmission (e.g., the DL sub-frame does not fall in the coexistence gap but can not be scheduled by the eNB for data due to the lack of corresponding non-gap UL sub-frame to carry ACK/NACK). For example, in FIG. 12A, sub-frame 0 of the second frame may not be used for data transmission because of the lack of a corresponding UL sub-frame that may send ACK/NACK. This sub-frame may still, however, be used to transmit SI (e.g., MIB and SIBs other than SIB1).

As an alternative to using a sub-frame that may not be used for data transmission, DL data may be transmitted in sub-frame 0 (e.g., a DL HARQ process may be used in sub-frame 0) but an ACK/NACK may not be sent for this process by the WTRU. Here, the eNB may assume a NACK for this DL transmission and transmit a new redundancy version for the same transport block at the next available opportunity for the DL HARQ process. The WTRU may then use the data received for both redundancy versions (e.g., using soft combining) to decode the transport block before sending the ACK/NACK to the second transmission. The same embodiment may be applied for other cases that may not use sub-frames that may not be used for data transmission (e.g., TDD UL/DL configuration 0 and other duty cycles for TDD UL/DL configuration 6).

Figure 13A:
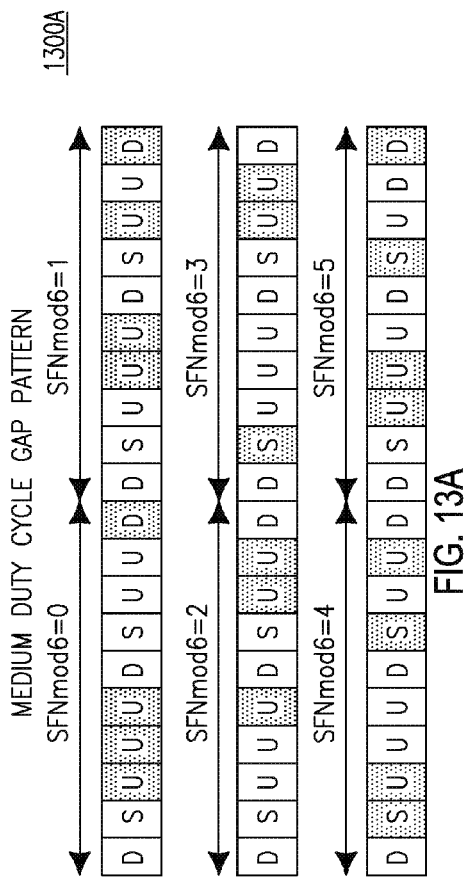
FIGS. 13A, 13B and 13C are diagrams of medium, high and low duty cycle gap patterns, respectively, for TDD UL configuration 0.
Figure 13B:
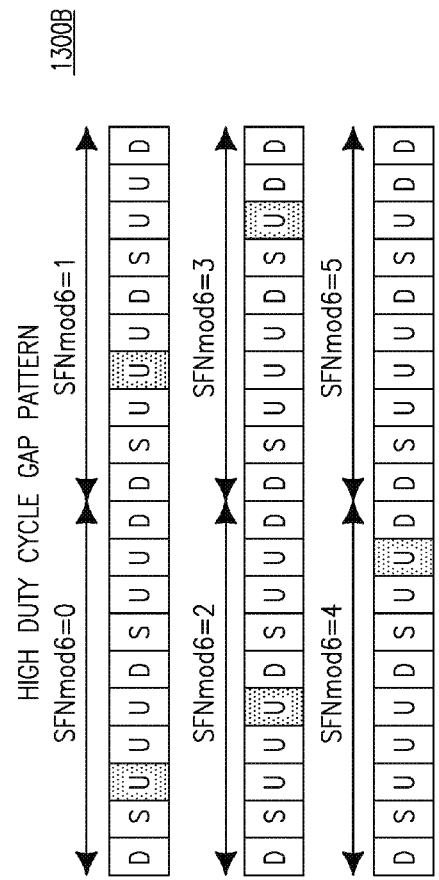
Figure 13C:
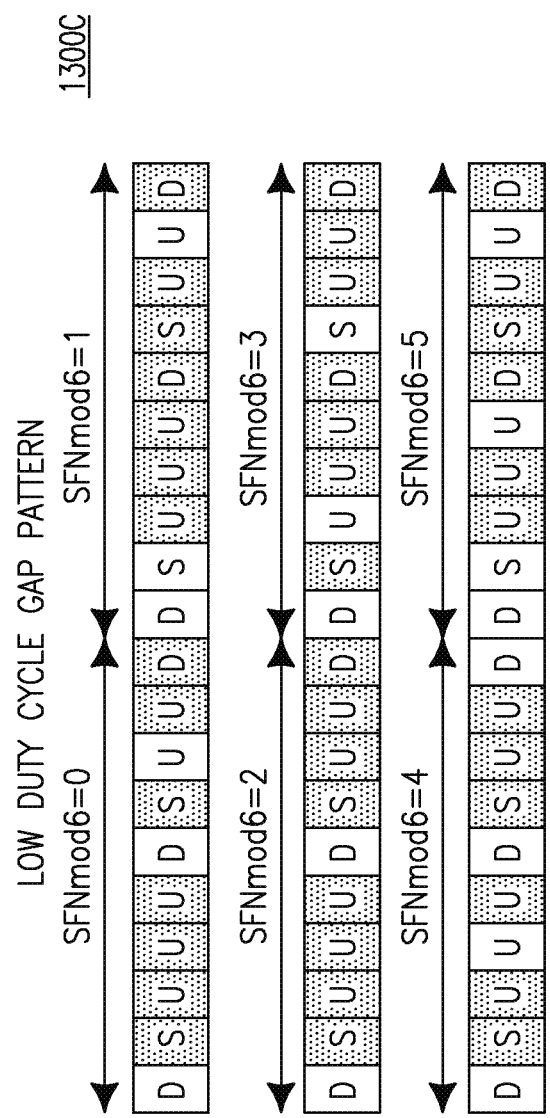

FIGS. 13A, 13B and 13C are diagrams 1300A, 1300B and 1300C of medium, high and low gap patterns, respectively, for TDD UL configuration 0. Shaded sub-frames are part of the coexistence gap. A sub-frame with gradual shading is used to denote the new special sub-frame (S1).

For the embodiment where UL HARQ timing is changed in order to create coexistence gaps that do not change from one frame to another, both the UL HARQ RTT and timing may be changed to take into account the presence of the coexistence gaps. In addition, the UL HARQ timing may also be changed dynamically from one duty cycle to another. A coexistence gap for each of the high, medium and low duty cycles, as well as new UL HARQ timing that changes from one frame to the next, may be defined by one of ordinary skill in the art by applying the procedures described herein.

Figure 14A:
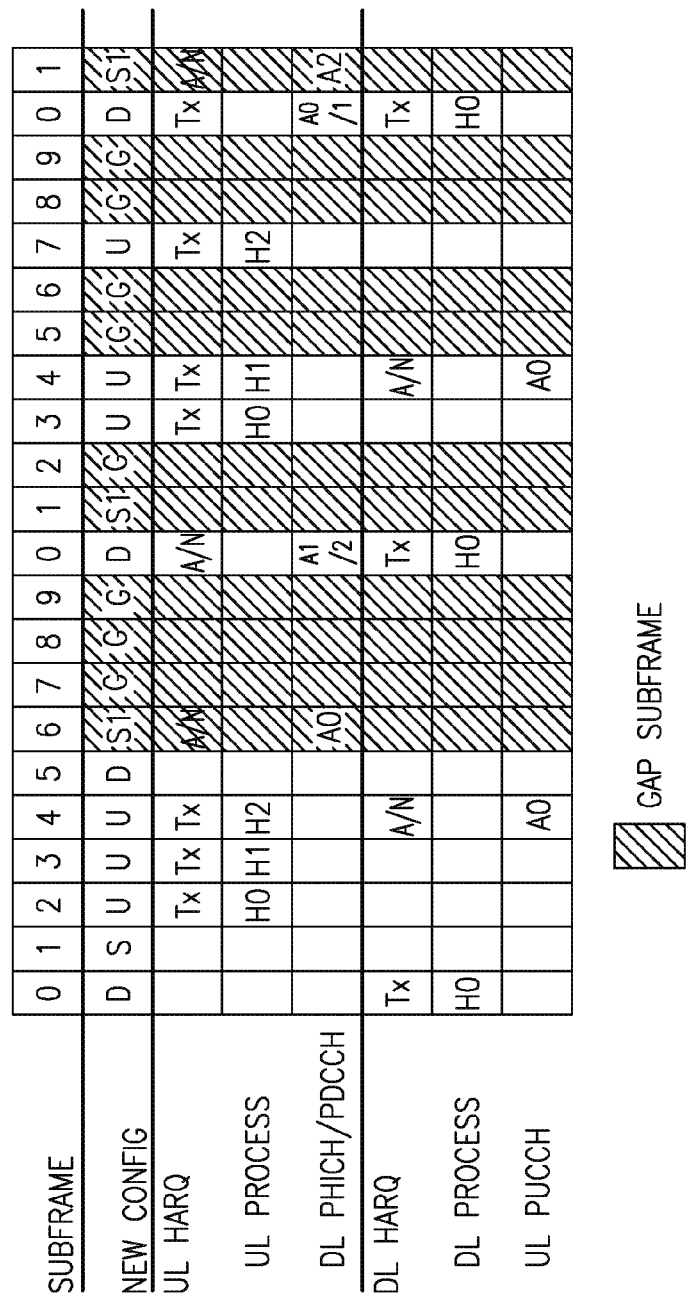
FIGS. 14A, 14B and 14C are diagrams of UL HARQ and DL HARQ timing relationships and HARQ processes for medium, high and low gap patterns, respectively, for TDD UL/DL configuration 0.
Figure 14B:
Figure 14C:
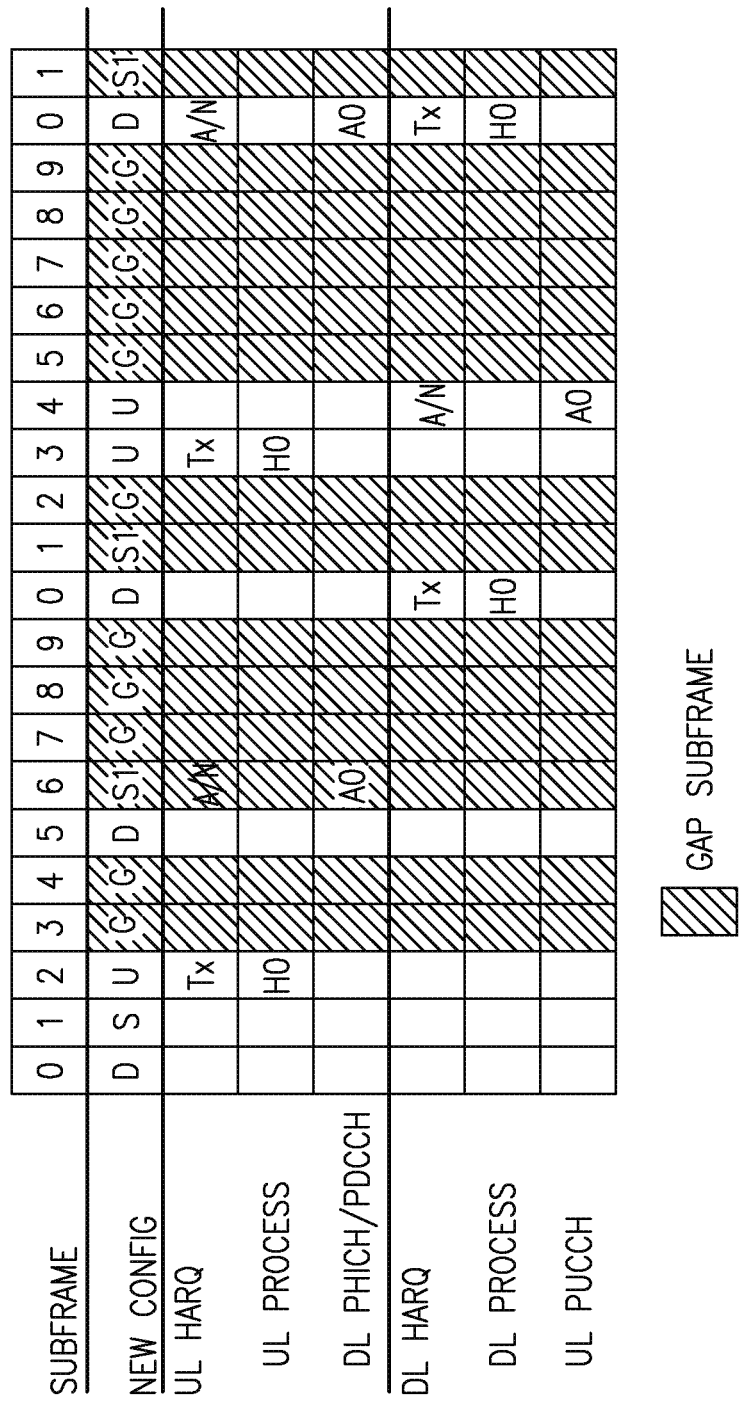
Figure 15A:
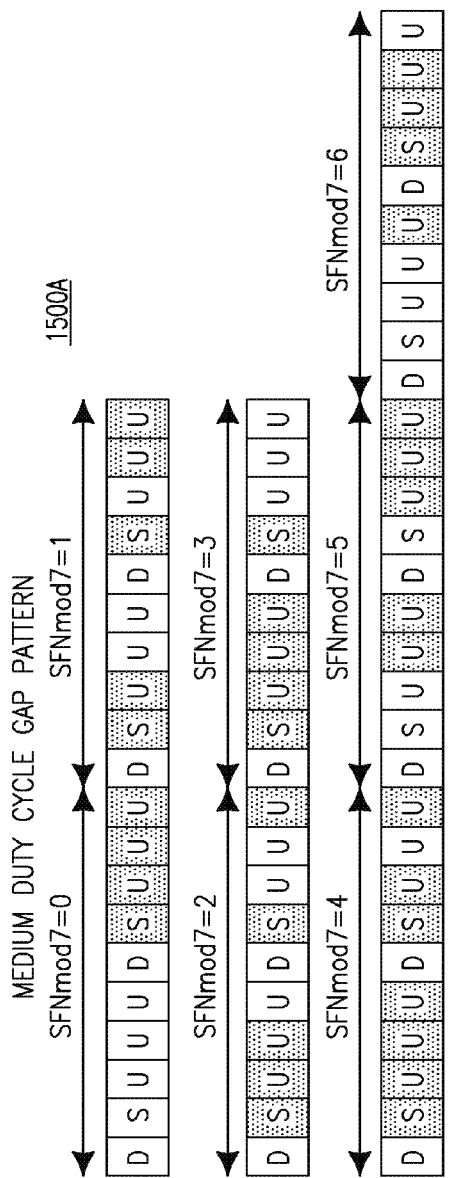
FIGS. 15A, 15B and 15C are diagrams of medium, high and low duty cycle gap patterns for TDD UL configuration 0.
Figure 15B:
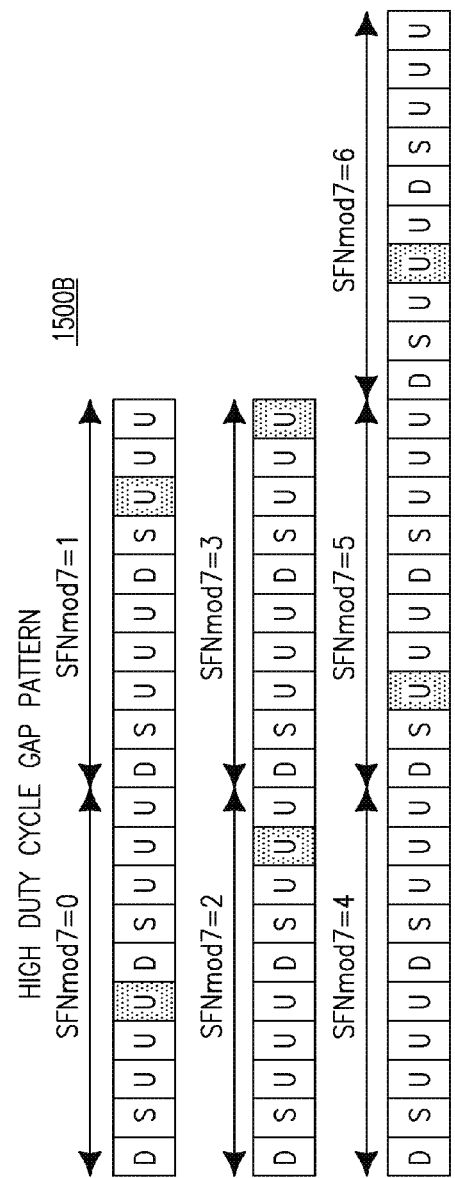
Figure 15C:
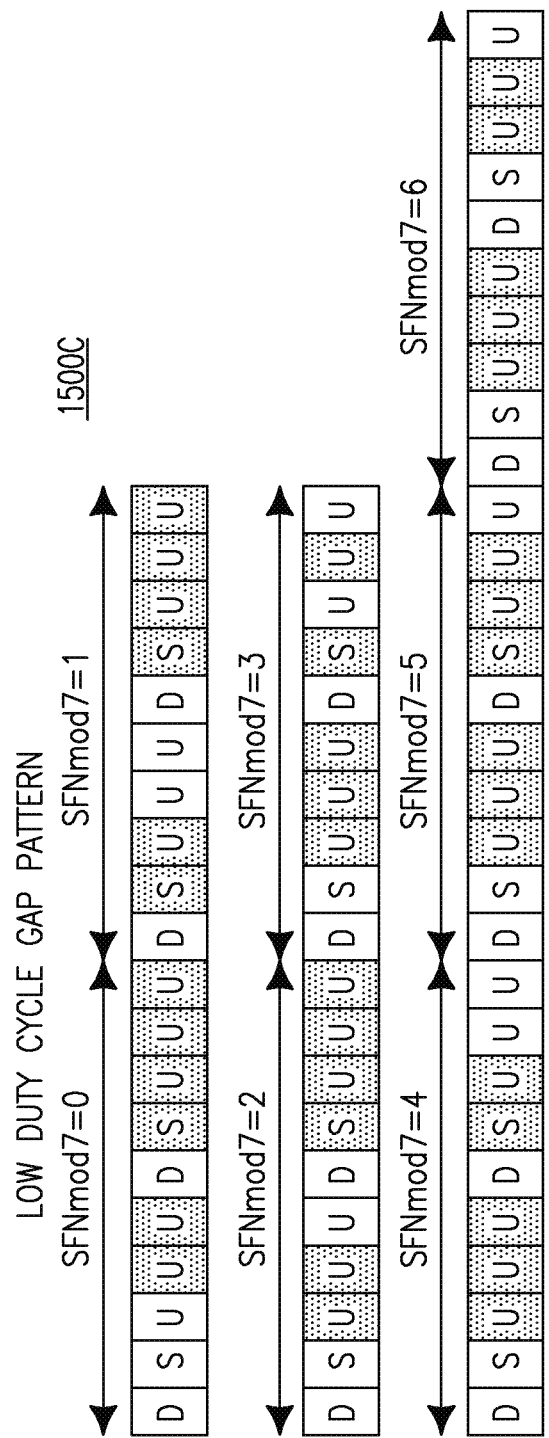

FIGS. 14A, 14B and 14C are diagrams 1400A, 1400B and 1400C of UL HARQ and DL HARQ timing relationships and HARQ processes for medium, high and low gap patterns, respectively, for TDD UL/DL configuration 0. The gap patterns for configuration 0 may be similar to the gap patterns for configuration 6 illustrated in FIGS. 12A, 12B and 12C except that the configuration 0 repetition pattern is 7 frames instead of 6 and DL HARQ timing remains fixed but with a larger number of sub-frames that are un-usable for data transmission. The corresponding medium, high and low gap patterns for TDD UL configuration 0 are given in diagrams 1500A, 1500B and 1500C in FIGS. 15A, 15B and 15C.

A sub-frame based approach to coexistence gaps may also be applicable to new carrier type (NCT). In one embodiment, an eNB may ensure that no DL or UL transmission occurs during the coexistence gap. This may be done, for example, through smart scheduling, limited configuration of RACH occasions, CSI RS, SRS, etc. Corresponding coexistence gap patterns may be defined in such a way that the sub-frames on which the CRS is to be transmitted based on NCT (e.g., every 5 ms) occurs on sub-frames that do not fall on a gap. In another embodiment, procedures defined above for sub-frame based approaches may be applied despite the use of NCT.

For the embodiment of NCT where the eNB ensures that no DL or UL transmission occurs during the coexistence gap, gap patterns defined above may be used and modified such that sub-frames 0 and 5 are non-gap sub-frames under the assumption that the CRS is transmitted on the NCT in sub-frames 0 and 5. Here, the eNB may decide to not signal the coexistence gap to the WTRUs, and the WTRUs may continue to decode the PDCCH on gap sub-frames. Alternatively, the eNB may signal the coexistence gap to the WTRUs so that the WTRUs may abstain from decoding PDCCH during gap sub-frames. This may achieve both power savings and also avoid falsely detected PDCCH, which may result in data decoding errors or unexpected WTRU UL transmissions.

For the embodiment of NCT where procedures defined above for sub-frame based approaches are applied despite the use of NCT, the eNB may not need to further restrict, for example, RACH and CSI-RS configurations. The WTRU may simply be aware, for example, that RACH may not be allowed on sub-frames that fall in a gap. The CRS may then be transmitted as defined for NCT (e.g., every 5 ms). If transmission of the CRS would not adversely impact the coexistence gaps, the current definition of NCT with respect to CRS and PSS/SSS may be maintained. Alternatively, the frequency of occurrence of CRS and/or PSS/SSS may be reduced, or transmissions of CRS and PSS/SSS may be avoided when they coincide with a gap. For example, assuming the CRS on the NCT is transmitted in sub-frames 0 and 5, the PSS/SSS and CRS may be transmitted only in sub-frame 0 in configurations where sub-frame 5 is a gap sub-frame.

Gap configurations defined using a sub-frame based approach may result in a DL HARQ timing that requires more than four DL sub-frame to be acknowledged with a single UL frame. In an embodiment, the number of sub-frames to be acknowledged may not exceed 9 (e.g., for LTE Release 8 embodiments), which may result in restricting the WTRU to using only bundling and may have some performance impacts. In an embodiment, a new partial temporal bundling may be used that reflects the current association table and allows multiplexing to be used to some extent. In another embodiment, multiple PUCCH resources may be used on a single sub-frame for sending ACK/NACK. In another embodiment, temporal bundling may be used when necessary to account for the additional bits that may need to be sent.

For the embodiment where a new partial temporal bundling may be used, instead of taking the approach where bundling is applied to the entire new association table, ACK/NACK may be sent by applying temporal bundling only partially to the sub-frames according to the LTE Release 8 association table, and the resulting bundled ACK/NACK bits may then be sent using PUCCH format 1a/1b or 1b with channel selection, as applicable. As a result, the transmission of ACK/NACK in a UL sub-frame where more than four ACK/NACK bits may need to be transmitted may include performing bundling across sets of up to four of the ACK/NACK bits and transmitting the ACK/NACK bits using multiplexing (e.g., format 1a or format 1b with channel selection). This may avoid bundling across a window of an entire frame, which may be required if LTE Release 8 and 10 rules were applied to the DL HARQ timings derived for the configurations with coexistence gaps. This may also improve the performance of the system.

Although it is expected that the PHY may require some changes compared to LTE Release 8, the group of bundled ACK/NACK bits may be defined such that they correspond to the LTE Release 8 association table and, therefore, minimize the change to the current implementation of the standards. In particular, a WTRU may already have the capability to perform the temporal bundling required to perform bundling across sets of up to four of the ACK/NACK bits and across the same sub-frames.

Table 4 below provides the LTE Release 8 and coexistence gap association set for low, medium and high duty cycles for configuration 4.

TABLE 4

| | Sub-frame n | | | | | | | | | |
|---|---|---|---|---|---|---|---|---|---|---|
| | 0 | 1 | 2 | 3 | 4 | 5 | 6 | 7 | 8 | 9 |
| LTE Release 8 | — | — | 12, 8, 7, 11 | 6, 5, 4, 7 | — | — | — | — | — | — |
| New - High Duty Cycle | — | — | — | 4, 5, 7, 8, 9, 12, 13 | — | — | — | — | — | — |
| New - Medium duty cycle | — | — | — | 4, 8, 9, 12, 13 | — | — | — | — | — | — |
| New - Low duty cycle | — | — | — | 4, 8, 13 | — | — | — | — | — | — |

In Table 4, the association set indices 12, 8, 7 and 11 for the LTE Release 8 (in the second row of the table) and the association set indices 9, 12 and 13 for the coexistence gap association set (in rows 3, 4, and 5 of the table) correspond to the same DL sub-frames. The one sub-frame offset in the indices are due to the fact that the ACK/NACK for these sub-frames is now being sent one sub-frame later.

For LTE Release 8, the WTRU may be configured to perform at least one of sending the four ACK/NACK bits in sub-frame 2 and sub-frame 3 using multiplexing and format 1b with channel selection (spatial bundling may be used across transport blocks for a single TTI), bundling each of the four ACK/NACK bits in each sub-frame to create a single bit in each of the two sub-frames and sending that bit using either format 1a (single transport block) or format 1b (TX diversity), or using multiplexing and format 3 to send the ACK/NACK bits if multiple cells are configured.

The WTRU may first perform bundling across the indices corresponding to the sub-frames that may have been bundled in LTE Release 8 had the WTRU been configured with bundling. For the high duty cycle (row 3 of the table), ACK/NACK for indices 4,5,7,8 may be bundled into a single ACK/NACK, and sub-frames 9, 12, and 13 may be bundled into a single ACK/NACK. The two ACK/NACK bits may then be sent using format 1b with channel selection using LTE Release 8 rules (these rules support up to 4 bits). Similarly, in the low duty cycle (row 5 of the table), indices 4 and 8 may be bundled to create a single ACK/NACK bit, and index 13 may be considered as is without bundling. The two ACK/NACK bits may be sent using format 1b with channel selection.

Format 3 may also be used with the same scheme. Since the total number of bits being sent in each UL sub-frame is less than 4, the following may be used for format 3. If TX diversity is being used, the WTRU may not be required to perform spatial bundling, and separate ACK bits may be sent for each transport block where a maximum number of cells are being transmitted. Further, the number of bits used for format 3 may be halved by creating a new format and requiring spatial bundling to be used if the number of ACK/NACK bits exceeds 10.

For the embodiment where multiple PUCCH resources are used on a single sub-frame for sending ACK/NACK, the number of resource blocks used by PUCCH may be configured semi-statically by the eNB. A PUCCH resource to be used by a WTRU may then be assigned using either the CCE index of the grant that was used or through tables that select one of multiple PUCCH resources configured by higher layers for use by the WTRU. In order to use multiplexing, the WTRU may need to send more than the maximum number of bits supported by each PUCCH format (e.g., format 1b and format 3).

Since changing the coding for a specific PUCCH format (e.g., allowing format 1b to send more than two bits) may have a significant impact on both HW and standards, a less drastic mechanism may be to define additional PUCCH resources to be used by the WTRU. For instance, the WTRU in LTE Release 8 may be assigned two separate PUCCH resources in order to transmit from different antenna ports (resources p and p+1 are assigned). In a similar fashion, the WTRU may be assigned additional resources to be used for sending multiple PUCCH resources per sub-frame. In the example given for solution 1, a similar approach may be taken to send the ACK/NACKs associated with the same set of DL sub-frames as would be used for LTE Release 8. For example, for UL/DL configuration 4 and high duty cycle, ACK/NACK for indices 9, 12, and 13 may be sent using one PUCCH resource (e.g., 1b with channel selection) and ACK/NACK for indices 4, 5, 7 and 8 may be sent using a different PUCCH resource.

For the embodiment where temporal bundling may be used when necessary to account for the additional bits that may need to be sent, bundling may be used to solve the increase in the number of ACK bits to be sent. As a result, there may be no changes made with respect to LTE Release 8 except for placing restrictions on using bundling only in certain configurations (e.g., rather than allowing the eNB to configure either of the two approaches). The HW/SW impacts may, therefore, be restricted to redefining procedures for low, medium, and high duty cycles.

For a single serving cell using PUCCH format 1b, bundling may be used more often with the new gap configurations than may be used in LTE Releases 8 and 10. For instance, an LTE Release 8 or 10 LTE served by single cell may not use spatial bundling (except in configuration 5). With gap configurations defined herein, spatial bundling may be required in UL/DL configuration 1 (for medium and high duty cycles), UL/DL configuration 2 (for medium and high duty cycles), UL/DL configuration 3 (for high duty cycle) and UL/DL configuration 4 (for medium and high duty cycles).

In another embodiment, coexistence gaps may be defined as a transparent frame (frame-based approach) or an integer number of transparent frames. For example, a full LTE frame (e.g., 10 ms) may be defined as a blank frame with no transmissions in either the UL or DL during the blank frame. Since the coexistence gap in this embodiment is defined on an entire frame, the resulting gap patterns may be independent of the TDD UL/DL configuration and may have a minimal impact on HARQ and other transmission timing rules.

Because the TDD UL/DL configuration may be repeated in each frame, in a frame-based approach, a gap that spans over an entire frame or an integer number of frames may make it easier to adapt the timing and rules of the TDD HARQ in such a manner that the HARQ timing may be delayed by exactly the number of frames in the coexistence gap. As a result, in an embodiment, the existing HARQ rules (e.g., LTE Release 8 HARQ rules) may be used for the timing of grants, transmissions and acknowledgements, with the added condition that counting of sub-frames associated with this timing may be frozen on frames that are part of the coexistence gap.

Figures 16A, 16B:
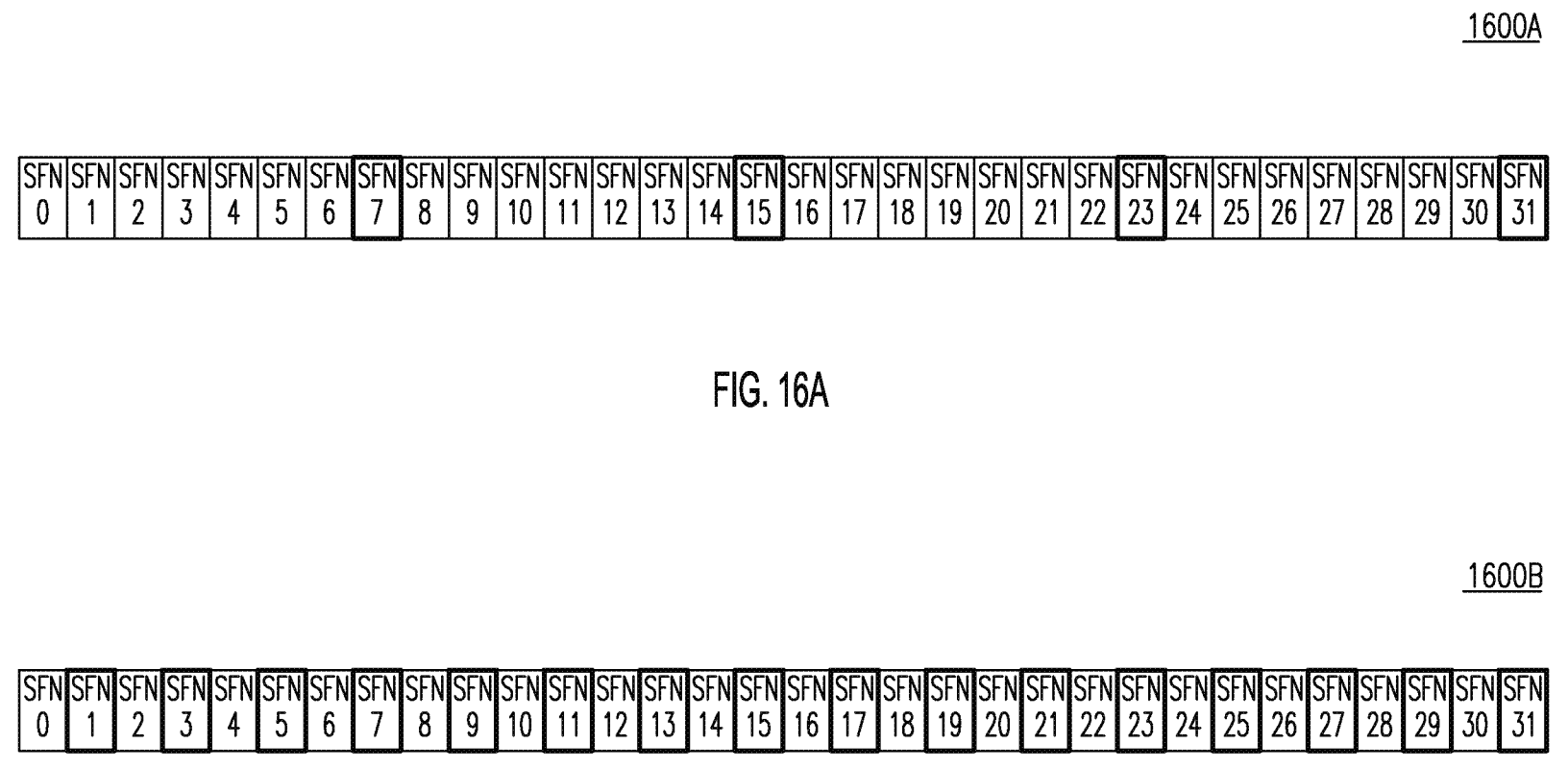

FIG. 16A is a diagram of a high duty cycle coexistence gap pattern 1600A for a frame-based approach to defining coexistence gap patterns. The illustrated high duty cycle coexistence gap pattern 1600A includes a number of consecutive frames, each of which is assigned an SFN 1-31. At least one of the frames may be a transparent frame. In the illustrated example, frames with SFNs 7, 15, 23 and 31 have been designated as the transparent frames.

FIG. 16B is a diagram of a medium duty cycle coexistence gap pattern 1600B for a frame-based approach to defining coexistence gap patterns. The illustrated high duty cycle coexistence gap pattern 1600B includes a number of consecutive frames, each of which is assigned an SFN 1-31. At least one of the frames may be transparent frames. In the illustrated example, frames with SFNs 1, 3, 5, 7, 9, 11, 13, 15, 17, 19, 21, 23, 25, 27, 29 and 31 have been designated as the transparent frames.

Low duty cycle patterns may not be included in a frame-based approach due to a high RTT for both the DL and UL traffic that may result if more than one consecutive frame would be unusable by an LTE system due to a coexistence gap. Instead, in an embodiment, a medium duty cycle gap configuration may be used even under low LTE traffic.

For each coexistence gap pattern, the gap may be achieved by introducing a transparent frame. Although this frame may exist in the timing of the actual system (e.g., it occupies 10 ms of time like a normal frame), a transparent frame may not be usable by the system and, therefore, may not exist from the point of view of transmission and sub-frame timing.

In order to minimize the impact on SI timing, a transparent frame may still be assigned an SFN. Accordingly, the schedules for MIB, SIB1 and SI messages (as defined in LTE Release 8, for example) may remain unchanged. In other words, SI may not be received less frequently if it is transmitted with the same period as in LTE Release 8.

Another alternative to defining a transparent frame may be to not assign a transparent frame an SFN (e.g., to freeze the SFN counter during the transparent frame). However, such an embodiment may have more significant impacts on the overall timing of the system, as the effective duration of a set of sub-frames with such a system may now change compared to LTE Release 8 and may also change based on the configured duty cycle. For example, under an implementation where a transparent sub-frame is not assigned an SFN, the period of time from SFN 0 to SFN 10 may last 110 ms when the system is configured with the high duty cycle and 200 ms when the system is configured with the medium duty cycle. In addition, SFN alignment across multiple cells when doing carrier aggregation may not be possible. As a result, it may be preferable that the transparent frame be allocated an SFN.

Gap patterns may be defined by introducing transparent frames in such a way that they minimize the impact on SI. Since SI messages are transmitted within a configurable window that may be as large as 40 ms, the concern may only be to ensure transmission of MIB and SIB1 using the schedule currently defined.

Since an MIB may be transmitted every 4 frames and repeated each frame within this time (where each repetition may be independently decoded), the use of transparent frames may impact transmission of the MIB. The same 4-frame MIB period may be maintained, but repetitions that fall in a transparent frame may not be made by the system. As a result, some MIB repetitions may not be sent due to the presence of coexistence gaps. In this case, it may be preferred to prioritize the first transmission of the MIB in order to increase the average speed with which a WTRU may be able to acquire new MIB information. As a result, SFN numbers that are divisible by 4 may not fall in a gap. Similarly, in order to allow transmission of SIB1, all frames with an even SFN may not be defined as a transparent frame.

A WTRU may execute a method of coexistence among WTRUs operating in the same spectrum such as the example method illustrated and described with respect to FIG. 5B above when transparent frames are configured. In an embodiment, the eNB may signal the duty cycle using SI. During a transparent frame, a WTRU may not try to decode the PDCCH or reference symbols and may not transmit in the UL. In addition, the eNB may not transmit PHY layer signals during a transparent frame. In an embodiment, the eNB may transmit MIB with the same repetition cycle (e.g., 40 ms) as described in LTE Release 8. However, the MIB may not be transmitted during a transparent frame. Accordingly, fewer than 4 MIB repetitions may be transmitted during the repetition cycle. In an embodiment, the eNB may ensure that SIB1 does not collide with a transparent frame. As a result, SIB1 may be transmitted as in LTE Release 8.

A WTRU may follow HARQ timing rules and measurement timing rules defined in LTE Release 8 except that the timing may be frozen during the transparent frame. In other words, sub-frames in a transparent frame may not be counted when determining the time (in sub-frames) elapsed between two different events related to the WTRU procedures. The freezing of the sub-frame counter is described in more detail below. For example, sub-frames that are part of a transparent TDD frame may not be counted when calculating one of a delay between a transmission and ACK/NACK of the transmission or a delay between an ACK/NACK and a retransmission in a HARQ. The sub-frame counter may also be frozen with respect to calculating delays for other LTE operations (e.g., channel quality reporting operations, power control operations and RACH operations) such that sub-frames that are part of a transparent TDD frame are not counted when calculating delays for such operations.

SI in LTE includes the MIB and SIB1, which may be in fixed locations, and higher order SIBs, whose locations may be specified by the timing sent in SIB1 and may be detected using normal PDCCH grants in the common search space. Due to the absence of any DL data or signaling in the transparent frame, SI may not be transmitted on transparent frames. The timing of the coexistence gaps given in LTE Release 8 may guarantee that SIB1 will be scheduled in non-transparent frames. In addition, SI messages that include higher order SIBs (e.g., SIB2 and above) may be scheduled by the eNB in such a way that the SI window may not fall on transparent frames or that each SI window may always include at least one non-transparent frame. The SIBs may then be scheduled in the DL sub-frames of non-transparent frames only. As a result, from the WTRU perspective, the WTRU may not decode any SIBs in a transparent frame.

Because the MIB in LTE Release 8 is transmitted in every frame (with a four frame repetition period), the eNB in the coexistence gap design may be altered to not transmit MIB on a transparent frame. In an embodiment, a WTRU may decode the MIB by reading the MIB from each frame that is not a transparent frame. A new transmission of MIB may still be assumed at values of the SFN that satisfy SFN mod 4=0 (same as LTE Release 8). The number of repetitions of the MIB that the WTRU may expect may depend on the configured duty cycle, since transparent frames may not include any MIB transmissions.

Figure 17A:
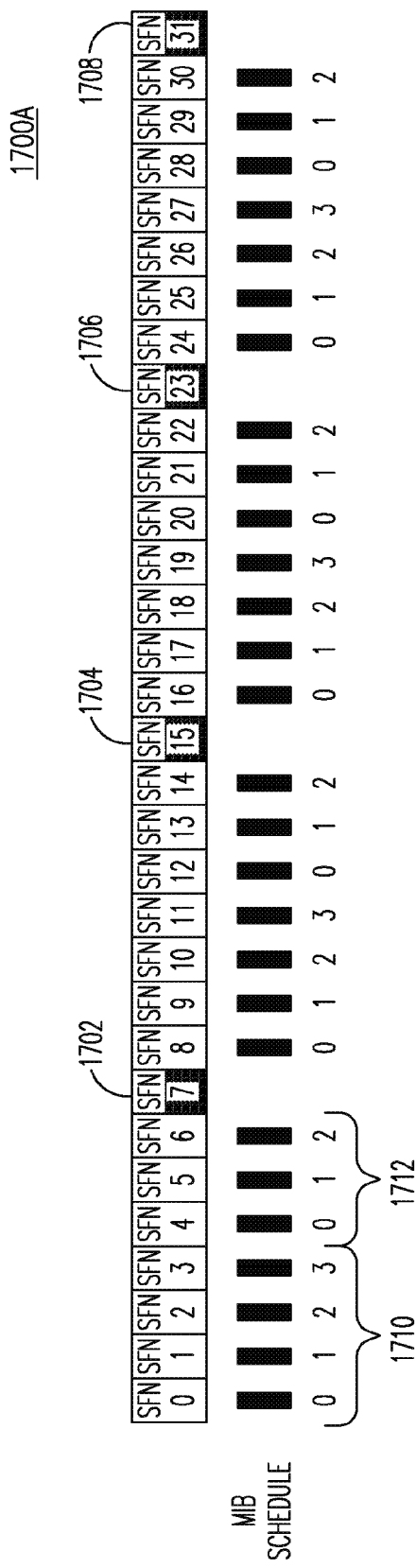
FIG. 17A is a diagram of management information block (MIB) transmissions for a high duty cycle.

FIG. 17A is a diagram 1700A of MIB transmissions for a high duty cycle. In the example illustrated in FIG. 17A, MIB is transmitted on every frame other than transparent frames 1702, 1704, 1706 and 1708. For the high duty cycle, the WTRU may receive four MIB transmissions or repetitions that start on (SFN/2) mod 4=0, such as MIB repetition 1710. It may receive three MIB transmissions for MIB repetitions that start on any other SFN that does not satisfy (SFN/2) mod 4=0, such as MIB repetition 1712. In an alternate high duty cycle configuration (not shown), the WTRU may always receive three MIB repetitions.

Figure 17B:
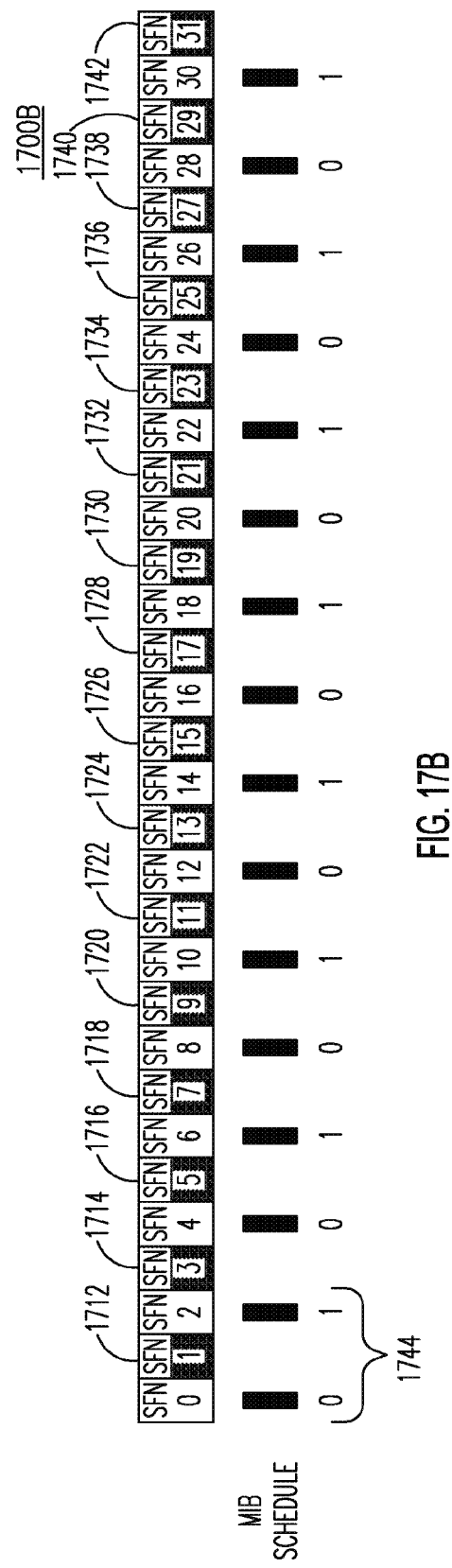
FIG. 17B is a diagram of MIB transmissions for a medium duty cycle.

FIG. 17B is a diagram 1700B of MIB transmissions for a medium duty cycle. In the example illustrated in FIG. 17B, MIB is transmitted on every frame other than transparent frames 1712, 1714, 1716, 1718, 1720, 1722, 1724, 1726, 1728, 1730, 1732, 1734, 1736, 1738, 1740 and 1742. For the medium duty cycle configuration, the WTRU may receive two MIB transmissions every MIB repetition period, such as MIB repetition 1744.

In another embodiment, the eNB may transmit MIB only in the even sub-frames, which may yield an identical MIB schedule, regardless of the duty cycle being used.

Since operation on small cells may be assumed, reception of two repetitions of the MIB may not result in a significant degradation of the PBCH performance. As a result, no specific robustness enhancements to the MIB may be required to offset the shorter number of repetitions that the WTRU may take advantage of. Further, in addition to some aspects related to timing, the SI in the SIBs may need to change slightly to allow for the ability to change the duty cycle dynamically as described herein.

The change in duty cycle (e.g., from low to medium) may be affected by the surrounding WiFi systems as well as the relative LTE traffic currently being handled. As a result, the system may want to change its duty cycle (e.g., from high to medium and vice versa) fairly often to manage the change in traffic pattern. As a result, it may be desirable to avoid the need to read the entire SI when a change in duty cycle occurs. In addition, it may be desirable to send the change in duty cycle over SI whose timing is not changed from the coexistence gap so that the behavior of a WTRU is more predictable when a change in the duty cycle occurs. For these reasons, the proposed design may be to send the current duty cycle configuration as an information element in SIB1.

The WTRU may read SIB1 at every repetition period (e.g., 80 ms) in order to check the value of the systemInfoValueTag. In addition, the WTRU may determine the current duty cycle being applied by the small cell eNB by reading the duty cycle IE that is to be added to SIB1. To enable operation in the case of spectrum where a coexistence gap is not required, the duty cycle IE may be added as an optional IE in SIB1, or a special value of the duty cycle may be used to indicate the absence of coexistence gaps. On a condition that the duty cycle indicates that there is no duty cycle information, the WTRU may operate under normal LTE rules (e.g., decode MIB/SIBs as in a standard such as LTE Release 8 and assume no transparent frames are present). On a condition that the configured duty cycle indicates a specific value of the duty cycle information, the WTRU may respect that specific duty cycle and apply procedures described above during transparent frames.

Figure 18:
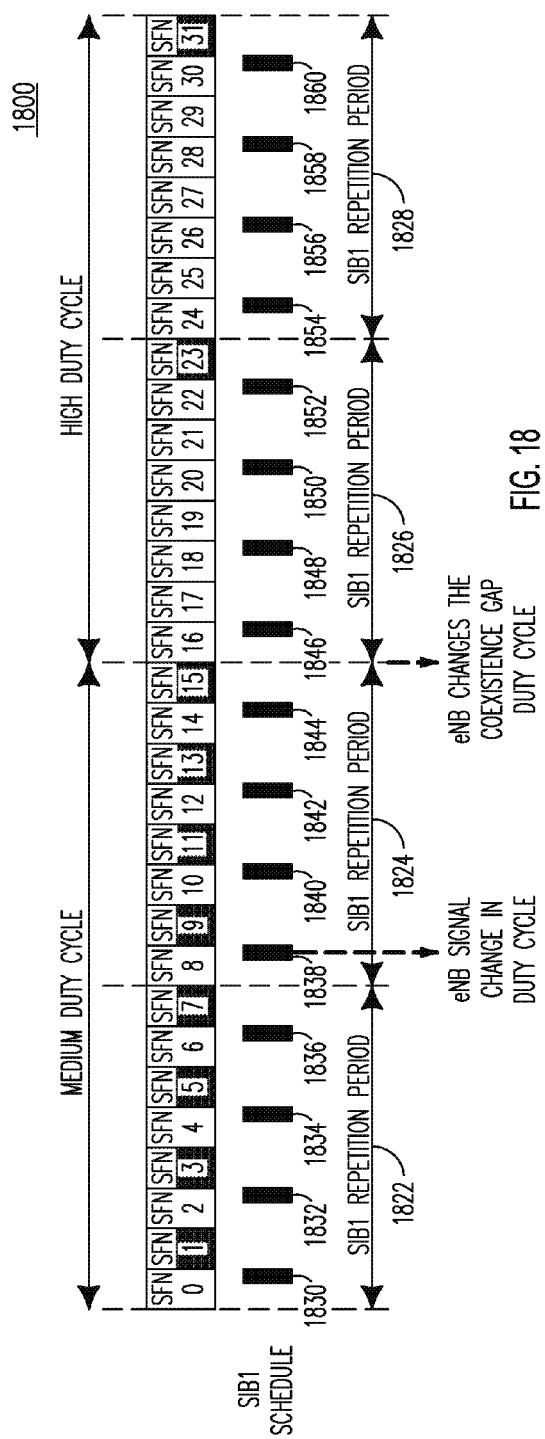
FIG. 18 is a diagram of timing associated with a change in duty cycle as signaled by a change in the duty cycle information element (IE) in system information block 1 (SIB1)

FIG. 18 is a diagram 1800 of timing associated with a change in duty cycle as signaled by a change in the duty cycle IE in SIB1. Four SIB1 repetition periods 1822, 1824, 1826 and 1828 are illustrated in FIG. 18. Four SIBs 1830, 1832, 1834 and 1836 indicating a medium duty cycle are transmitted in repetition period 1822, four SIBs 1838, 1840, 1842 and 1844 indicating a high duty cycle are transmitted in repetition period 1824, four SIBs 1846, 1848, 1850 and 1852 indicating a high duty cycle are transmitted in repetition period 1826, and four SIBs 1854, 1856, 1858 and 1860 indicating a high duty cycle are transmitted in repetition period 1828. In an embodiment, the duty cycle IE may be changed by the eNB at the boundary of an SIB1 repetition period. A WTRU may detect a change in the duty cycle IE within the SIB 1838 during the SIB1 repetition period 1824. When the WTRU detects a change in the duty cycle IE within an SIB1 repetition period, it may assume that the eNB will start to use the new duty cycle at the start of the next SIB1 repetition 1826. This may avoid any potential for a change in duty cycle that is not properly decoded by all WTRUs, resulting in possible transmission by a WTRU in the UL during a transparent frame.

In an embodiment, the WTRU may read the duty cycle field in SIB1 at the boundary of the SIB1 repetition period. If necessary, this may be read from the other repetitions of SIB1 within the SIB1 repetition period. If a change in the currently assumed duty cycle is detected by the WTRU (e.g., the value of the duty cycle changes from medium to high), the WTRU may assume that the agreed on pattern of transparent frames will move to high duty cycle pattern at the beginning of the next SIB1 repetition period (1826 in FIG. 18).

In another embodiment, the duty cycle may be signaled within the MIB by modifying the MIB to include this additional field. Alternatively, SIB2 may be used to carry the duty cycle SI and find out about a change in the duty cycle from the eNB.

In order to modify the UL and DL HARQ timing in the presence of transparent frames, in an embodiment, sub-frames that are part of a transparent frame may not be counted when calculating HARQ delays. Accordingly, when counting sub-frames in order to determine, for example, the sub-frame that will carry ACK for a particular transmission, all sub-frames that fall in a transparent frame may not be counted. The HARQ timing counters in the eNB and the WTRU may be frozen during the transparent frames. In effect, the HARQ timing counters may be frozen at the start of a coexistence gap and for the duration of the coexistence gap. The timers may then be restarted at the end of the gaps and may resume at the values they were prior to being frozen. Effectively, this may be considered as introducing a TDM aspect into the LTE system, whereby sub-frames associated with a coexistence gap do not belong to the LTE system (and may, therefore, not be counted for timing of PHY and MAC operations). The same mechanism may also be used for other operations in LTE (such as CQI measurements) that are defined in terms of over-the-air time in order to account for the presence of transparent frames with minimal impact to the rules defining LTE Release 8 and 10 procedures.

Table 5 below is a DL association set index for TDD UL/DL configuration 1. Based on Table 5, for a given sub-frame n corresponding to a UL sub-frame carrying ACK/NACK for DL HARQ, the value k given in Table 5 corresponds to the sub-frames n-k that are the DL transmissions ACK/NACK'd in sub-frame n. When computing n-k, all sub-frames that occur before n that fall in a transparent frame may be ignored.

TABLE 5

| UL-DL Configuration | Sub-frame n | | | | | | | | | |
|---|---|---|---|---|---|---|---|---|---|---|
| | 0 | 1 | 2 | 3 | 4 | 5 | 6 | 7 | 8 | 9 |
| 1 | — | — | 7, 6 | 4 | — | — | — | 7, 6 | 4 | — |

Figure 19:
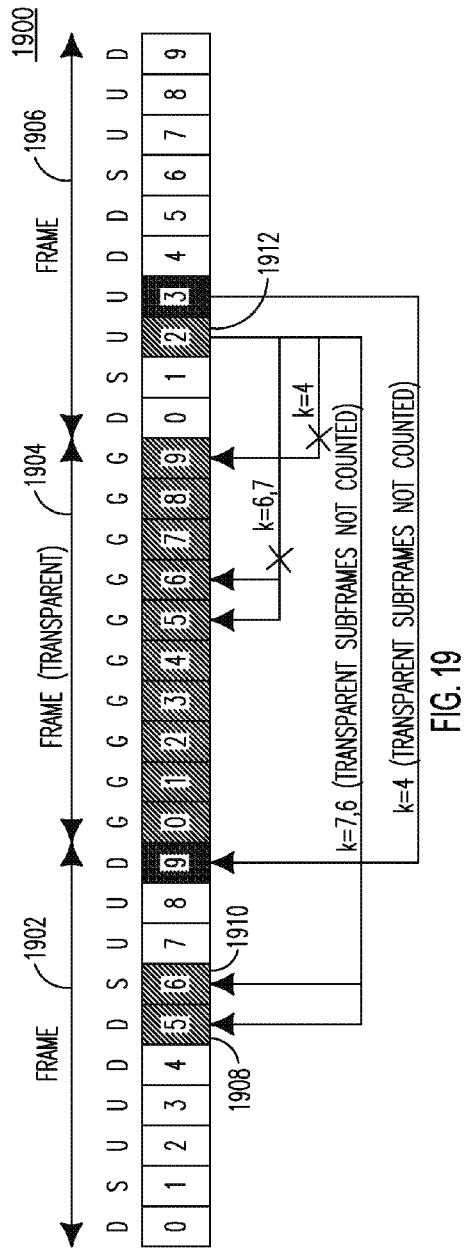
FIG. 19 is a diagram of an example acknowledgement/negative acknowledgement (ACK/NACK) procedure for TDD UL/DL configuration 1.

FIG. 19 is a diagram 1900 of an example ACK/NACK procedure for TDD UL/DL configuration 1. In the example illustrated in FIG. 19, DL transmissions in sub-frames 1908 and 1910 in frame 1902 may be ACK/NACK'd using sub-frame 1912 in frame 1906 (instead of frame 1904). In other words, an ACK/NACK message may be transmitted in a next non-transparent TDD frame following a frame in which a transmission is made or make a retransmission in a next non-transparent TDD frame following a frame in which the corresponding ACK/NACK was received. Since the actual sub-frame relationship between transmission and acknowledgments has not changed when the entire transparent frame is ignored, the HARQ timing rules may not be impacted except for the inclusion of a frame offset when two related sub-frames are separated by a transparent frame that needs to serve as a gap. For this reason, the HARQ timing rules specified in LTE Release 8 remain effectively unchanged, and none of the signaling of ACK/NACK or grant/allocations needs to be changed.

In an embodiment, the HARQ counter (which counts the number of sub-frames between transmissions and expected ACK/NACKs) may be frozen when sub-frames that are part of a transparent frame are being traversed. When the transparent frame has been traversed, the HARQ sub-frame counter is then re-enabled to continue the counting associated with the HARQ procedure. The same approach may be used to handle the timing of other procedures in LTE, such as RACH opportunities. A transparent frame may not include any RACH resources, and the WTRU may only be allowed to use the RACH resources defined on non-transparent frames. As a result, for any procedures whose timing is defined at the sub-frame level, these procedures may be modified to account for the fact that the sub-frame counter is effectively frozen during a transparent frame. On the other hand, for procedures defined at the frame level, these procedures may simply not be applied on transparent frames.

In an embedment, the definition of transparent frames may require that a WTRU not make any UL transmissions during a transparent frame, which may include any potential transmission of RACH by a WTRU. As a result, the WTRU procedures may need to be changed to ensure that the WTRU does not send a RACH preamble during a transparent frame. Instead, it may wait for the next PRACH resource after the transparent frame to send its preamble since it has knowledge of the location of transparent frames via SIB1. In LTE Release 10, if a WTRU fails to receive a preamble response, it waits a random time between 0 and a configured back-off time and then re-transmits during the next available PRACH occasion. Accordingly, in an embodiment, the WTRU may pause its random access back-off timer during a transparent frame, since, unaltered, the WTRU may attempt to send each preamble attempt during a transparent frame.

After the preamble, the eNB may schedule the preamble response over the PDCCH and use normal PUSCH resources thereafter. If the preamble response falls on a transparent frame, the eNB may schedule the response in the next frame since it cannot transmit during a transparent frame. The WTRU may wait for the next frame to listen for the response to arrive since it has knowledge of the location of the transparent frame via SIB1.

Use of coexistence gaps may have an impact on paging. For frame-based methods, there may be an impact on the calculation for the paging frame, which could occur on a transparent frame. If an eNB is to page a WTRU during a specific sub-frame number in a transparent frame, it may instead wait until the next active frame and use the same specific sub-frame number. Similarly, from the perspective of a WTRU that is to receive a page during a specific sub-frame number in a transparent frame, it may wait until the next frame and listen to the page during the same specific sub-frame number. Since smaller cells may have on average fewer WTRUs per cell, limited paging resource may suffice.

In an embodiment, the way the WTRU determines the paging frame (PF) may be changed. For example, in LTE Release 10, a WTRU uses equation (3) to calculate PF:

$$\text{SFN mod } T = (T \text{ div } N)*(\text{UE\_ID mod } N), \text{ where } N \text{ is set in the SIBs.} \tag{3}$$

In the embodiment for calculating the PF when transparent frames are used, the WTRU may calculate PF as follows. If "SFN mod T" lands on a transparent frame (which may be known from the SIBs), SFN mod T may be incremented by one frame (or looped back to 0) such that it lands in a non-transparent frame. In this embodiment, the WTRU may determine the PF to occur in a frame immediately following the transparent frame.

In at least some of the embodiments described above, application of LTE Release 10 was assumed, and, therefore, the presence of regular CRS and CSI-RS was also assumed (regardless of whether WTRUs were scheduled or not). For these embodiments, no transmission of CRS or CSI-RS may be made by the eNB during the CRS, and, therefore, the WTRU may not expect or measure these reference symbols during the transparent frame. For NCT embodiments, however, CRS on the NCT may only be transmitted every 5 sub-frames. In addition, during sub-frames in which CRS is transmitted, the transmission may occur only in the six center resource blocks (rather than, for example, the entire bandwidth).

The transparent frame definition may be changed when it is applied to an NCT. Due to the reduced CRS overhead allowed by the NCT, the CRS may be transmitted during the transparent frame in the locations dictated by the NCT (e.g., every 5 sub-frames and, in an embodiment, on the center 6 resource blocks rather than the entire bandwidth) rather than blanked out during the entire transparent frame. The CSI-RS, however, may follow the same rules as the HARQ (e.g., its transmission period may be frozen during the transparent frame so that sub-frames in the transparent frame may not count as time expired in determining the period of the CSI-RS). Alternatively, the eNB may schedule the period of the CSI-RS so that it does not coincide with the occurrence of the transparent frame.

In order to maintain the definition of the NCT with respect to transmission of reference symbols and synchronization symbols, the transparent frame definition in the context of NCT may be defined without any UL or DL transmission, with the following exceptions. A transparent frame may still include the PSS/SSS at the locations agreed on by the final definition of NCT. Further, a transparent frame may still include port 0 CRS 1 out of every 5 sub-frames. In this embodiment, sub-frames 0 and 5 may be assumed for the sub-frames in the transparent frame where CRS port 0 is to be transmitted. This may not preclude embodiments where sub-frames other than 0 and 5 are chosen by the NCT definition as the sub-frames that include the CRS.

As a result, the WTRU and eNB procedures for the transparent frame in the context of NCT may be slightly modified with respect to LTE Release 10. For example, the PSS/SSS may not be transmitted in all frames, including the transparent frames. For another example, the CRS may be transmitted the same way in all frames (transparent and non-transparent) and may follow the definition of the NCT CRS symbol transmissions, which may only include CRS port 0 transmissions sent in sub-frames 0 and 5 of every frame. The rules for CSI-RS for the transparent frames in this embodiment may be the same as those defined for the transparent frame in the context of LTE Release 10 (e.g., the WTRU decodes CSI-RS according to the schedule given by the eNB and does not assume CSI-RS during a transparent frame).

In an embodiment, when the WTRU performs an initial cell search, it may search for PSS/SSS on the channel as normal. However, WTRU synchronization and channel estimation procedures may take into account the transparent frames by operating according to the following rules. When the WTRU is connected, it may maintain synchronization using only the PSS/SSS and the CRS on all frames (both transparent and non-transparent). The rules for SRS for the transparent frames may be the same as those defined for the transparent frame in the context of LTE Release 10.

In another embodiment, the eNB may decide to not transmit the CRS at all during the transparent frame on the NCT. In this embodiment, the WTRU's behavior may need to change compared to LTE Release 12 in the context of using the CRS for synchronization. In other words, the WTRU may not perform synchronization (e.g., it may not assume the presence of the CRS) on the transparent frame, and all synchronization may be performed during non-transparent frames only.

In the context of small cells, intra and inter-frequency measurements may be performed to trigger handovers in one of a number of different embodiments. In one embodiment, a WTRU may perform intra-frequency measurements on a small cell that is to measure and potentially trigger handover to another small cell. In another embodiment, a WTRU may perform inter-frequency measurements by a WTRU on a small cell that is to measure and potentially trigger handover to another small cell. In another embodiment, a WTRU may perform inter-frequency measurements on a macro cell that is to measure and potentially trigger handover to small cells. In another embodiment, a WTRU may perform inter-frequency measurements on a small cell that is meant to measure and potentially trigger handover to a macro cell.

In each of these embodiments, the WTRU measurements should consider the potential presence of transparent frames that serve as coexistence gaps, and the restrictions on how these measurements are performed may depend on which of the above embodiments are being considered. As described above, it may be assumed that small cells managed by a single macro cell will be synchronized (in frame timing and SFN number). However, different small cells may have different duty cycles configured in each cell since this may depend on traffic and proximity to a WiFi system.

For intra-frequency measurements, a WTRU should be aware of the coexistence gap duty cycle of a neighboring small cell before it attempts the measurements in order to avoid measurements on a transparent frame where there are no reference symbols on which to perform the measurements. To avoid using a worst case duty cycle assumption (e.g., assuming that the neighboring small cell is using a 50% duty cycle and measuring only on even SFN numbers), a WTRU may be required to read SIB1 of the neighbor cell prior to doing intra-frequency measurements. Thus, a WTRU may first receive the duty cycle configuration of the neighbor cell, and, with the assumption of synchronized operation for small cells under control of the same macro cell, a WTRU may be able to perform measurements on the neighbor small cell and avoid the transparent frames configured in the small cell. Accordingly, intra-frequency measurement performance may be optimized with respect to the available amount of potential measurement time (e.g., non-gap time) on the neighbor cell.

In an embodiment, a WTRU may make intra-frequency measurements as follows. A small cell eNB may configure a WTRU to perform intra-frequency measurements. In an embodiment, the eNB may choose only even SFNs to do measurements. If the neighbor has a higher duty cycle, the WTRU may perform intra-frequency measurements during a transparent frame where the neighbor may also be transmitting.

A WTRU may perform intra-frequency measurement a follows. The WTRU may find and decode PSS/SSS of a small cell on the same frequency to determine the cell ID of the neighbor small cell and read SIB1 on the neighbor small cell whose cell ID was identified in order to determine the coexistence gap duty cycle/pattern being used on the small cell. The WTRU may perform measurements on the small cell using reference symbols on frames that are not transparent frames (e.g., based on the duty cycle configuration obtained from SIB1). In an embodiment, this may be done periodically, in which case SIB1 may be read prior to each measurement. The WTRU may not measure any part of the target eNB that coincides with a transparent frame and may report the intra-frequency measurements of neighboring small cells detected.

Figure 20A:
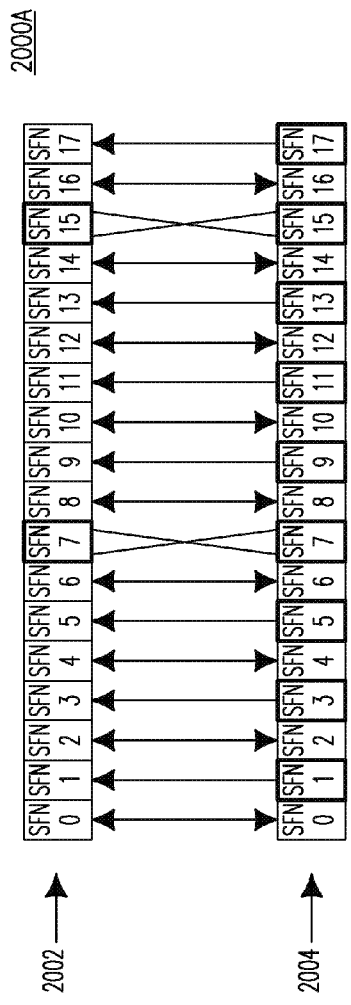
FIG. 20A is a diagram illustrating times available during high and medium duty cycles for a WTRU to make intra-frequency measurements.

FIG. 20A is a diagram 2000A illustrating times available for WTRUs associated with an eNB 2002 with a high duty cycle and an eNB 2004 with a medium cycle to make intra-frequency measurements. In the example illustrated in FIG. 20A, WTRUs associated with both the eNBs 2002 and 2004 may perform intra-frequency measurements during frames corresponding to SFNs 0, 2, 4, 6, 8, 10, 12, 14 and 16. The best time for WTRUs associated with eNB 2004 is during frames corresponding to SFNs 1, 3, 5, 9, 11, 13 and 17. During frames corresponding to SFNs 7 and 15, no intra-frequency measurements may be made.

Inter-frequency measurements may require a WTRU to tune to a different frequency and may, therefore, be enabled through the use of measurement occasions in LTE, which span 6 ms and may be configured every 40 ms or 80 ms. Since each measurement occasion may be used by the WTRU to measure PSS/SSS and reference symbols of cells on a different frequency, and may be limited to 6 ms, a WTRU may not use these measurement occasions to read SIB1 and to find the coexistence gap configuration when the inter-frequency measurements are being performed to measure small cells. For inter-frequency measurements performed to measure the macro-cell, there may be no issue as there are may be no transparent frames configured for the macro-cell.

In order to avoid having the WTRU perform inter-frequency measurements at a time when a neighbor small cell has a coexistence gap configured, an assumption of synchronized operation, in addition to the known potential location of coexistence gaps, may used. Based on these assumptions, measurement occasions may be restricted by the eNB of a small cell to occur on frames that may not fall in a coexistence gap (e.g., cannot be a transparent frame). Given the allowable timing of coexistence gaps described above, coexistence gaps may occur in the worst case every other frame (e.g., the 50% duty cycle case). In that scenario, every odd-numbered SFN in a small cell may represent a transparent frame and, therefore, may represent a time period where WTRUs cannot perform inter-frequency measurements on that cell. Since a serving small cell for a WTRU and a neighbor (e.g., inter-frequency) small cell may have frame and SFN synchronized, the serving small cell eNB may schedule measurement occasions only on even SFN frame numbers (e.g., since the period of the measurement occasions is 40 ms and 80 ms, all measurement occasions for a given configuration may land on an even SFN). The measurement occasion may be scheduled at different times within the even SFN frames on a per WTRU basis, as long as the entire measurement occasion remains within the even SFN frame. This may guarantee that the neighbor inter-frequency small cell transmits reference symbols during the entire measurement occasion.

Figure 20B:
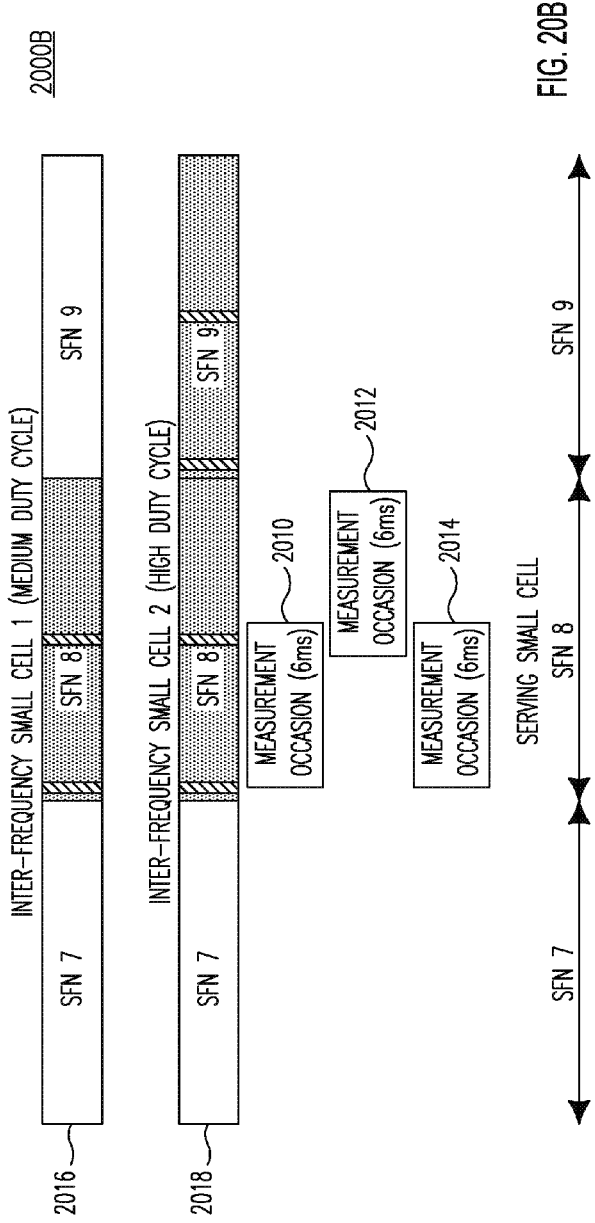
FIG. 20B is a diagram illustrating times available for three different WTRUs associated with small cell having a high duty cycle with a neighboring small cell having a medium duty cycle.

FIG. 20B is a diagram 2000B illustrating times available for three different WTRUs 2010, 2012 and 2014 associated with small cell 2018 having a high duty cycle with a neighboring small cell 2016 having a medium duty cycle. In the example illustrated in FIG. 20B, each of WTRUs 2010, 2012 and 2014 has different measurement occasion timing within SFN 8.

In an embodiment, a macro eNB may configure a WTRU camped on a macro cell to perform inter-frequency measurements on the small cells. In order to do this, the macro cell may configure measurement occasions. Since the macro cell may be aware of the duty cycle configured on each of the small cells (e.g., the small cells communicate to the macro cell each time a change in duty cycle is decided), the macro cell may configure the measurement occasions based on the coexistence gap configuration of the one or more small cells to be measured. For example, if a cluster of small cells is configured without coexistence gaps (e.g., operation with no gaps), the macro eNB may have the flexibility of configuring measurement occasions on any SFN.

In another embodiment, the small cell may configure inter-frequency measurements to enable measurement of the macro cell. Since the macro cell has no limitation on the location of these measurement occasions (e.g., there are no gaps on the macro cell), the small cell may configure the measurement occasions in any frame. This may include the transparent frame or the coexistence gap occurring on the serving cell of the small cell.

Since measurement occasions may take time away from normal transmissions, it may be beneficial for the small cell to configure inter-frequency measurements to measure the macro cell during a transparent frame since the small cell eNB may not transmit or control at that time. As a result, the configured measurement occasion may not take any usable data transmission time away from the small cell but rather may force the WTRU to perform inter-frequency measurements during the time when it is already silent and not transmitting on the small cell frequency.

Figure 20C:
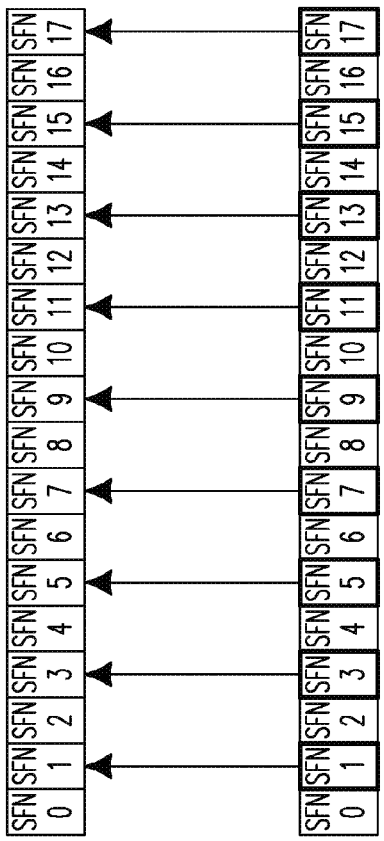
FIG. 20C is a diagram illustrating best times for WTRUs associated with a small cell eNB having a medium duty cycle and a neighboring macro eNB to perform inter-frequency measurements.

FIG. 20C is a diagram 2000C illustrating best times for a small cell eNB 2032 with a medium duty cycle and a neighboring macro eNB 2030 to perform inter-frequency measurements. In the illustrated embodiment, the best times for WTRUs associated with the small cell eNB 2032 to perform inter-frequency measurements is during frames having SFNs 1, 3, 5, 7, 9, 11, 13, 15 and 17.

In an embodiment, all small cells under the control of a macro cell may be frame synchronized. In some embodiments, this may be required to ensure that coexistence gaps left by neighboring small cells allow WiFi coexistence at the intersection of the coverage of the two cells.

In other embodiments, neighboring small cells in a coverage scenario may be managed by different macro cells. In these embodiments, there is no guarantee that the two macro cells will have the same frame timing and SFN synchronization. As a result, the two underlying small cells may not have the same timing of transparent frames. Here, inter-frequency measurements made by a WTRU of a neighbor small cell belonging to a different macro cell may or may not allow a WTRU to properly measure the neighbor small cell (e.g., depending on the relative timing of transparent frames in the neighbor small cell and measurement occasions scheduled by the serving small cell). Since this handover scenario may not occur (e.g., a serving small cell may prefer a handover to the macro cell prior to allowing a handover to a small cell managed by a different macro cell), the ability to correctly measure the neighbor small cell and the quality of the measurements may not be critical in this case.

In embodiments described above, gap patterns are predefined and known a priori by the WTRU and eNB. Since the gap pattern may repeat and may depend on the duty cycle configured by the eNB, the eNB may need to signal the duty cycle to inform WTRUs of, for example, which pattern of blank sub-frames or transparent frames to use at a given time.

In other embodiments, the eNB scheduler may dynamically determine the need for a regular transmission or gap time based on its traffic and may dynamically notify the WTRU of this. Rather than coordinated patterns, the eNB scheduler may schedule a period of gap time (a few sub-frames, for example) when this may be possible based on the traffic load of the scheduler.

In order to allow coexistence for dynamically determined gap schedules, the eNB may broadcast the use of a set of ICIC frames or sub-frames. These ICIC frames or sub-frames 2102 may also be inherent in the communication (e.g., for an LTE Release 12 new carrier type where there are known sub-frames that carry no CRS). Regardless of the method used to communicate the ICIC frames or sub-frames, the eNB may be constrained to scheduling coexistence gaps during only these ICIC frames or sub-frames so that the coexistence gaps themselves (although scheduled dynamically) may become a subset of the set of ICIC sub-frames. The ICIC sub-frames may themselves be periodic and repeated patterns, but the coexistence gaps themselves may not be.

Figure 21:
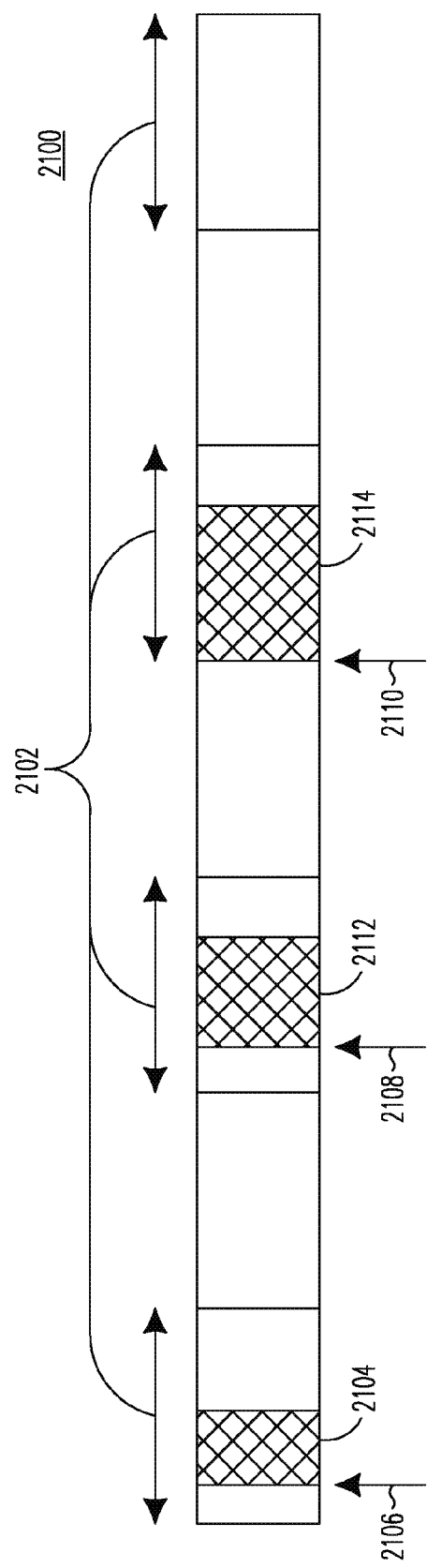
FIG. 21 is a diagram illustrating a method of coexistence for a dynamically determined gap schedule.

FIG. 21 is a diagram 2100 illustrating a method of coexistence for a dynamically determined gap schedule. In the example illustrated in FIG. 21, an eNB broadcasts the use of a set of ICIC frames or sub-frames 2102. At times 2106, 2108 and 2110 selected dynamically by the eNB during the set of ICIC frames, the eNB may signal a coexistence gap and the length of that gap to the WTRUs. The WTRUs and eNB may cease transmitting during the signaled gap periods. In the example illustrated in FIG. 21, the eNB signals coexistence gap 2104 and its corresponding length at 2106, signals coexistence gap 2112 and its corresponding length at 2108 and signals coexistence gap 2114 and its corresponding length at 2110.

In an embodiment, the eNB may broadcast the usage of the ICIC sub-frames so that they are known to all WTRUs. For example, SI may be modified or added to broadcast the presence of the ICIC sub-frames. In another embodiment, the eNB may broadcast the presence of ICIC sub-frames, but the pattern of occurrence of the ICIC sub-frames may be known apriori by the eNB and WTRUs. In this embodiment, the presence of the ICIC sub-frames may be made more static.

In an embodiment, the eNB scheduler may determine, based on the traffic scenario and scheduling algorithm, the best opportunity to schedule a coexistence gap and a reasonable length for the gap. Dependency of HARQ processes may also affect the timing of the coexistence gap patterns scheduled by the eNB. For example, the eNB may abstain from scheduling a coexistence gap if WTRUs are expecting pending synchronous retransmissions in the UL.

In order to allow for synchronization and measurement by the WTRU, the WTRU measurement and synchronization procedures may be based on non-ICIC sub-frames. In an embodiment, a WTRU may abstain from measurement during the ICIC sub-frames and perform measurements only during the non-ICIC sub-frames, regardless of the presence of coexistence gaps. In addition, the WTRU may assume that any synchronization symbols (e.g., PSS/SSS and CRS) are not transmitted during the ICIC sub-frames, regardless of the actual coexistence gap patterns signaled by the WTRU. The eNB may or may not transmit synchronization symbols during the ICIC sub-frames, however, when a coexistence gap is scheduled by the eNB. All eNB transmissions (including any synchronization symbols) may be interrupted for the duration of the gap.

When an eNB determines the need for a coexistence gap, it may signal the presence of this gap to all WTRUs through PHY layer signaling. The duration of the gap may also be signaled to the WTRUs. When a WTRU receives this signaling, it may abstain from decoding the control channel (on DL sub-frames) or sending SRS (on UL sub-frames) until the coexistence gap expires.

In another embodiment, discontinuous reception may be used to create coexistence gaps. In order to use DRX to create coexistence gaps for the use of the channel by WiFi, for example, the eNB may synchronize the timing of DRX cycles among all WTRUs. As a result, all WTRUs in the control of an eNB may need to be configured with the same DRX cycle parameters at all times.

The LTE transmission time may correspond to the union of the active times for each of the WTRUs while the coexistence gap or time available for WiFi transmission may correspond to the intersection of the non-active DRX times of all WTRUs. In order to make the method most effective for the use of coexistence gaps, the scheduler may need to configure the DRX parameters such that traffic to the majority of the WTRUs may be full-buffer during the active time so that the WiFi system may see the channel as occupied during the entire active time and the configured duration time should reflect the expected load of the busiest WTRU so that the least busy WTRU is guaranteed to listen to the DL channels throughout the entire LTE transmission time.

Figure 22:
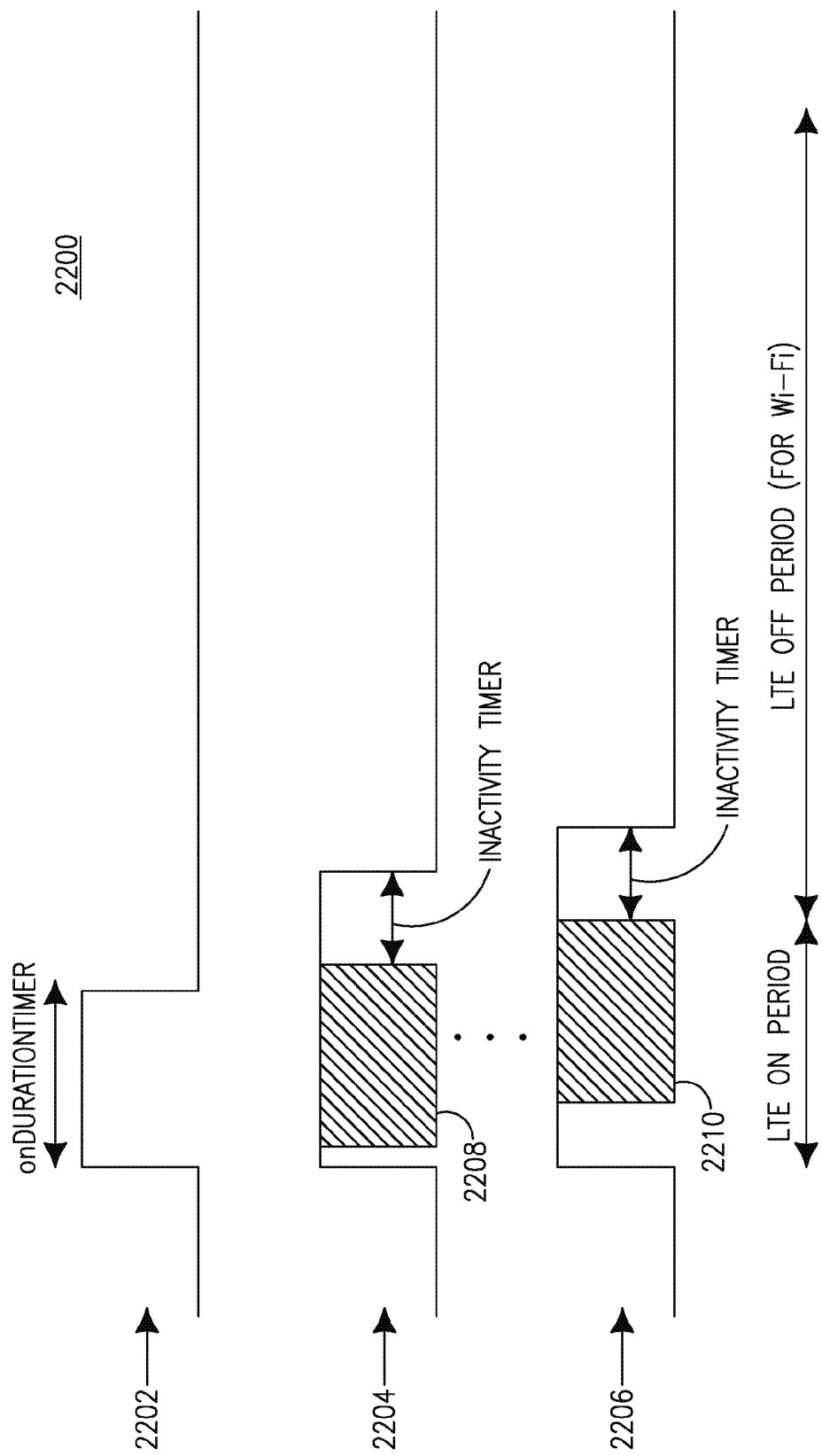
FIG. 22 is a signal diagram illustrating a method of using discontinuous reception (DRX) to create coexistence gaps.

FIG. 22 is a signal diagram 2200 illustrating a method of using DRX to create coexistence gaps for different WTRUs 2202, 2204 and 2206. For all of the WTRUs 2202, 2204 and

2206, an onDurationTimer may specify the minimum amount of time the WTRU should remain on and monitor the PDCCH for each DRX cycle. When the timer expires without receiving an allocation or grant, the WTRU may go back to sleep. This is the case for WTRU 2202. When a WTRU receives an allocation, the time in which the WTRU goes back to sleep may be dictated by a drxInactivityTimer, which may specify the amount of time following an allocation or grant that the WTRU will go back to sleep. This timer may be reset each time a new allocation or grant is received. The WTRUs 2204 and 2206 in FIG. 22 receive grants 2208 and 2210, respectively, for active transmissions. Since each of the WTRUs 2204 and 2206 receive their grants at different times during the on duration, however, the inactivity timer extends their on times to total different amounts of time. The time before the last WTRU is scheduled for active transmissions may be reserved as an LTE on period for coexistence purposes, and the time between the end of the last scheduled active transmission for a WTRU and the beginning of the next DRX on period may be reserved as a coexistence gap for use for transmissions by other WTRUs (e.g., for WiFi).

For traditional DRX, signaling and timing are applied on a per WTRU basis, and HARQ retransmissions may take place regardless of the DRX cycle. Further, for traditional DRX, the eNB may continue to operate regardless of the DRX cycle. As a result, the eNB may still transmit reference signals and PSS/SSS, regardless of how many and which WTRUs are currently in DRX. These features of traditional DRX may make it challenging to use traditional DRX as is for the creation of coexistence gaps due to the large signaling overhead for configuring DRX for all of the WTRUs, the interference that WiFi may cause on HARQ retransmissions that occur well after the bulk of active time retransmissions, and the interference that eNB RS and PSS/SSS transmissions may have on the WiFi system.

Since the coexistence gap length may need to depend on the relative amount of traffic between the entire LTE system (e.g., the eNB and all served WTRUs) and the WiFi system and not just the traffic experienced by a single WTRU (as is the case for traditional DRX), traditional DRX may be enhanced in order to create a new DRX capable of supporting coexistence with WiFi. For example, in an embodiment, a common configuration may be broadcast to all WTRUs (for example, through RRC signaling). The common DRX configuration may be used by all WTRUs to determine when to wake up and go to sleep in DRX. For another example, in an embodiment, WTRUs may not transition from a short DRX cycle to a long DRX cycle based on a timer related to traffic that is specific to a single WTRU. This may be done by defining only a single DRX cycle (short or long) and configuring the length of the DRX cycle and the on Duration timer based on the needs of the system as a whole. Alternatively, WTRUs may transition between short and long DRX cycles, but the transition between the two may be controlled by the eNB explicitly through a broadcast message such as a group-based MAC CE or PDCCH signaling addressed to all WTRUs. For another example, in an embodiment, the eNB may stop transmitted RSs and, in an embodiment, PSS and SSS, during the DRX period that is defined for coexistence. In addition, procedures may be defined for the WTRU to know when reference symbols have been turned off, since each WTRU may independently go to sleep at different times.

In an embodiment, the eNB may transmit PSS/SSS as long as at least one WTRU is known to be active. When all WTRUs are known to be in DRX (sleeping), the eNB may not transmit any reference signals or PSS/SSS. Each WTRU may assume valid PSS/SSS and reference symbols from the start of the DRX cycle to the end of the active time for that specific WTRU. The WTRU may not measure PSS/SSS and reference signals at any time outside the active period for that specific WTRU.

Additional restrictions on HARQ retransmissions during DRX may also be defined. For example, the last WTRU with pending retransmissions following the transmission of the bulk of traffic during the active time may suffer from WiFi interference since the WiFi may gain access to the channel before the retransmissions are successfully sent. Retransmissions may also adversely affect the WiFi itself, and the resulting coexistence scheme may be highly sub-optimal. To deal with this, in an embodiment, the number of allowable retransmissions may be reduced, the HARQ operation may be frozen and/or release mechanisms may be performed during retransmissions to keep the channel occupied.

In an embodiment, the number of retransmissions that occur at the end of an active period may be reduced. For example, a small value may be used for the drxRetransmissionTimer. For another example, retransmissions may be disabled altogether.

In another embodiment, HARQ retransmissions may be allowed to continue at the next active period following a coexistence gap, for example, to avoid upper layer retransmissions that may arise from reducing or eliminating HARQ retransmissions. Here, WTRUs with pending retransmissions may freeze and maintain their HARQ buffers and counters at the end of the maximum active period. In addition, UL procedures may be enhanced so that UL retransmissions that did not take place at the end of the active time may be made implicitly from the start of the next DRX cycle. In this case, the DRX procedure may be enhanced to hold the HARQ buffers, and the HARQ timing may be specified from the start of the next on Duration. In addition, the active time may be given a stipulated maximum period. For example, the active time may be defined based on a timer in which a WTRU may have no grants or allocations made. The WTRU may then move to DRX if the timer expires without a grant or allocation made. For another example, when a grant/allocation is made for a WTRU, the WTRU's active time may be further extended up to some maximum active time. Any pending retransmissions following the maximum active time may be suspended and continued at the next DRX cycle.

In an embodiment, the eNB may ensure a busy channel during the retransmission phase, which may occur at the end of the active period. This may involve the transmission of all redundancy versions prior to acknowledgement in order to keep the channel occupied during HARQ RTT time.

In addition to defining the coexistence gaps and patterns to reduce interference among different wireless systems operating in the same band, an eNB may also schedule WTRU transmissions during LTE active periods in such a way as to further reduce potential interference. In an embodiment, link adaptation may be used to help manage interference and maximize data throughput over a shared channel. For example, eNBs may use channel state information to determine how aggressively to schedule DL transmissions. Here, WTRUs may be configured to report CSI at both the beginning and end of an LTE ON period of a coexistence gap cycle. For each cell that it is measuring, a WTRU may report two different CQI values ($CQI_{start}$ and $CQI_{end}$), which may correspond to the start of an LTE active period or the end of an LTE active period, respectively. The two CQI values may allow an eNB/HeNB to more efficiently schedule the WTRUs at the start of an LTE active period.

When operating on a cell in a DSS band, the eNB/HeNB may provide both a periodic and an aperiodic CSI configuration. The eNB/HeNB may provide 2 periodic configurations (cqi-pmi-ConfigIndex and cqi-pmi-ConfigIndex3). The first of the 2 periodic configurations may apply for $CQI_{end}$, and the second of the 2 periodic configurations may apply to $CQI_{start}$. The eNB/HeNB may guarantee that the periodicity and offset of these reports are configured so as not to occur in the same sub-frame. CSI resource sets may also be included to enable coexistence between neighbor LTE systems. The eNB/HeNB may also configure the reporting mode for the aperiodic CSI reports. As in LTE Release 10, the CSI trigger sets, which are applicable to aperiodic CSI reporting, may be configured only for primary cells. In the case of supplementary cells, the eNB/HeNB may segregate these into specific trigger sets (e.g., by grouping supplementary cells that may require similar CSI reporting feedback).

The eNB/HeNB may ensure that the request for aperiodic CSI is sent in the sub-frame that will guarantee the correct CSI reference resource is used by the WTRU. For example for the case of carrier aggregation with LTE active periods aligned at the end of the a coexistence gap, to request an update of $CQI_{start}$, the eNB/HeNB may request an aperiodic CSI report in the sub-frame corresponding to the start of the LTE active period in all supplementary cells. Similarly, to request an update to $CQI_{end}$, the eNB/HeNB may request an aperiodic CSI report in a sub-frame corresponding to the latter sub-frames of an LTE active period (e.g., third or later sub-frame of an LTE active period).

At the WTRU, the CQI may be determined based on the CSI reference resource as defined in LTE Release 10, with the exception that if a WTRU is requested to send an aperiodic CSI report and the CSI trigger set includes a cell in an LTE DTX period, the WTRU may not return CSI information for this cell.

For periodic CSI reports, the WTRU may be configured with 2 periodic patterns. One of the 2 periodic patterns may be used for reporting on $CQI_{start}$ and the other of the 2 periodic patterns may be used for reporting on $CQI_{end}$. In determining the CQI for periodic CSI reporting in sub-frame n, the CSI reference resource may defined by a single downlink sub-frame $n-n_{CQI\_ref}$. For $CQI_{start}$, $nCQI_{ref}$ may be the smallest value greater than or equal to 4 such that it corresponds to a valid DL sub-frame at the start of an LTE active period. For $CQI_{end}$, $n_{CQI\_ref}$ may be the smallest value greater than or equal to 4 such that it corresponds to a valid DL sub-frame at the end of an LTE active period. In an embodiment, the eNB may optimize the patterns so as to minimize $n_{CQI\_ref}$.

Figure 23:
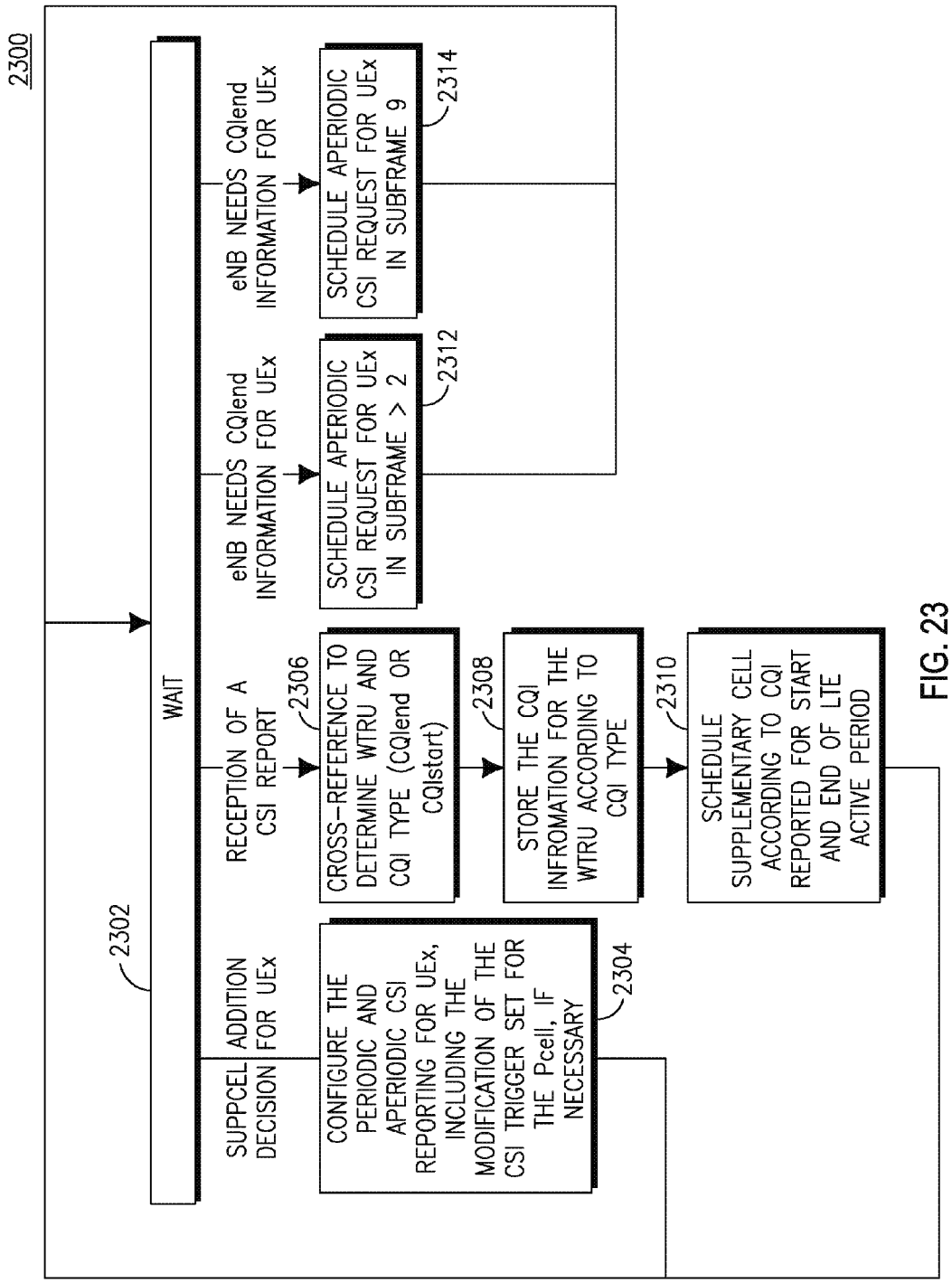
FIG. 23 is a flow diagram of a method for supplementary cell channel station information (CSI) reporting at the eNB/HeNB.

FIG. 23 is a flow diagram 2300 of a method for supplementary cell CSI reporting at the eNB/HeNB. In the example method illustrated in FIG. 23, the eNB/HeNB is initially in a waiting state (2302). On a condition that it decides to add a supplementary cell for a WTRU, it may configure the periodic and aperiodic CSI reporting for the WTRU, including modifying the CSI trigger set for the Pcell if necessary (2304). On a condition that the eNB/HeNB receives a CSI report, it may cross-reference to determine which WTRU the report is from and what type of CQI it is (e.g., $CQI_{end}$ or $CQI_{start}$) (2306). The eNB/HeNB may store the CQI information for the WTRU according to CQI type (2308) and schedule a supplementary cell according to the CQI reported for the start and end of the LTE active period (2310). On a condition that the eNB/HeNB needs $CQI_{end}$ information for a particular WTRU, the eNB/HeNB may schedule an aperiodic CSI request for the WTRU in the last sub-frame of an active period. For example, for a case where the LTE active periods are aligned at the beginning of a coexistence gap, this may correspond to sub-frame 9 (2314).

Figure 24A:
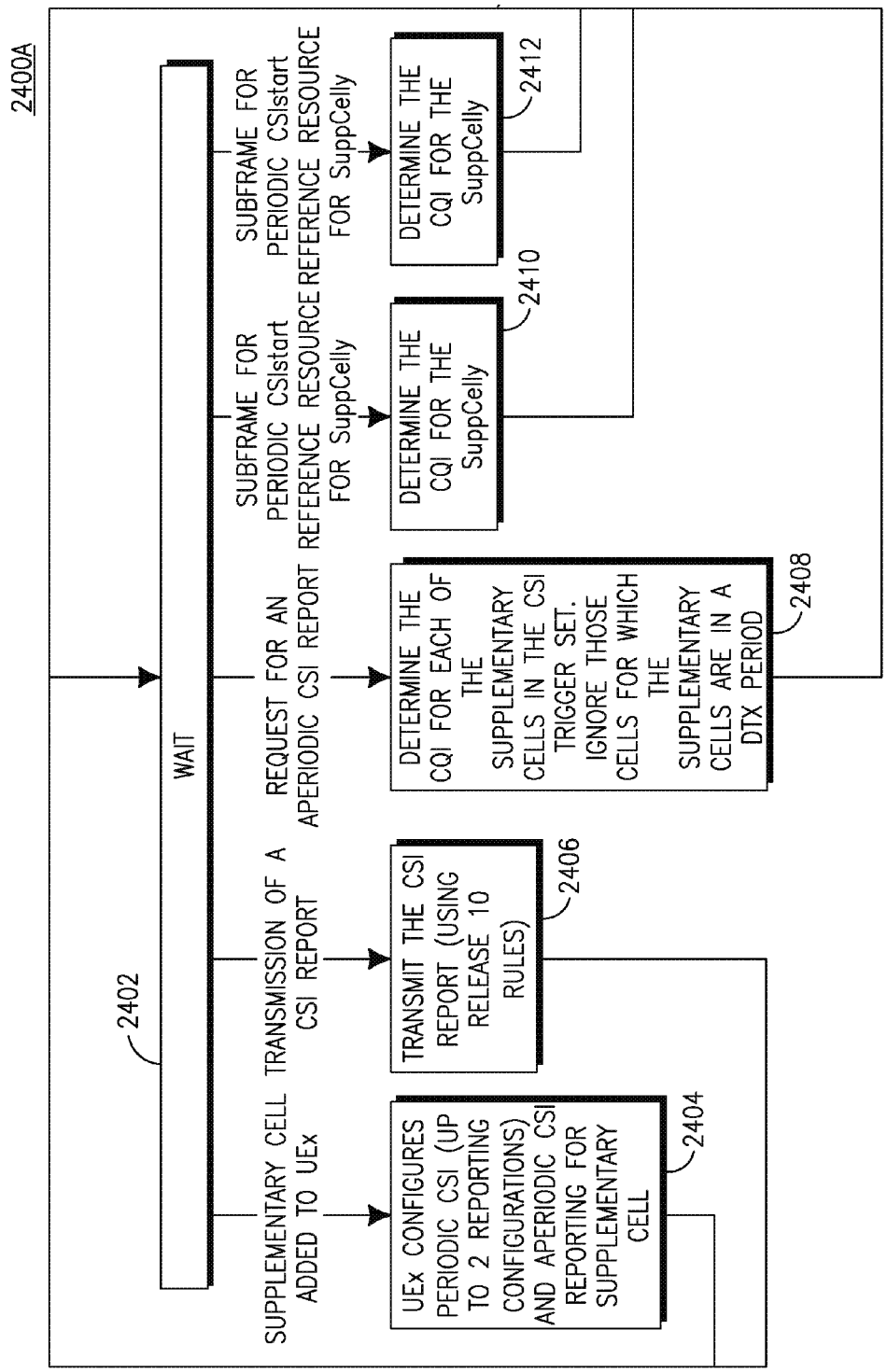
FIG. 24A is a flow diagram of a method for supplementary cell CSI reporting at the WTRU.

FIG. 24A is a flow diagram 2400A of a method for supplementary cell CSI reporting at the WTRU. In the example method illustrated in FIG. 24A, the WTRU is initially in a waiting state (2402). On a condition that a supplementary cell is added for the WTRU, the WTRU may configure periodic CSI for up to 2 reporting configurations and aperiodic CSI reporting for the added supplementary cell (2404). On a condition that a CSI report is to be transmitted, the WTRU may transmit the CSI report (e.g., using LTE Release 10 rules) (2406). On a condition that the WTRU receives a request for an aperiodic CSI report, the WTRU may determine the CQI for each of the supplementary cells in the CSI trigger set and ignore those cells for which the supplementary cells are in a DTX period (2408). On a condition that a sub-frame for periodic $CSI_{start}$ reference resource for a particular supplementary cell occurs, the WTRU may determine the CQI for the supplementary cell (2410). Similarly, on a condition that a sub-frame for a periodic $CSI_{end}$ reference resource for a particular supplementary cell occurs, the WTRU may determine the CQI for the supplementary cell (2412).

In addition to CSI reporting, coexistence gaps may also impact discontinuous reception (DRX) operation. For the case of carrier aggregation between a primary cell and a supplementary cell, a single common set of DRX parameters may be used for both cells. However, due to the presence of the LTE OFF periods, the interpretation of each DRX parameter by the WTRU may need to change as DRX active sub-frames (from the point of view of DRX) may fall within an OFF period. A WTRU configured in DRX mode may monitor PDCCH during the DRX active time. In these sub-frames, the WTRU may monitor PDCCH on the primary cell as well as PDCCH on the supplementary cell, if the supplementary cell is configured to transmit PDCCH for that WTRU and if that sub-frame does not fall within an LTE OFF period. When a WTRU wakes up following a short DRX cycle or a long DRX cycle, the eNB/HeNB may only schedule resources on the supplementary cell for sub-frames in the DRX active time that do not fall within the LTE Off period. For this reason, the eNB/HeNB may configure the DRX parameters such that the shortDRX-Cycle, if used, may have a minimum value of sf10 and the drxStartOffset may be such that the start of the DRX ON duration coincides with the second sub-frame of the LTE active period. The WTRU may interpret the drxRetransmissionTimer and the drxInactivityTimer differently depending on where the last transmission was received. If the last transmission was received from the primary cell, the number of PDCCH sub-frames to be counted, when compared with the timer, may be the absolute number of sub-frames (e.g., counted on the primary cell). If the last transmission was received from the supplementary cell (either through cross-carrier scheduling from the primary or through a Supplementary Cell PDCCH), the number of PDCCH sub-frames to be counted, when compared with the timer, may be the number of non-LTE-OFF sub-frames on the respective supplementary cell that have elapsed since the timer was started. If both a primary cell and supplementary cell allocation were received in the same sub-frame, the timers may be based on non-LTE-OFF sub-frames (e.g., as though the last transmission was received on the supplementary cell).

Figure 24B:
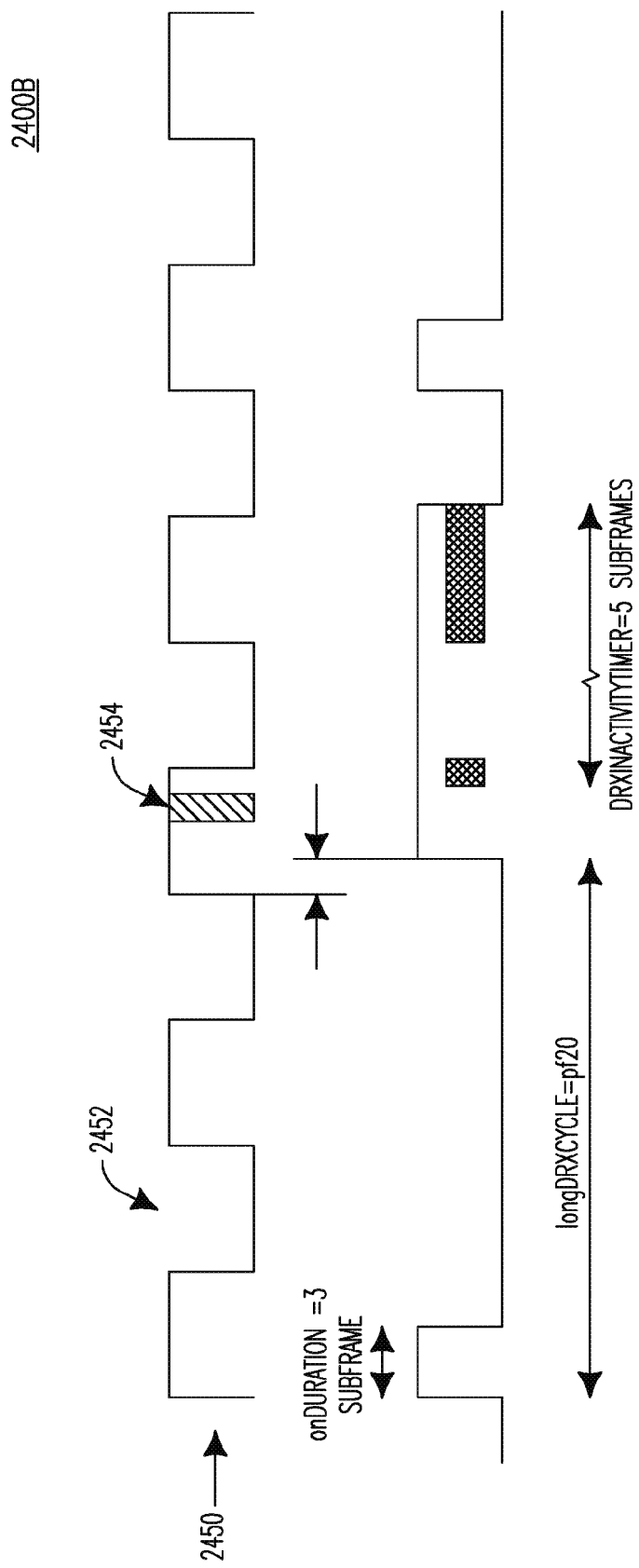
FIG. 24B is a diagram illustrating a supplementary cell duty cycle having a short DRX cycle.

FIG. 24B is a diagram 2400B illustrating a supplementary cell duty cycle 2450 having a short DRX cycle configured of coexistence gaps 2452 and DRX ON periods. In the example illustrated in FIG. 24B, the eNB/HeNB may configure the DRX parameters such that the shortDRX-Cycle may have a minimum value of sf10 and the drxStartOffset may be such that the start of the DRX ON duration coincides with the second sub-frame 2462 of the LTE active period 2460.

The control of supplementary cells may be different from the control of licensed secondary cells used for LTE carrier aggregation. In an embodiment, an eNB/HeNB may control the operation of the supplementary cells at three different levels: configuration, operating mode and activation. The first (configuration) level pertains to the details of the supplementary cells, such as how the PHY is configured, how the MAC is configured, how often the WTRU is required to make measurements and how the measurements are to be reported. This level may be applicable to all WTRUs in a cell (i.e., it may be cell-wide). The second (operating mode) level relates to the operating mode of the configured cell (e.g., how the cell is used for carrier aggregation). The operating mode may be TDD based, FDD based or off. The details for each operating mode may be included in the cell configuration. This level may also be cell-wide. The third (activation) level deals with the activation/deactivation of a supplementary cell for an individual WTRU. As a result, the scope may be limited to a single WTRU.

Two embodiments of the different operating modes are described herein. In one embodiment, the different operating modes may be treated as different configuration parameters that pertain to one supplementary cell. Thus, the network and the WTRU see a single supplementary cell that is changing from one to another (also referred to as a Single-Cell interpretation). In another embodiment, the different operating modes may be considered as different supplementary cells (also referred to as Multi-Cell interpretation).

In a Single-Cell interpretation, a cell may be characterized by a configuration that includes the necessary information to function in each of its potential operating modes. A cell may have any number of operating modes, of which only one is the active mode and all others are dormant. When an operating mode is active, the WTRU may be expected to follow the operating procedures for this mode. For example, it may need to take measurements on the channel, monitor the DL control information, send channel quality feedback to the network, etc. The complete list of procedures may depend on the particular operating mode. In contrast, when an operating mode is dormant, the WTRU may not necessarily follow the operating procedures associated with this mode. In an embodiment, the following operating modes may be considered for a cell: FDD DL only, FDD UL only, FDD shared, enhanced TDD, and OFF. The OFF mode may deal with the case where the supplementary cell is configured for operation but is not being used for carrier aggregation.

Figure 25:
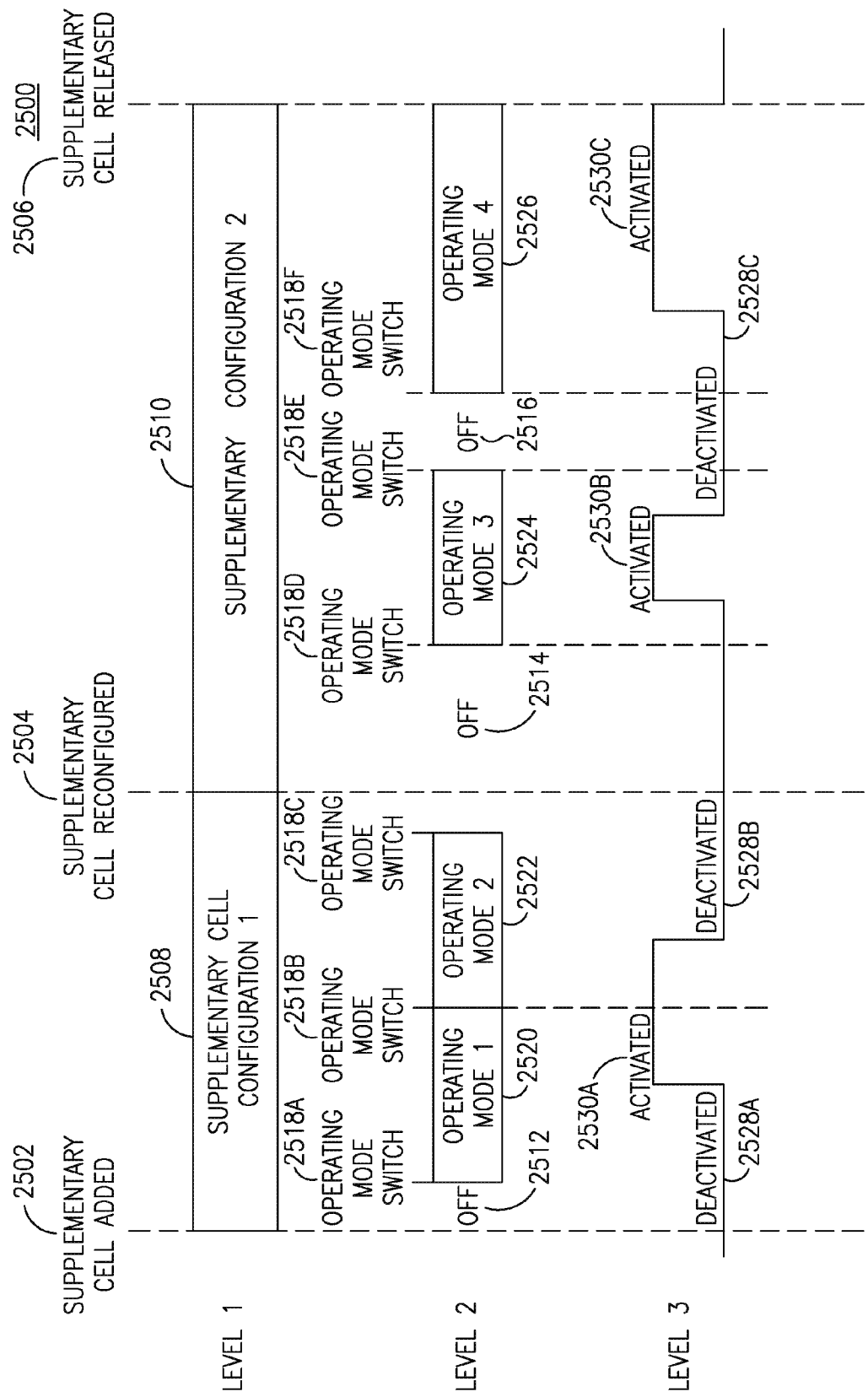
FIG. 25 is a signal diagram illustrating the relationship between the different levels of supplementary cell control.

FIG. 25 is a signal diagram 2500 illustrating the relationship between the different levels of supplementary cell control. The example in FIG. 25 illustrates three events: the addition of a supplementary cell 2502, the reconfiguration of a supplementary cell 2504 and the release of a supplementary cell 2506. In level 1, supplementary cells 1 and 2 are configured (2508/2510). In level 2, operating mode switching may be carried out, which may include making a dormant operating mode active and downgrading the current active mode to dormant. In the example illustrated in FIG. 25, three operating mode switches 2518a, 2518b and 2518c occur for supplementary cell configuration 1 to switch the operating mode from off (2512) to operating mode 1 (2520) to operating mode 2 (2522). Similarly, three operating mode switches 2518d, 2518e and 2518f occur for supplementary cell configuration 2 to switch the operating mode from off (2514), to operating mode 3 (2524), to off (2516), to operating mode 4 (2518). In level 3, a supplementary cell may be used actively by some WTRUs but not by others. Level 3 allows a WTRU to treat supplementary cells as either activated or deactivated. In the example illustrated in FIG. 25, supplementary cell configuration 1 has a period where it is activated (2530a) and periods where it is deactivated (2528a and 2528b). Similarly, supplementary cell configuration 2 has periods where it is activated (2530b and 2530c) and periods where it is deactivated (2528b and 2528c).

In an embodiment, level 1 and level 2 control may be combined. In such a case, each individual operating mode switch may trigger supplementary cell reconfiguration. Although this may lead to potential increase in RRC load and may suffer from large latency to process the RRC message, it may be an acceptable solution in case where the operating mode changes infrequently.

With respect to level 1, the network is responsible for determining the need for supplementary cells (e.g., based on demands from the WTRUs or availability of spectrum). The network relies on algorithms (e.g., running in some radio resource management (RRM) functionality) to determine whether to add or release a supplementary cell to a given eNB. As described above, these supplementary cells may have unique characteristics that make their configuration somewhat different from secondary cells. The re-used configuration fields of the cell are described in Table 6 below. The new or modified configuration fields of the cell are described in Table 7 below.

TABLE 6

| | |
|---|---|
| Supplementary cell index | Index to the supplementary cell used to refer to the cell at layers below the RRC |
| Cell identification (Physical Cell ID and frequency of operation) | As defined for Secondary Cells |

TABLE 7

| | Description |
|---|---|
| Type of Spectrum | Type of channel the WTRU will operate in (e.g. Sublicensed, Available or PU Assigned). In some cases, the WTRU may have to take additional steps to use these channels. For example for PU Assigned spectrum, additional measurements and reporting may have to be done by the WTRU. |
| Bandwidth of operation | Bandwidth of the cell (common to all operating modes) This may be different for supplementary cells. For instance, the bandwidth information may include details regarding blacklisted sub-bands within the operating bandwidth, For example, a cell may be allocated 2 TVWS channels (total of 12 MHz) but have certain portions reserved for other secondary users (e.g., a narrowband wireless microphone or a competing LTE system). This may be used for coexistence purposes. |
| PUCCH configuration | In some cases, use of supplementary cells may require that the PUCCH be carried in a reserved portion of the licensed band PUSCH. The details may need to be provided to the WTRU. |
| PDCCH configuration | In some cases, use of supplementary cells may require that the PDCCH be carried in a reserved portion of the licensed band PDSCH. |
| Uplink configuration details Power details SRS configuration PUSCH configuration CQI reporting | Used on UL only mode, shared mode, or TDD mode In some cases, the method of CQI reporting may be different for supplementary cells (e.g., how to measure or when to send feedback). In such cases, the CQI configuration may be tailored for supplementary cells. Similarly, power details specific to supplementary cell use may be required. |
| DL Configuration details | Used on DL only mode, shared mode, or TDD mode. CSI configuration may be tailored for |

TABLE 7-continued

| | Description |
|---|---|
| PHICH configuration (if carried on Supplementary cell) | supplementary cells (as a result, it may use a different configuration than that used for primary and secondary cells). PHICH configuration (if carried) may be tailored for supplementary cells (as a result, it may use a different configuration than that used for primary and secondary cells). |
| PDSCH configuration CSI configuration | |
| Coexistence Gap schedule | The schedule for the coexistence gap to allow neighbor systems to use the LE spectrum. The schedule may be defined based on a period and size of gap. |
| Measurement Configuration | Details for the type of measurements to be performed on the supplementary cells as well as the reporting of these measurements. For example, a WTRU may be told to monitor for TV signal power above a certain threshold. This is in addition to the inter-frequency and intra-frequency measurements that may already be performed by the WTRU as part of an LTE Release 10 measurement. |

In Table 7, a sublicensed channel may be a TVWS channel that is sublicensed to an operator or user for a specific geographical area and for a specific time that is not used by any primary or other secondary users. Further, an available channel may be a TVWS channel that is free from primary users but may be used by any secondary users. Further, a PU assigned channel may be a TVWS channel used by a primary user that requires secondary users to leave the channel if a primary user is detected.

Although the information in Table 7 has been grouped according to functionality, it may also be grouped according to operating mode. For example, the supplementary cell configuration information may be grouped into configuration parameter sets pertaining to FDD DL only, FDD UL only, FDD shared, and enhanced TDD. Each parameter set may include the necessary configuration for that operating mode. For example, in the case of DL FDD only mode, the parameter set may include supplementary cell index, cell identification (e.g., physical cell ID and frequency of operation), type of spectrum, bandwidth of operation, PUCCH configuration, PDCCH configuration, coexistence gap schedule, measurement configuration and DL configuration details. Alternatively, the configuration details may be divided into those that are common to multiple operating modes and those that are operating mode specific. In such a case, the network may send the common parameters followed by a list of operating mode specific parameter sets. In either case, the sets may be numbered to allow the network to quickly refer to these in cases that a configuration needs to be changed.

For an embodiment with a DL only supplementary cell, the configuration of the cell may be achieved through an RRC-ConnectionReconfiguration message carrying a supplementary cell specific sCellToAddModList IE. This IE may be modified to take into account the unique features of supplementary cells as compared to secondary cells. For example, the potential need for duty cycle for each cell, the possibility to dynamically decide whether or not to transmit PBCH, PHICH, and/or PDCCH physical channels, if PDCCH transmission is supported, the modified configuration of this channel, the modified CQI reporting rules for the supplementary cells, and the modified cross-carrier scheduling rules for the supplementary cells. In addition, the IE may include a new flag to denote that the configuration applies to a supplementary cell. Table 8 below provides a list of configuration details for a DL only supplementary cell, divided into 3 categories: cell identification, common, and dedicated. Those fields which are new to supplementary cells are shown shaded.

TABLE 8

| | Description | | Range of Values | |
|---|---|---|---|---|
| Cell Identification Configuration | Serving Cell Index | | INTEGER (1 ... 7) | |
| | Cell Indentification | Physical Cell ID | INTEGER (0 ... 503) | |
| | | DL Carrier Frequency | INTEGER (0 ... maxEARFCN) | maxEARFCN = 65535 |
| | Supplementary Cell-Indication | | Boolean | Flag to indicate if cell is a supplementary Cell |
| Common Supplementary Cell Configuration | DL bandwidth | | ENUMERATED {n6, n15, n25, n50, n75, n100} | |
| | Duty Cycle Duration | | [10, 20, etc] msec | |
| | PBCHPresence-Indication | | Boolean | |
| | Common Antenna Information | | ENUMERATED {an1, an2, an4, spare1} | Antenna port count |
| | MBSFN Sub-Frame Configuration | | NA | |
| | PHICH configuration | PHICHDuration | ENUMERATED {normal, extended} | |
| | | PHICH Resource | ENUMERATED {zero, one Sixth, half, one, two} | |

TABLE 8-continued

| | | | | |
|---|---|---|---|---|
| | Common PDSCH Configuration | Reference Signal Power | INTEGER (-60 ... 50) | Power of Cell Specific Reference Signals |
| | | $P_B$ | INTEGER (0 ... 3) | Offset of PDSCH transmission power (in OFDM symbols with RSs) |
| | Common PDCCH Configuration | PDCCH BW PDDCH location | [1.4, 3, 5] MHz [low, mid, high] | |
| Dedicated Supplementary Cell Configuration | Antenna Information | Transmission Mode | [tm1, tm2, tm3, tm4, tm5, tm6, tm7, tm8-v920, tm9-v1020, spare7, spare6, spare5, spare4, spare3, spare2, spare1] | |
| | | Codebook subset restrictions | | |
| | | UE Transmit Antenna Selection | Release or Setup | |
| | | If setup: | [closedLoop, openLoop] | |
| | Cross Carrier Scheduling Configuration | Non-cross-carrier scheduled: Cross carrier scheduling allowed | BOOLEAN | |
| | | Cross-carrier scheduled: Serving Cell ID | INTERGER (0 ... 7) | |
| | | Cross-carrier scheduled: PDSCH Symbol Start | [0, 1, 2, 3, 4] | |
| | CSI-RS Configuration | [...] | [...] | Same as R10 |
| | Dedicated PDSCH Configuration | $P_A$ | [-6 -4.77, -3, -1.77, 0, 1, 2, 3] dB | |
| | CQI Report Configuration of SCell | Aperiodic Reporting Mode | | |

TABLE 8-continued

| | |
|---|---|
| Adjustment in $P_A$ if CRS used for measurements | [-1, 2, 3, . . . 6] |
| Periodic reporting | Release or Setup |
| If setup: | PUCCH Index for antenna ports P0 and P1 [0, 1, 2, . . . , 1184] |
| If setup: | Periodicity and Offset Configuration [0, 1, 2, . . . , 1184] |
| If setup: | Periodic CQI Format (wideband or subband) |
| If setup: | RI Configuration Index [0, 1, 2, . . . , 1023] |
| If setup: | Should we use CQI masking? |
| If setup: | Periodicity and Offset Configuration for CSI start [0, 1, 2, . . . , 1184] |
| If setup: | RI Configuration Index for CSI start [0, 1, 2, . . . , 1023] |
| If setup: | Should we configure PMI/RI reporting? |

Upon reception of an RRCConnectionReconfiguration message with a sCellToAddModList IE, a WTRU may first evaluate whether the configuration is for a supplementary cell (e.g., by verifying the presence of SupplementaryCellIndication). If present, the WTRU may know that the assigned EARFCN applies to the shared spectrum band, and the WTRU may determine the DL carrier frequency. All other aspects of the cell identification may be as defined for secondary cells. As part of the common configuration, the WTRU may obtain the common secondary cell configuration information. The WTRU may obtain knowledge of cell duty cycle duration. The WTRU may configure its PSS and SSS monitoring according to the duty cycle duration. The WTRU may determine whether the cell carries the PBCH physical channel by evaluating the PBCHPresenceIndication. If present, the RRC may configure its lower layers to monitor the PBCH. However, if not present, the RRC may configure the lower layers to process the PBCH slot (e.g., second slot of sub-frame 0) as any other non-synchronization slot. The WTRU may determine the number of PHICH groups supported in the supplementary cell. Upon reception of a PHICH duration of 0, the RRC may configure the lower layers not to monitor the PHICH in the supplementary cell. The WTRU may determine the PDCCH configuration for the supplementary cell (e.g., by monitoring the Common PDSCH Configuration). If present, and if the WTRU is not configured for cross-carrier scheduling, the RRC may configure the lower layers with the location {low, mid, high} and BW {1.4, 3, 5} of the PDCCH within the shared spectrum channel.

As part of the dedicated configuration, the WTRU may obtain the dedicated supplementary cell configuration information and the WTRU may be provided with the details for cross-carrier scheduling and may be configured with a PDSCH symbol start set to 0. In such an embodiment, the RRC may configure its lower layers to begin receiving the PDSCH transmissions on the supplementary cell from OFDM symbol 0. The WTRU may be configured with a periodic CSI reporting. The RRC may configure the MAC and PHY to determine the CQI based on the appropriate CSI Reference resources. The WTRU may optionally be provided the configuration details for a second periodic CQI report. This report may be geared for CQI reporting for sub-frames at start of LTE Active Period. Upon receiving this configuration, the RRC may configure the MAC and PHY to make the CQI calculations on the appropriate CSI Reference resources.

WTRUs capable of supporting supplementary cell operation may provide a capability indication to the network (either at time of initial registration or after being queried from the network). This may be an extension to the LTE UECapabilityInformation, which may include details as to the channel support in the LE band. As an example, for TVWS, the WTRU may include additional information in the supportedBandListEUTRA IE to indicate capability specific to supplementary cells. The WTRU may indicate whether UL only operation is supported. The WTRU may signal its spectrum sensing capabilities, which may describe what kind of spectrum sensing algorithm is supported. It may also signal whether primary user detection of DTV signal and wireless microphone are supported. It may also signal if feature detection for secondary users is supported. The WTRU may also signal the FCC ID of the device, for example to meet any regulatory requirements.

When a Node B initiates the operation of a supplementary cell or reconfigures a supplementary cell, the network may provide the cell's configuration information for all available operating modes to the capable WTRUs. Each WTRU may have a local store of supplementary cell configurations corresponding to each operating mode. Such mappings may exist for all supplementary cells for which the WTRU deems fit for aggregation. In such a case, the network may simply indicate an operating mode transition to ensure a successful cell transition. This may be accomplished using one or a combination of the following techniques. For example, the cell configuration information may be broadcast in the SI of the associated primary cell. For another example, the network may provide the information through dedicated signaling to all capable WTRUs (e.g., using an RRCConnectionReconfiguration message with a new supplementary cell specific IE). For another example, the network may use a new RRC message directed to a SuppCell specific RNTI. Here, capable WTRUs may monitor for this RNTI and be able to read the supplementary cell configuration details. This information may be sent periodically by the network in order to provide the configuration information to WTRUs entering connected mode. For another example, in cases where the supplementary cell carries some DL SI, the primary cell may need to only carry a pointer to the supplementary cell frequency. The WTRU may then be responsible for reading this SI from the supplementary cell.

Upon receiving a supplementary cell reconfiguration, the WTRU may need to stop the active operating mode in order to effect the requested change. For example, if a cell is operating in DL only mode and the network determines that it needs to change the operating frequency or PDSCH configuration, then the active operating mode may be temporarily suspended until a scheduled time after which the DL only mode may be restarted. However, if the reconfiguration is affecting a dormant operating mode, then the supplementary cell operation may not be effected. Here, the reconfiguration may happen transparently.

With respect to level 2, operating mode switching may involve making a dormant operating mode active and downgrading the current active mode to dormant. This may occur as a result of decisions made in the network. For example, a cell operating in FDD DL only mode may suddenly begin to experience UL congestion. The algorithms in the network may decide to switch to FDD shared mode. As the WTRU already has the configuration details for shared mode operation (this is a dormant operating mode), it may only need to send an indication to the WTRUs to make the shared mode active and downgrade the FDD DL only mode to dormant.

Some of the operating modes may require only an indication from the network, while others may require that the network to provide some additional operating mode details. For example, a shared mode operation may require the network to provide the shared mode pattern to be used. For another example, an enhanced TDD operation may require the network to provide the TDD UL/DL configuration pattern to be used. The term indication may be used herein to refer to the operating mode to be made active as well any special details that may be specific to this operating mode.

The network may signal the operating mode to use by one or a combination of the following techniques. For example, the network may send the indication in an RRC control message. In this example, the indication may be carried either in a dedicated RRC message or in a multicast RRC message. For another example, the network may embed the indication in a MAC header. For example, in LTE, the indication may be included in a MAC control element (CE). The MAC CE may be sent individually to each WTRU. Alternatively, the MAC CE may be sent to a group of WTRUs through a group multicast address (e.g., SuppCell RNTI). To increase the likelihood that all WTRUs receive the indication, the network may send the message in repeated sub-frames. For another example, the network may send the indication in a PHY signal. This signal may be carried in the licensed band (e.g., on primary or secondary cells) or in the unlicensed band. In LTE, the indication may be carried in the PDCCH using a special DCI format. In order to quickly reach all WTRUs, the indication may be carried on a common PDCCH monitored by all WTRUs. This information may be sent to a group of WTRUs using a multicast address (e.g., SuppCell RNTI). An existing DCI format may be used for the indication, with the fields redefined for carrying the operating mode information. The WTRU may use the SuppCell RNTI to distinguish between the LTE Release 10 interpretation of the DCI and the new operating mode indication. For another example, the network may use a pre-configured operating mode schedule that is synchronized between the WTRU and the network (e.g., based on the SFN). The schedule may provide details as to the times and durations of certain operating modes. For example, the FDD DL only mode may start at time t1 and end at time t2, the OFF mode may start at time t2 and end at time t3, and the FDD UL may start at time t3 and end at time t4. The schedule may be specified for a fixed duration or may be periodic. The schedule information may be sent, for example, through RRC signaling, MAC signaling, or PHY signaling using any of the techniques described for the activation mode. Alternatively, the schedule may be broadcast via MIB/SIB in the primary cell.

Upon reception of an operating mode switch, the WTRU may need to change the configuration of its lower layers (e.g., depending on the type of operating mode switch selected). For example, in an LTE system, this may impact the Hybrid ARQ entities at the MAC layer, the physical layer receive and transmit chains, and the PHY measurement entities. Table 9 below defines the major changes for a few potential operating mode changes. The WTRU may be required to complete these changes within a defined period of time (e.g., K sub-frames).

TABLE 9

| Pre-Operating Mode | Post-Operating Mode | | | |
| --- | --- | --- | --- | --- |
| | FDD DL Only | FDD UL only | FDD Shared Mode | Off |
| FDD DL Only | | Stop monitoring quality of supplementary cell (e.g., RSRP or RSRQ measurements) Stop monitoring supplementary cell for CQI and sending CQI reports for Supplementary Cell Stop monitoring PDCCH if carried on Supplementary Cell Take actions to deal with the ongoing DL HARQ processes on the | Use modified rules for monitoring quality of supplementary cell (e.g., RSRP or RSRQ measurements) Use modified rules for CQI monitoring and reporting Change PDCCH monitoring procedure (if carried on Supplementary Cell) to only include the DL sub-frames Take actions to deal with the ongoing DL HARQ processes on the | Stop monitoring quality of supplementary cell (e.g., RSRP or RSRQ measurements) Stop monitoring supplementary cell for CQI and sending CQI reports for Supplementary Cell Stop monitoring PDCCH if carried on Supplementary Cell Take actions to deal with the ongoing DL HARQ processes on the |

TABLE 9-continued

| Pre-Operating Mode | Post-Operating Mode | | | |
|---|---|---|---|---|
| | FDD DL Only | FDD UL only | FDD Shared Mode | Off |
| | | Supplementary cell Transition radio for supplementary cell from receive to transmit mode Begin procedure for sending Sounding Reference Signal (SRS) Monitor PCell for cross carrier scheduled information | Supplementary cell Begin procedure for sending SRS Monitor PCell for cross carrier scheduled information | Supplementary cell Turn off radio for supplementary cell |
| FDD UL only | Stop procedure = for sending Sounding Reference Signal (SRS) Take actions to deal with the ongoing UL HARQ processes on the Supplementary cell Transition radio for supplementary cell from transmit to receive mode Begin monitoring/measuring supplementary cell and reporting CQI Begin monitoring quality of supplementary cell (e.g., RSRP or RSRQ measurements) | | Use modified rules for monitoring quality of supplementary cell (e.g., RSRP or RSRQ measurements) Use modified rules for CQI monitoring and reporting Change PDCCH monitoring procedure (if carried on Supplementary Cell) to only include the DL sub-frames Take actions to deal with the ongoing HARQ processes on the Supplementary cell Begin monitoring/measuring supplementary cell and reporting CQI Monitor PCell for cross carrier scheduled information | Stop procedure = for sending Sounding Reference Signal (SRS) Take actions to deal with the ongoing UL HARQ processes on the Supplementary cell Turn off radio for supplementary cell |
| FDD Shared Mode | Stop procedure = for sending Sounding Reference Signal (SRS) Take actions to deal with the ongoing UL HARQ processes on the Supplementary cell Use modified rules for monitoring quality of supplementary cell (e.g., RSRP or RSRQ measurements) | Stop monitoring quality of supplementary cell (e.g., RSRP or RSRQ measurements) Stop monitoring supplementary cell for CQI and sending CQI reports for Supplementary Cell Take actions to deal with the ongoing DL HARQ processes on the Supplementary cell | | Stop monitoring quality of supplementary cell (e.g., RSRP or RSRQ measurements) Stop monitoring supplementary cell for CQI and sending CQI reports for Supplementary Cell Stop monitoring PDCCH if carried on Supplementary Cell Take actions to deal with the ongoing DL HARQ processes on the Supplementary cell Take actions to deal with the ongoing UL HARQ processes on the Supplementary cell Stop procedure = for sending Sounding Reference Signal (SRS) Turn off radio for supplementary cell |
| Off | Begin monitoring/measuring supplementary cell and reporting CQI Begin monitoring PDCCH if carried on the supplementary cell (or monitor PCell for cross carrier scheduling) Begin monitoring quality of | Begin procedure for sending Sounding Reference Signal (SRS) Monitor PCell for cross carrier scheduled information | Use modified rules for monitoring quality of supplementary cell (e.g., RSRP or RSRQ measurements) Use modified rules for CQI monitoring and reporting Change PDCCH monitoring procedure (if carried on Supplementary Cell) to only include the DL sub-frames Begin procedure for sending SRS | |

TABLE 9-continued

| Pre-Operating Mode | Post-Operating Mode | | | |
|---|---|---|---|---|
| | FDD DL Only | FDD UL only | FDD Shared Mode | Off |
| | supplementary cell (e.g., RSRP or RSRQ measurements) | | Monitor PCell for cross carrier scheduled information | |

In some cases, the operating mode switch indication or signaling may need to be extremely robust. For example, use of a TVWS channel comes with very stringent requirements regarding incumbent user protection. As a result, a system may be asked to quickly evacuate a channel (e.g., stop transmitting so that the channel may be returned to the incumbent user). However, such a situation may be generalized to any spectrum that is shared between systems of different priorities. If a higher priority system requests spectrum already in use by a competing lower priority system, the lower priority system may be required to release (e.g., evacuate) the requested spectrum.

Some of the techniques for signal operating mode switch indications are very robust or can be made robust. For example, techniques that rely on dedicated RRC signaling are inherently robust as they are typically acknowledged at the RRC layer. In other cases, the network may be made aware of a failed operating mode switch and may retransmit the request. This may be applicable for cases where the operating mode switch is carried in a dedicated MAC CE.

These techniques, however, may not be applicable for broadcast/multicast operating mode switch indications. For these cases, in an embodiment, multicast and dedicated signaling mechanisms may be combined.

Figure 26:
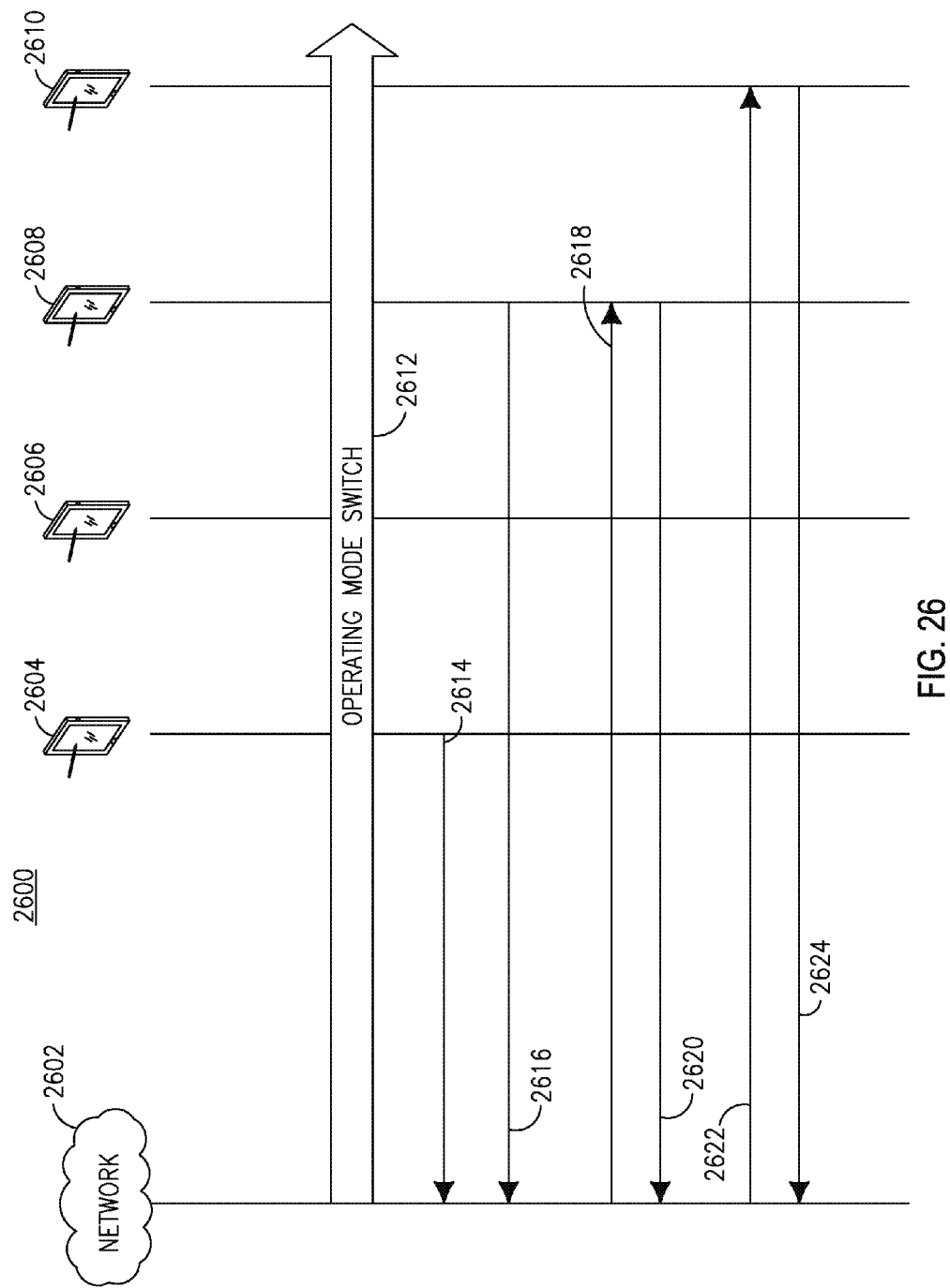
FIG. 26 is a signal diagram of signaling operating mode switch indications for broadcast/multicast operating mode indications.

FIG. 26 is a signal diagram 2600 of signaling operating mode switch indications for broadcast/multicast operating mode indications. In the example illustrated in FIG. 26, the network 2602 sends a multicast operating mode switch command 2612 (e.g., RRC layer, MAC layer (e.g., MAC CE), and PHY layer (e.g., PDCCH) to WTRUs 2604, 2606, 2608 and 2610 in the network, requiring all WTRUs receiving the command to send feedback to the network confirming reception. In the example illustrated in FIG. 26, WTRUs 2604 and 2608 receive the command and send switch confirm messages 2614 and 2616 to the network 2602. The feedback may be, for example, an RRC message, a MAC control message, or a PHY layer indication. Upon receiving the feedback, the network 2602 may be aware of all the WTRUs that failed to receive the original message and may rely on dedicated signaling to send these WTRUs an operating mode switch. In the example illustrated in FIG. 26, the network 2602 sends dedicated operating mode switch messages 2618 and 2622 to the WTRUs 2606 and 2610, respectively. Each of the WTRUs 2606 and 2610 acknowledges receipt of the operating mode switch message by sending a switch confirm message 2620 and 2624, respectively, to the network 2602.

In an embodiment, a WTRU may rely on consistent scheduling/assignment information for the supplementary cell as an indication that it has lost operating mode synchronization with the network (e.g., the network is operating in Operating Mode 1 while the WTRU thinks the cell is in Operating Mode 2) or that the network wants the WTRU to evacuate the channel and stop using the supplementary cell.

In an embodiment, the WTRU may treat reception of inconsistent information as an indication to transition to OFF mode. In FDD DL only mode, the WTRU may only expect DL scheduling assignments for the supplementary cell. On a condition that the WTRU receives a UL grant for the supplementary cell, the WTRU may transition to an OFF operating mode. In FDD UL only mode, the WTRU may only expect UL grants for the supplementary cell. On a condition that the WTRU receives a DL scheduling assignment for the supplementary cell, the WTRU may transition to an OFF operating mode. In FDD shared mode, the WTRU may know the UL and DL pattern that is expected for transmission.

Figure 27:
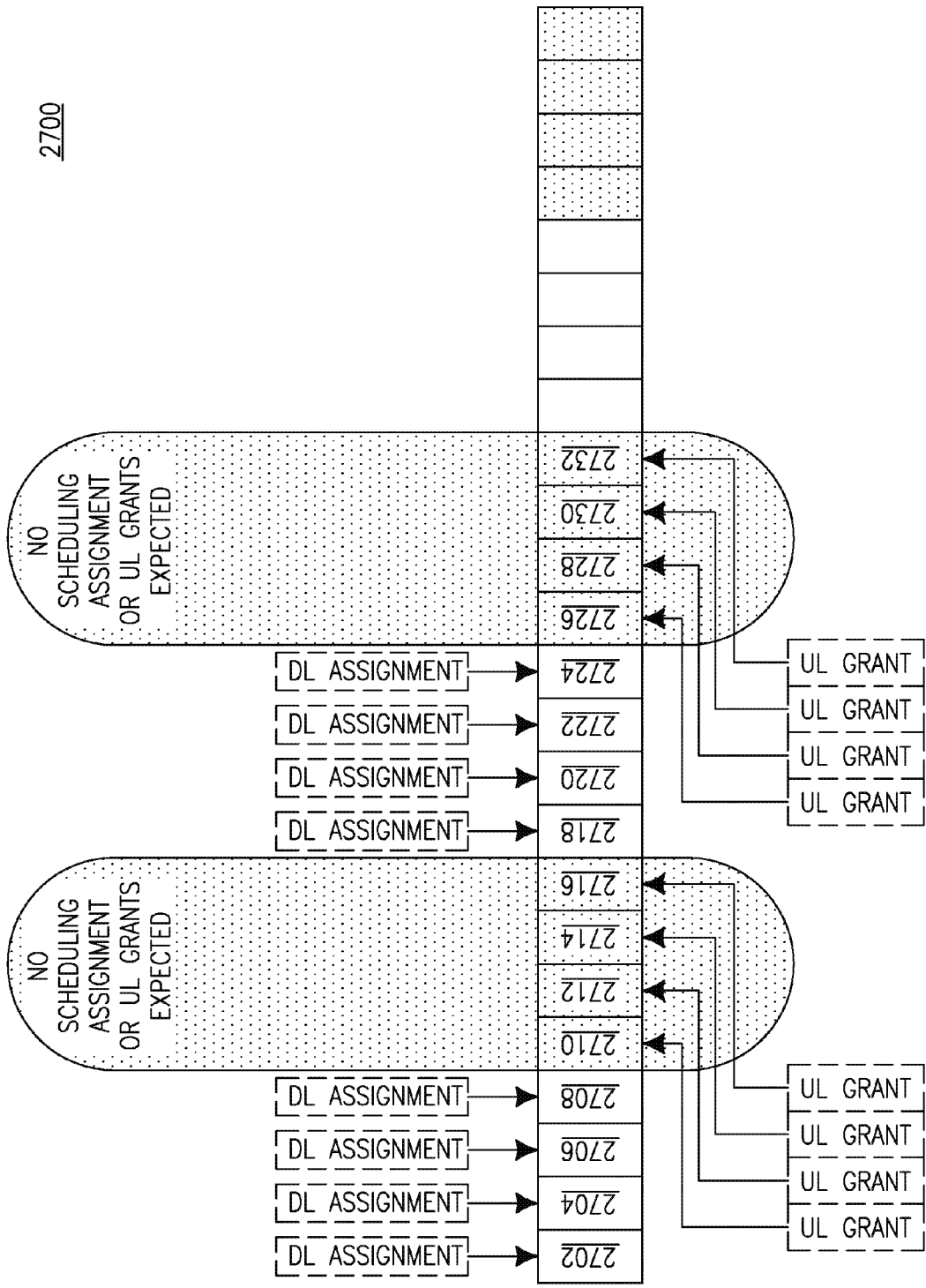
FIG. 27 is a diagram of an example UL and DL pattern that may be expected for transmission in frequency division duplex (FDD) shared mode.

FIG. 27 is a diagram 2700 of an example UL and DL pattern that may be expected for transmission in FDD shared mode. In the illustrated example, the expected pattern is 4UL: 4DL. In the illustrated example, the WTRU expects to receive a DL scheduling assignment in sub-frames 2702, 2704, 2706, 2708, 2718, 2720, 2722 and 2724. The WTRU does not expect a DL scheduling assignment in sub-frames 2710, 2712, 2714, 2716, 2726, 2728, 2730 or 2732. If one is received, the WTRU may transition to an OFF operating mode.

With respect to level 3, when a supplementary cell is configured and in a certain operating mode, it may be used for communication to and from LE capable WTRUs (depending on the specific operating mode). However, as a result of individual WTRU demands, at any given time, the supplementary cell may be used actively by some WTRUs and not by others. The final level of supplementary cell control may allow a WTRU to treat supplementary cells as either activated or deactivated. When activated, the WTRU may perform all the necessary procedures tied to that operating mode.

For an LTE Release 10 system employing carrier aggregation, activation of a secondary cell may be based on the reception of a MAC CE message or command. Deactivation of a secondary cell may be based either on reception of a similar MAC CE command or secondary cell inactivity (e.g., the WTRU has not received a DL scheduling assignment for the secondary cell or a UL grant for the secondary cell for the duration of the timer).

A similar mechanism (e.g., explicit signaling of activation, deactivation and timer based deactivation) may be used for supplementary cells but may be enhanced with an implicit activation of the supplementary cell. In an embodiment, a WTRU may activate a supplementary cell upon reception of a cross-carrier grant or scheduling information (carried on the licensed band). Here, the scheduler may need to consider the inherent latency in activating the supplementary cell. This may be especially true for an activation while in DL only mode because the WTRU may not be able to use the scheduling assignments for the first L sub-frames. As a result, the network may use dummy or empty scheduling assignments during this time. From the WTRU perspective, it may ignore all scheduling assignments received for these first L sub-frames after the implicit activation command.

In an embodiment, a WTRU may activate a supplementary cell upon reception of an operating mode switch. For example, a supplementary cell may be in FDD UL only mode and may be deactivated for a specific WTRU (WTRUk). If the network changes the operating mode of the supplementary cell (e.g., to FDD DL-only), the WTRU may decide to activate the supplementary cell. This may allow the WTRU to take measurements on the supplementary cell and send back some initial CQI measurements. This may allow the network to schedule DL traffic to the WTRU without sending an activation command, as well as to tailor the transmission to the WTRU based on more reliable CQI information.

Alternatively, the network may transmit a carrier aggregation schedule where activation of supplementary cells may be timer driven. Here, the network may relay the carrier aggregation schedule to each capable WTRU highlighting activation times (e.g., in frames and sub-frames) for all supplementary cells that may be aggregated. Since both the eNB/HeNB and WTRU are time aligned, the SFN (or the hyper frame number) may be used to accurately track activation times at which each WTRU may independently activate the concerned supplementary cell without an activation trigger (such as the ones described above) from the network.

In an embodiment, the carrier aggregation schedule may be transmitted aperiodically when the RRM detects a supplementary cell change (e.g., addition, modification or removal of a supplementary cell) for any of the supplementary cells that may be aggregated, or it may be transmitted periodically via a configurable CarrierAggregationScheduleTimer.

Figure 28A:
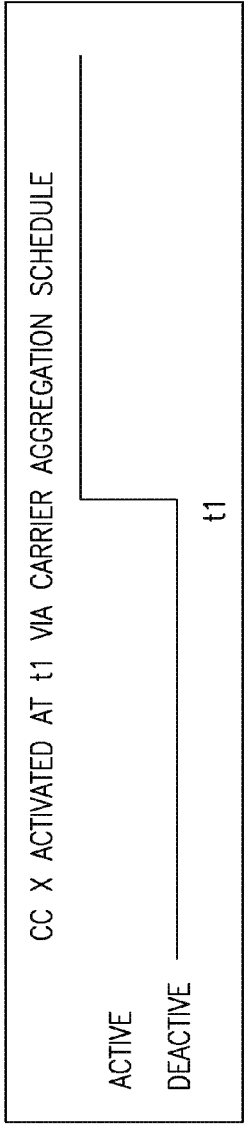
FIGS. 28A and 28B are example carrier aggregation schedules.
Figure 28B:
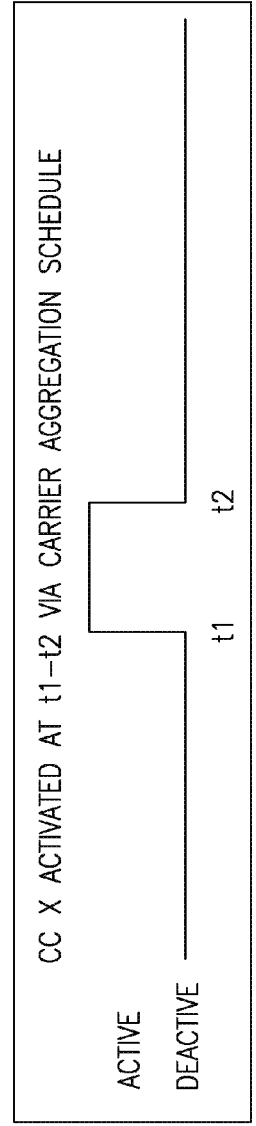

FIGS. 28A and 28B are example carrier aggregation schedules 2800A and 2800B. In the example illustrated in FIG. 28A, the carrier aggregation schedule carries absolute time values at which the concerned CC will be activate (t1 in FIG. 28A). It may be assumed that once active, the supplementary cell will continue to be active until explicitly signaled by the network. In the example illustrated in FIG. 28B, the carrier aggregation schedule carries activation time intervals (e.g., CC x will only be active between t1 and t2) and will be deactivated otherwise.

Timer based activation via carrier aggregation schedule reception may operate as follows (e.g., using one or both of the absolute timer activation method or the interval based activation mechanism). For the interval based activation mechanism, t1 may signify the lower bound of the interval. If supplementary cell x is to be activated at t1 ms in a received CA Schedule, t1>CURRENT_TTI and supplementary cell x is not yet active, supplementary cell x may be activated at t1. If supplementary cell x is to be activated at t1 ms as provided in a received CA schedule, t1>CURRENT_TTI and supplementary cell x is already active, supplementary cell x may be deactivated and activated at t1 (may be tied to a configuration or operating mode change at t1) or the supplementary cell x may continue in activated state. If supplementary cell x is to be activated at t1 ms as provided in a CA schedule and t1<CURRENT_TTI, SupplCellx may be deactivated if not already deactivated or the timing command may be ignored.

Figure 29:
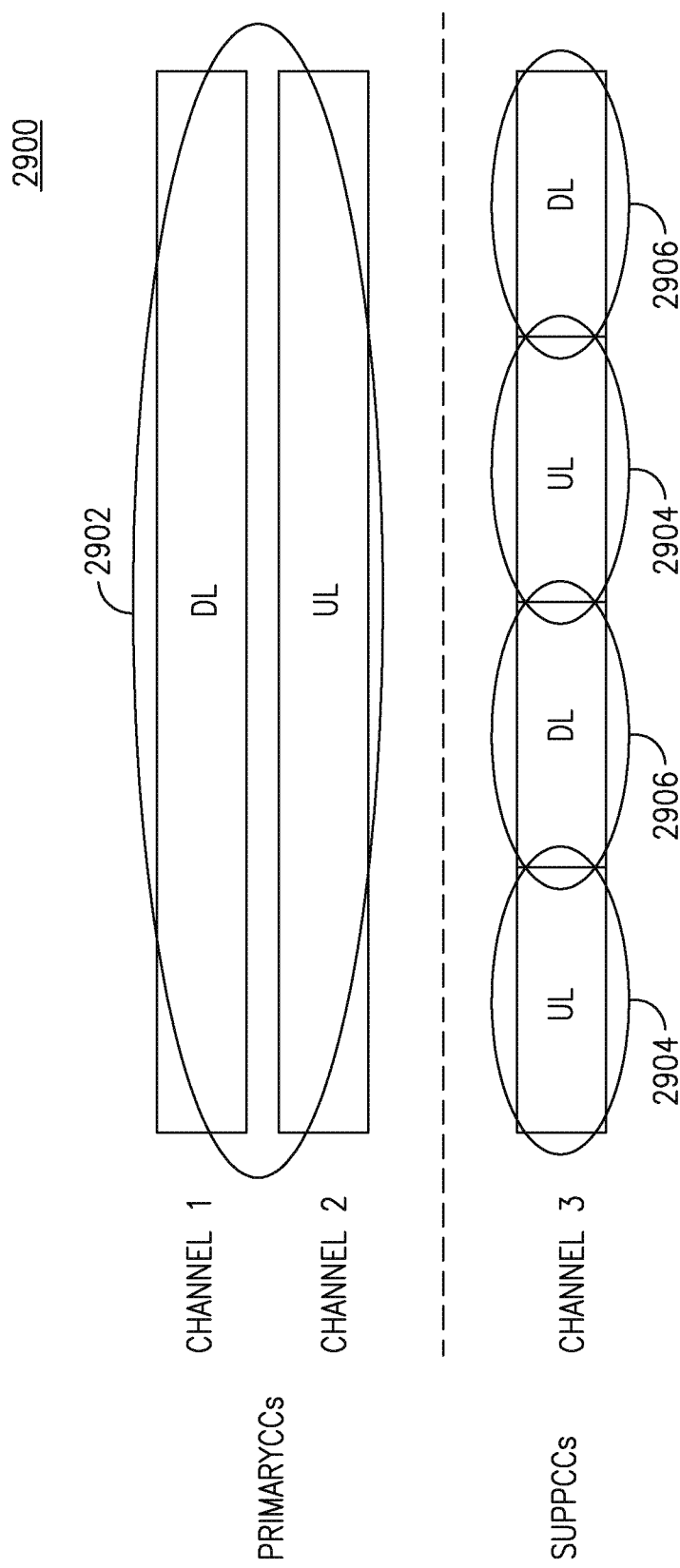
FIG. 29 is a diagram of multiple pre-configured cells.

FIG. 29 is a diagram 2900 of multiple pre-configured cells. In the illustrated example, a primary cell 2902 is pre-configured and includes a DL channel and a UL channel. Two supplemental cells 2904 and 2906 are also pre-configured. Supplemental cell 2904 is UL only, and supplemental cell 2906 is DL only.

Multi-cell transitions between different operating modes by switching between pre-configured cells may be an alternative approach to a single-cell approach that relies on an explicitly operating mode switch. It may be involved pre-configuration of a cell, for example, as illustrated in FIG. 29, using RRC messaging and quick Cell-Switch signaling to transition between the different operating modes (e.g., UL and DL in FIG. 15). This method may also include transition issues related to the HARQ buffers and measurement reporting that may occur during UL/DL and DL/UL transitions.

In an embodiment, the different operating modes may be implemented by adding up to K pre-configured cells. RRC signaling may be used to configure cells to include, for example, signaling, signaling reliability, control delay, extensibility and security control parameters for the cells. The pre-configured cells may be organized in one of a number of different ways.

Figure 30:
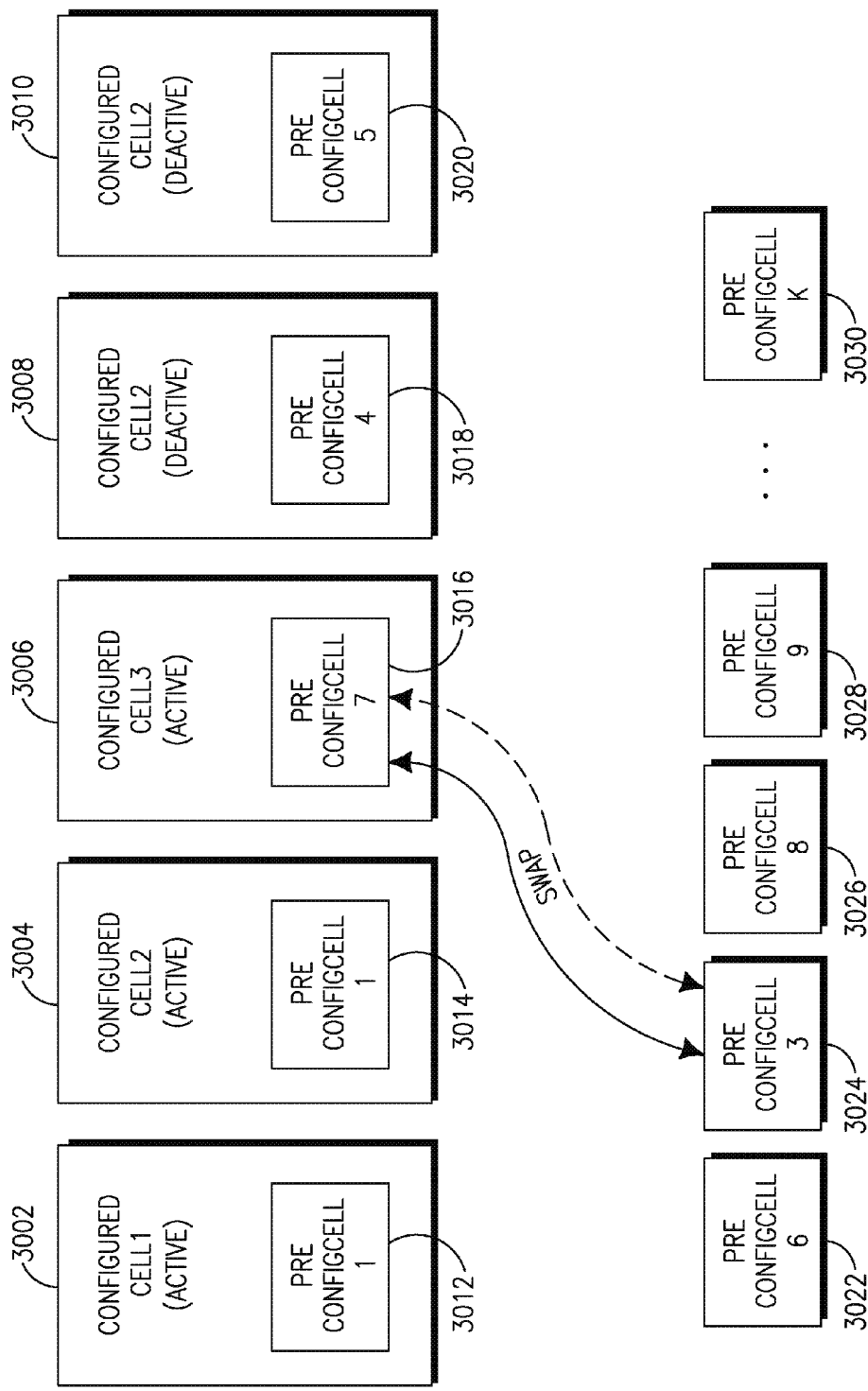
FIG. 30 is a diagram of an example system with pre-configured cells using a pool of K pre-configurations.

FIG. 30 is a diagram of an example system 3000 with pre-configured cells using a pool of K pre-configurations. In the example illustrated in FIG. 30, the pre-configured cell pool includes K pre-configurations 3012, 3014, 3016, 3018, 3020, 3022, 3024, 3026, 3028 and 3030. Five of the configurations in the pool may become configured cells. In the example illustrated in FIG. 30, configured cell 3002 is pre-configured cell 3012, configured cell 3004 is pre-configured cell 3014, configured cell 3006 is pre-configured cell 3016, configured cell 3008 is pre-configured cell 3018 and configured cell 3010 is pre-configured cell 3020. The configured cells may be activated or deactivated, and measurements may only be taken on configured cells.

New signaling from the eNB/HeNB may prompt a WTRU to swap a configured cell with a supplementary cell from the pre-configured pool to enable a quick transition between operating modes or to change channels. In the example illustrated in FIG. 30, the WTRU swaps pre-configured cell 3016 for pre-configured cell 3024 in configured cell 3006. During the swap, the configured cell may retain its active or deactivated status. For example, in the example illustrated in FIG. 30, if the pre-configured cell 3024 is swapped with pre-configured cell 3016, the configured cell 3006 may remain active and may be used immediately (in some embodiments, with gaps). Alternatively, any swapped cell may default to an inactive or active state. The eNB/HeNB may have its own list of possible cells and may issue activation, deactivation and swap commands to the WTRU.

Figure 31:
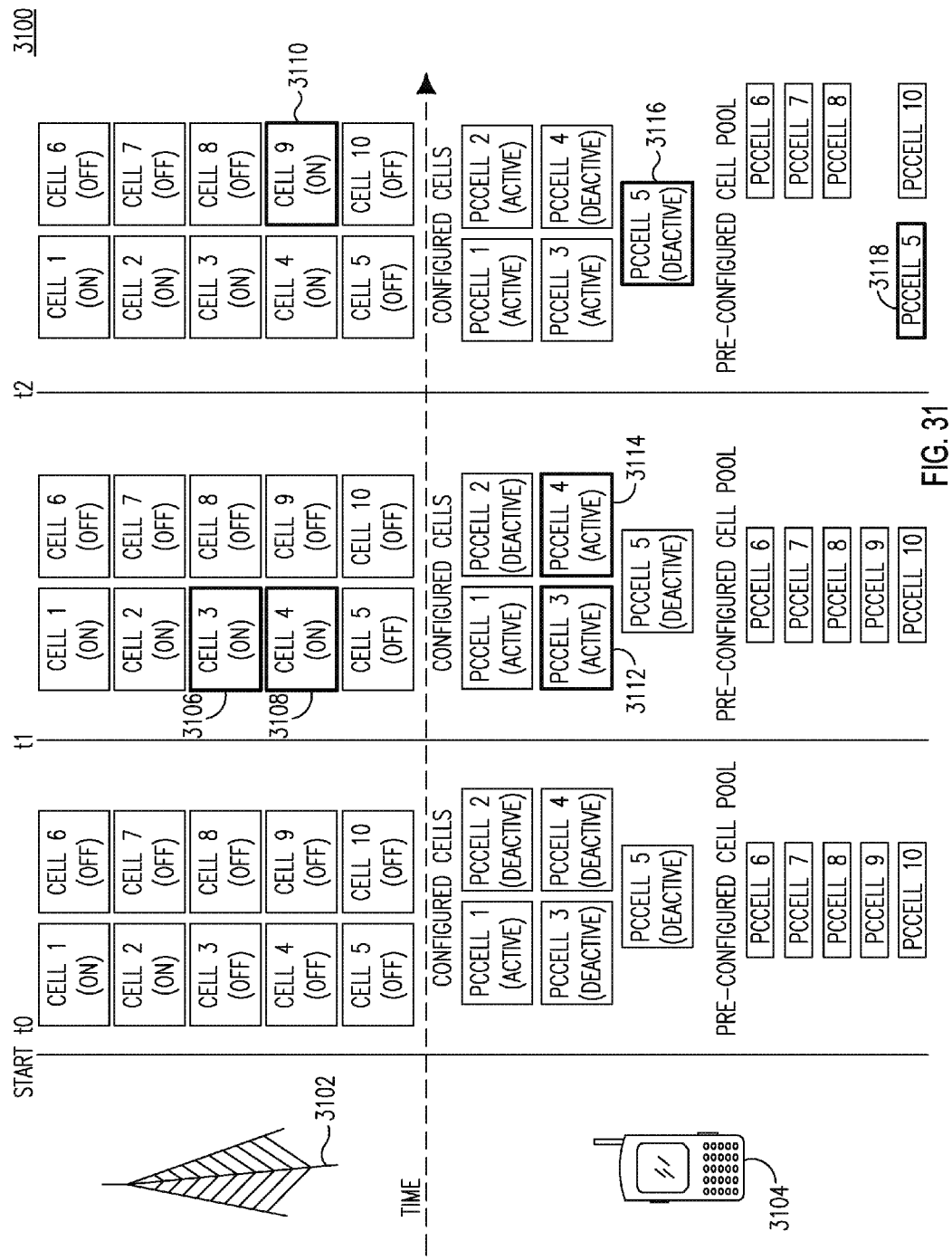
FIG. 31 is a diagram of an example system illustrating activation and cell swap commands over time.

FIG. 31 is a diagram 3100 of an example system illustrating activation and cell swap commands over time. In the example illustrated in FIG. 31, at time t1, the eNB/HeNB 3102 activates configured cells 3106 and 3108. From the perspective of the WTRU 3104, at t1, primary cells 3112 and 3114 are activated. At time t2, the eNB/HeNB 3102 may active cell 3110. From the perspective of the WTRU 3104, the primary cell 3116 may be deactivated and swapped for primary cell 3118, which may be activated.

In another embodiment, WTRUs may use the five cells from LTE Release 10 as pre-configured cells. New signaling from the eNB/HeNB may prompt the WTRU to quickly switch operating modes.

In another embodiment, WTRUs may be configured with an increased set of pre-configured cells. For example, if there are 10 alternate channels and 3 operating modes, a WTRU may have 30 pre-configured cells. A maximum of 5 pre-configured cells may be activated/deactivated at any given time. Each WTRU may be configured independently, and legacy WTRUs (e.g., with a maximum of 5 CCs) may not be impacted. The first cell in the set of cells may be the primary cell. New signaling may be sent to WTRUs to activate a cell while simultaneously deactivating the old cell. Hence, a WTRU may transition between operating modes via a cell switch.

Figure 32:
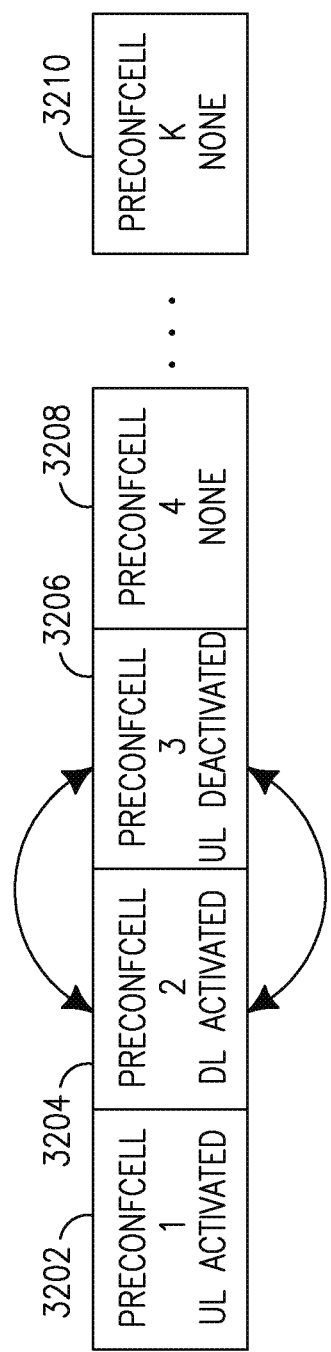
FIG. 32 is a diagram illustrating example WTRU transitions between operating modes via a cell switch.

FIG. 32 is a diagram 3200 illustrating example WTRU transitions between operating modes via a cell switch. In the example illustrated in FIG. 32, in a pre-configured cell pool, UL pre-configured cell 3202 is activated, DL pre-configured cell 3204 is activated, UL pre-configured cell 3206 is deactivated, and pre-configured cells 3208 and 3210 are not active. A cell switch occurs during which pre-configured cells 3204 and 3206 are switched such that pre-configured cell 3206 is activated and per-configured cell 3204 is deactivated.

The new signaling may be similar to the signaling used in the single-cell approach. In an embodiment, the network may signal a cell swap using one or more of the following. For example, the network may send the indication in an RRC control message. Here, the indication may be carried in a dedicated RRC message or in a multicast RRC message (e.g., using a multicast address such as SuppCell RNTI). For another example, the network may embed the indication in a MAC header. For example in LTE, the indication may be included in a MAC CE. The MAC CE may be sent individually to each WTRU or may be sent to a group of WTRUs through a group multicast address (e.g., SuppCell RNTI). To increase the likelihood that all WTRUs receive the indication, the network may send the message in repeated sub-frames. For another example, the network may send the indication in a physical layer signal. This signal may be carried in the licensed band (e.g., on primary or secondary cells) or in the unlicensed band. In LTE, the indication may be carried in the PDCCH using a special DCI format. In order to quickly reach all WTRUs, the indication may be carried on common PDCCH. This information may be sent to a group of WTRUs using a multicast address (e.g., SuppCell RNTI). An existing DCI format may be used for the indication, with the fields redefined for carrying the cell change information. The WTRU may use the SuppCell RNTI to distinguish between the LTE Release 10 interpretation of the DCI and the new cell change indication.

A format for the cell swap indication message may include one or more of the following. For example, if there are 5 pre-configured cells, 3 bits may be transmitted to indicate a cell switch. For example, a base station transmitting '000' over a cell may indicate 'no change,' and a base station transmitting '101' may indicate to switch the current cell with pre-configured cell 5 in the next frame (or sub-frame, etc). Up to 7 cells may be pre-configured using 3 bits. In another alternative, the base station may explicitly signal which cells to swap. For example, it may transmit '011' '110,' which may signal to replace cell 3 with pre-configured cell 6. Adding extra bits may enable a larger pre-configuration set.

For another example, if there are 5 pre-configured cells, a bitmap of 5 bits may be transmitted. For example, cell 1 may be the primary cell, cell 2 may be a supplementary cell configured for UL, and cell 3 may be a supplementary cell configured for DL. A WTRU receiving the bit sequence '10100' may know that the first and third cells are active. Hence, it may know that the supplementary carrier is acting in DL only. In this embodiment, the base station may continue to transmit '10100' to indicate 'no change' until it needs to switch to UL. It may then transmit, for example, '11000' to indicate that the next frame (or sub-frame, etc.) will be UL only. The bitmap format may allow multiple cells to be switched using the same command. This may be generalized to a bitmap of n bits if there are n pre-configured cells.

For another example, the UL/DL cell pairs may be grouped saving some bits. A bitmap may be used as in the previous technique. However, the first bit may be used to indicate UL or DL. For example, if there are 4 pre-configured cells (e.g., 2 supplementary UL cells and 2 supplementary DL cells), 1 bit may indicate UL or DL, and 2 bits may form a channel bitmap. For example, if the base station transmits '110,' this may signal a WTRU to change supplementary channel 2 from a DL supplementary cell to a UL supplementary cell. This may form a total of 3 bits and may encode the same information as the earlier bitmap. This method may become significant if the number of pre-configured cells increases beyond 5. Also, this technique assumes that UL/DL cell pairs are configured equivalently except for their UL/DL property.

For another example, the indication message may be sent periodically or aperiodically. If it is sent periodically, then it may indicate 'no change' when there will be no transition.

When a transition is indicated, it may apply to the next frame. During a transition, the HARQ process may need to be taken into account. For example, the supplementary cell may want to ensure the HARQ buffers are all released before performing the switch from the DL-only mode to the UL-only mode. This may require additional transmissions of the NACK'd packets. Hence, the grace period may be defined for the completeness of HARQ processes.

Additionally there may be a need for a coexistence gap to coexist with CSMA-like systems (e.g., WiFi). This may coincide with the grace period or come directly after.

In an embodiment, operating mode transitions using cell switch may be combined with one or a combination of the following channel switching techniques. An example fast channel switching technique may include channel switching using pre-configured cells. This combination may require more than 5 pre-configured cells because the UL/DL transitions described above also use cell switch techniques using pre-configured cells and, as a result, the availability of cells may otherwise become scarce. The channel switch may be indicated using the MIB and/or SIB broadcast on the supplementary channel. As some information does not need to be broadcast over SuppCCs, these resources may be used for channels switching.

The carrier indicator (CI) may be transmitted on the PDCCH and may indicate which cell a control block is addressed to. The CI may not change without RRC signaling. For example, a WTRU may decode the PDCCH with a CI indicating a packet on cell 4 after a MAC CE has indicated to switch from cell 4 to cell 5. The WTRU may implicitly know when a cell switch has occurred and should know to decode the packets scheduled to cell 4 until RRC signaling is complete. Otherwise, information may be lost.

Channel state measurement reports may be affected during transition periods. In LTE Release 10, measurements are taken on reference signals. The WTRU may take measurements on DL cell-specific reference signals (CRS) and report these results to the eNB/HeNB that is to use this information to make scheduling decisions. However, when operating in DL mode, the WTRU may not report the measurements on the same cell.

One or more of the following may be used for measurement reports. For example, measurement reports may be periodic or aperiodic. An eNB/HeNB may schedule an aperiodic measurement report as part of a PDCCH scheduling grant immediately before transitioning from DL to UL. The WTRU should know to wait a certain time for the transition after which it will transmit the report. For another example, if the operating mode transitions from UL to DL (and vice versa) often enough, the WTRU may take measurements during DL mode and implicitly know to report the measurements during UL mode. The eNB/HeNB may assume the same measurement information throughout the DL phase. For another example, reports during DL mode may be sent on the primary cell PUCCH.

In an example multi-cell embodiment without pre-configured supplementary cells, supplementary cell control may be similar to that used for secondary cell control, whereby the network may only configure and activate/deactivate these cells. However, supplementary cell control may have the following differences. First, the cell configuration details may be specific and tailored to supplementary cells. Second, the network may treat different operating modes as different configured cells. Consequently, in order to change the operating mode of a supplementary cell, the network may need to remove the old cell (e.g., old operating mode) and subsequently add the new cell (e.g., with the new operating mode) using RRCConnectionReconfiguration.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
   a memory configured to store a plurality of coexistence gap patterns, each of the plurality of coexistence gap patterns defining a pattern of transmission periods and silent periods for the WTRU and corresponding to a respective duty cycle of a plurality of duty cycles; and
   a control unit configured to select one of the plurality of coexistence gap patterns based on information received from a base station regarding a duty cycle for a wireless cell operated by the base station and control the WTRU to transmit information during the transmission periods and not transmit information during the silent periods of the selected one of the plurality of coexistence gap patterns.

2. The WTRU of claim 1, wherein the silent periods are periods during which transmission to and from the WTRU is absent.

3. The WTRU of claim 1, wherein the silent periods are periods during which the WTRU is permitted to transmit and receive particular reference symbols or synchronization symbols.

4. The WTRU of claim 1, wherein the plurality of duty cycles comprise a pre-determined number k of duty cycles, each of the pre-determined number k of duty cycles representing a range of percentages of the transmission periods to the silent periods in the corresponding coexistence gap pattern.

5. The WTRU of claim 1, wherein, for at least one of the plurality of coexistence gap patterns, the silent periods correspond to one or more transparent time division duplexing (TDD) frames.

6. The WTRU of claim 5, wherein the WTRU is configured to receive the information regarding the duty cycle for the wireless cell by reading system information (SI) broadcast by the base station in non-transparent TDD frames.

7. The WTRU of claim 6, wherein the information regarding the duty cycle for the wireless cell is broadcast in the SI in one of a system information block 1 (SIB1), an SIB2 or a master information block (MIB).

8. The WTRU of claim 7, wherein:
   SIB scheduling is such that the SIB2 and higher order SIBs are prioritized such that an SI window in which an SIB is transmitted does not overlap with any transparent TDD frames,
   MIB scheduling is such that the MIB is transmitted in every frame that is a non-transparent TDD frame, and
   SIB mapping to TDD frames is such that SIB1 never falls on a transparent frame.

9. The WTRU of claim 5, wherein sub-frames that are part of a transparent TDD frame are not counted when calculating delays for long term evolution (LTE) operations, wherein the LTE operations comprise at least one of a channel quality reporting operation, a power control operation, or a random access channel (RACH) operation.

10. The WTRU of claim 5, wherein sub-frames that are part of a transparent TDD frame are not counted when calculating one of a delay between a transmission and acknowledgement/negative acknowledgement (ACK/NACK) of the transmission or a delay between an ACK/NACK and a retransmission in a hybrid automatic repeat request (HARQ).

11. The WTRU of claim 5, wherein the WTRU is further configured to perform at least one of transmitting an ACK/NACK message in a next non-transparent TDD frame following a frame in which a transmission is made or making a retransmission in a next non-transparent TDD frame following a frame in which the corresponding ACK/NACK was received.

12. The WTRU of claim 1, wherein, for at least one of the plurality of coexistence gap patterns, the silent periods correspond to one or more blank sub-frames in a time division duplexing (TDD) uplink/downlink configuration.

13. A method of coexistence among wireless transmit/receive units (WTRUs) operating in the same spectrum, the method comprising:
   a WTRU storing a plurality of coexistence gap patterns, each of the plurality of coexistence gap patterns defining a pattern of transmission periods and silent periods for the WTRU and corresponding to a respective duty cycle of a plurality of duty cycles;
   the WTRU receiving information from a base station on a wireless spectrum, wherein the information is regarding a duty cycle for a wireless cell operated by the base station;
   the WTRU selecting one of the plurality of coexistence gap patterns based on the received information regarding the duty cycle for the wireless cell; and
   the WTRU transmitting on the wireless spectrum during the transmission periods and not transmitting or transmitting only particular reference symbols or synchronization symbols on the wireless spectrum during the silent periods of the selected one of the plurality of coexistence gap patterns such that at least one WTRU corresponding to at least one radio access technology (RAT) other than a RAT corresponding to the base station may transmit on the same spectrum during the silent periods.

14. The method of claim 13, wherein at least one of the RAT corresponding to the base station is long term evolution (LTE) or the at least one RAT other than the RAT corresponding to the base station is WiFi.

15. The method of claim 13, wherein the plurality of duty cycles comprise a pre-determined number k of duty cycles, each of the pre-determined number k of duty cycles representing a range of percentages of the transmission periods to the silent periods in the corresponding coexistence gap pattern.

16. The method of claim 13, wherein, for at least one of the plurality of coexistence gap patterns, the silent periods correspond to one or more transparent time division duplexing (TDD) frames.

17. The method of claim 16, wherein sub-frames that are part of a transparent TDD frame are not counted when calculating delays for long term evolution (LTE) operations, wherein the LTE operations comprise at least one of a channel quality reporting operation, a power control operation, or a random access channel (RACH) operation.

18. The method of claim 16, wherein sub-frames that are part of a transparent TDD frame are not counted when calculating one of a delay between a transmission and acknowledgement/negative acknowledgement (ACK/NACK) of the transmission or a delay between an ACK/NACK and a retransmission in a hybrid automatic repeat request (HARQ).

19. The method of claim 16, further comprising the WTRU performing at least one of transmitting an ACK/NACK message in a next non-transparent TDD frame following a frame in which a transmission is made or making a retransmission in a next non-transparent TDD frame following a frame in which the corresponding ACK/NACK was received.

20. The method of claim 13, wherein the WTRU receives the information regarding the duty cycle for the wireless cell by reading system information (SI) broadcast by the base station in non-transparent TDD frames.

21. The method of claim 20, wherein the information regarding the duty cycle for the wireless cell is broadcast in the SI in one of a system information block 1 (SIB1), an SIB2 or a master information block (MIB).

22. The method of claim 21, wherein:
SIB scheduling is such that the SIB2 and higher order SIBs are prioritized such that an SI window in which an SIB is transmitted does not overlap with any transparent TDD frames,
MIB scheduling is such that the MIB is transmitted in every frame that is a non-transparent TDD frame, and
SIB mapping to TDD frames is such that SIB1 never falls on a transparent frame.

* * * * *